United States Patent
Dote et al.

(10) Patent No.: US 7,668,446 B2
(45) Date of Patent: Feb. 23, 2010

(54) AUTOMATIC PHOTO STUDIO

(75) Inventors: Shingo Dote, Tokyo (JP); Yuka Nakahara, Tokyo (JP); Shigeru Kanou, Yokohama (JP); Manabu Ohmizu, Yokohama (JP); Keiko Morimoto, Yokohama (JP); Takeshi Matsumoto, Yokohama (JP)

(73) Assignee: Kabushiki Kaisha Sega, Tokyo (JP)

( * ) Notice: Subject to any disclaimer, the term of this patent is extended or adjusted under 35 U.S.C. 154(b) by 630 days.

(21) Appl. No.: 11/476,863

(22) Filed: Jun. 29, 2006

(65) Prior Publication Data

US 2007/0014550 A1      Jan. 18, 2007

(30) Foreign Application Priority Data

Jun. 30, 2005    (JP) .............................. 2005-192183

(51) Int. Cl.
*G03B 15/00*  (2006.01)
(52) U.S. Cl. .............................................. 396/1; 396/2
(58) Field of Classification Search .................... 396/1, 396/2; 348/722
See application file for complete search history.

(56) References Cited

U.S. PATENT DOCUMENTS

| | | | | |
|---|---|---|---|---|
| 4,089,017 A | * | 5/1978 | Buldini ........................... | 396/2 |
| 5,016,035 A | * | 5/1991 | Myles, Jr. ....................... | 396/2 |
| 6,369,908 B1 | * | 4/2002 | Frey et al. ................... | 358/1.15 |
| 6,480,673 B2 | * | 11/2002 | Liebenow ....................... | 396/2 |
| 2003/0189721 A1 | * | 10/2003 | Fredlund et al. ............ | 358/1.15 |
| 2004/0143367 A1 | * | 7/2004 | Bartholomew et al. ...... | 700/239 |
| 2005/0047777 A1 | * | 3/2005 | Molldrem, Jr. .............. | 396/564 |

FOREIGN PATENT DOCUMENTS

| | | |
|---|---|---|
| JP | 2000-229181 | 8/2000 |
| JP | 2003-333478 | 11/2003 |

* cited by examiner

*Primary Examiner*—W. B. Perkey
*Assistant Examiner*—Warren K Fenwick
(74) *Attorney, Agent, or Firm*—Finnegan, Henderson, Farabow, Garrett & Dunner, L.L.P.

(57) ABSTRACT

The present invention enables a user to photograph and edit a photograph suiting one's taste slowly and while having fun. The automatic photo studio of this invention has a counter for a person to receive a user, a plurality of satellites having a function of receiving operations of a user and a function of showing various displays to the user, and a plurality of studios for photographing a subject. The automatic photo studio further includes a counter system provided in the vicinity of the counter for performing visitor processing and checkout processing to the user, a printer system provided in the vicinity of the counter for printing images based on subject images photographed in the studio, a satellite system provided to the satellite for enabling the user to edit the subject images photographed in the studio, and a studio system provided to the studio for controlling the photo shooting conditions and photo shoot timing. The satellite system and the studio system determine whether the user is an authorized user based on information written in a player information storage medium as an information storage medium in the possession of the user, and permit the user to use the satellite or the studio when the user is an official user as the authorized user.

18 Claims, 45 Drawing Sheets

FIG. 8

| # | FILE NAME | KEY ITEM | DATE ITEM |
|---|---|---|---|
| 1 | IN-STORE LAYOUT FILE D0801 | — | LIST OF PRINTER SYSTEMS, SATELLITE SYSTEMS AND STUDIO SYSTEMS INSTALLED IN STORE |
| 2 | PRINTER SETTING FILE D0802 | SYSTEM ID OF PRINTER SYSTEM | EXECUTION STATUS (IDENTIFICATION OF NORMAL OPERATION, ERROR, ETC.), TYPE OF PRINTING PAPER (IDENTIFICATION OF L SIZE, A1 SIZE, ETC.) AND SO ON REGARDING EACH PRINTER OF RESPECTIVE PRINTER SYSTEMS |
| 3 | SATELLITE USAGE FILE D0803 | SYSTEM ID OF SATELLITE SYSTEM | EXECUTION STATUS (IN USE, EMPTY, ERROR, ETC.), PLAYER ID OF FINAL USER, START TIME OF USE, START TIME OF PRINT PROCESSING AND SO ON OF THE RESPECTIVE SATELLITE SYSTEMS |
| 4 | STUDIO SETTING FILE D0804 | SYSTEM ID OF STUDIO SYSTEM | EXECUTION STATUS (IN USE, EMPTY, ERROR, ETC.) AND SO ON OF THE RESPECTIVE STUDIO SYSTEMS |
| 5 | SAMPLE PHOTO FILE D0805 | IMAGE ID | DISPLAY DATA OF PHOTOS AND ATTRIBUTE INFORMATION TO BE DISPLAYED AS SAMPLES IN THE STUDIO (INFORMATION SHOWING WHICH PHOTO WAS TAKEN AT WHICH STUDIO WITH WHICH CAMERA) |
| 6 | PHOTO RESULT IMAGE FILE D0806 | IMAGE ID | IMAGE DATA AND ATTRIBUTE INFORMATION OF PHOTO RESULTS |
| 7 | ALBUM IMAGE FILE D0807 | IMAGE ID | IMAGE DATA AND ATTRIBUTE INFORMATION TO BE EDITED (DATA STRUCTURE IS SAME AS PHOTO RESULT IMAGE FILE) |
| 8 | EDITING IMAGE FILE D0808 | IMAGE ID | IMAGE DATA AND ATTRIBUTE INFORMATION TO BE EDITED AND SYNTHESIZED (INCLUDING IMAGES FOR CHROMA KEY |
| 9 | IC CARD REGISTRATION INFORMATION FILE D0809 | — | INFORMATION CONCERNING ISSUED OPERATOR CARDS AND PLAYER CARDS |

| ITEM | DATA COUNT | SYSTEM ID | | | DISPLAY NAME | INSTALLATION SITE |
|---|---|---|---|---|---|---|
| | | TYPE | SERIAL NUMBER | | | |
| DATA CONTENTS | NUMBER (N) OF SYSTEMS RECORDED IN IN-STORE LAYOUT FILE | 0: SERVER<br>1: COUNTER<br>2: PRINTER<br>3: SATELLITE<br>4: STUDIO | SERIAL NUMBER WITHIN SAME TYPE OF SYSTEM | | NAME TO BE DISPLAYED IN LAYOUT CHART | IN-STORE SYSTEM INSTALLATION SITE |
| | D0901 | D0902 | D0903 | | D0904 | D0905 |

{ Xn (covering TYPE, SERIAL NUMBER, DISPLAY NAME, INSTALLATION SITE)

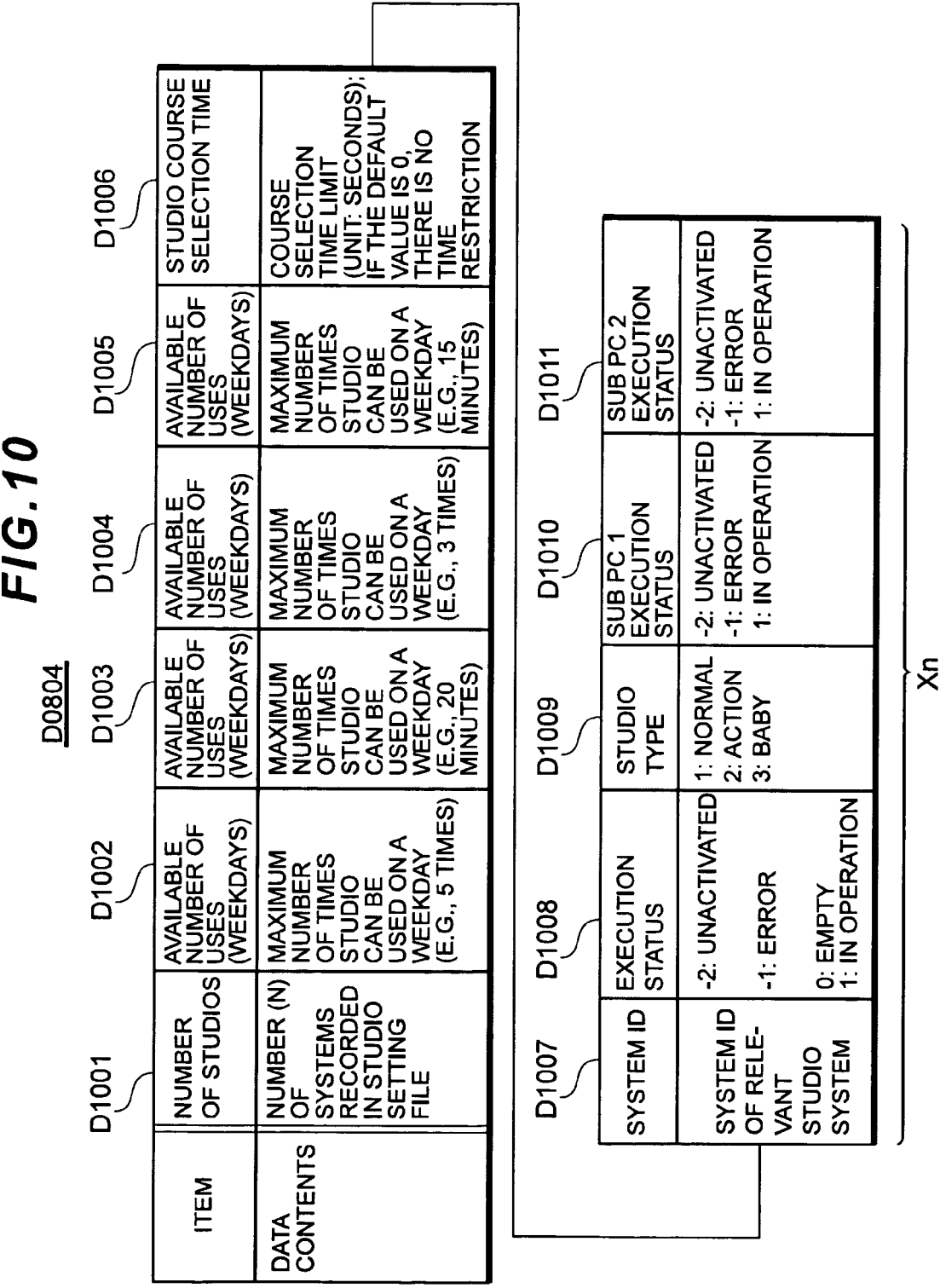

| ITEM | DATA COUNT | IMAGE ID | STUDIO TYPE | CAMERA NUMBER | CHROMA KEY PATTERN | IMAGE DATA |
|---|---|---|---|---|---|---|
| | D1101 | D1102 | D1103 | D1104 | D1105 | D1106 |
| DATA CONTENTS | NUMBER (N) OF SAMPLE PHOTOS RECORDED IN SAMPLE PHOTO FILE | ID FOR IDENTIFYING SAMPLE PHOTOS | IDENTIFICATION SHOWING WHICH STUDIO WAS USED FOR THE PHOTO SHOOT 1: NORMAL 2: ACTION 3: BABY | IDENTIFICATION SHOWING WHICH CAMERA AMONG THE 3 CAMERAS WAS USED TO SHOOT THE SAMPLE PHOTO (E.G.) 1: UPPER CAMERA 2: MIDDLE CAMERA 3: LOWER CAMERA | IDENTIFICATION SHOWING WHICH CHROMA KEY PATTERN WAS USED ON THE SAMPLE PHOTO TO OBTAIN THE RESULT PHOTO -1: NO CHROMA KEY USED OTHERS: CHROMA KEY PATTERN NUMBER | IMAGE DATA OF SAMPLE PHOTOS |

Xn (spans columns D1102–D1106)

| | D1201 | D1202 | D1203 | D1204 | D1205 | D1206 |
|---|---|---|---|---|---|---|
| ITEM | DATA COUNT | IMAGE ID | STUDIO TYPE | CAMERA NUMBER | BACKGROUND CURTAIN IDENTIFICATION | IMAGE DATA |
| DATA CONTENTS | NUMBER (N) OF SAMPLE PHOTOS RECORDED IN SAMPLE PHOTO FILE | ID FOR IDENTIFYING SAMPLE PHOTOS | IDENTIFICATION SHOWING WHICH STUDIO WAS USED FOR THE PHOTO SHOOT 1: NORMAL 2: ACTION 3: BABY | IDENTIFICATION SHOWING WHICH CAMERA AMONG THE 3 CAMERAS WAS USED TO SHOOT THE SAMPLE PHOTO (E.G.) 1: UPPER CAMERA 2: MIDDLE CAMERA 3: LOWER CAMERA | IDENTIFICATION OF BACKGROUND CURTAIN -1: NO CHROMA KEY OTHERS: CODE SHOWING COLOR OF BACKGROUND CURTAIN | NECESSITY OF PRINTING IMAGES 0: NOT TO BE PRINTED 1: TO BE PRINTED |
|  |  |  |  |  |  | IMAGE DATA OF PHOTO RESULT |

Xn

| | D1208 | D1209 | D1210 | D1211 | D1212 |
|---|---|---|---|---|---|
| | COMMAND DATE OF PRINTING | NUMBER OF PRINTS | PRINT SIZE | START TIME OF PRINTING | PRINTING STATUS |
| | LATEST DATE A COMMAND WAS ISSUED FOR PRINTING | RELEVANT IMAGE NUMBER (N) OF REQUESTED PRINTS | OF RELEVANT IMAGE SIZE TO BE PRINTED 1: L SIZE 2: 2L SIZE 3: A1 SIZE 4: CARD SIZE | HOUR, MINUTE, SECOND WHEN PRINTING WAS STARTED (IF NOT YET STARTED, 「999999」) | 1: PRINT QUEUE 2: PRINT START 3: PRINT COMPLETE, UNDELIVERED 4: PRINT COMPLETE, DELIVERED |

| ITEM | NUMBER OF REGISTERED OPERATORS (D1301) | NUMBER OF REGISTERED PLAYERS (D1302) | OPERATOR ID (D1303) | EFFECTIVE FLAG (D1304) | OPERATOR NAME (D1305) | OPERATOR TYPE (D1306) |
|---|---|---|---|---|---|---|
| DATA CONTENTS | NUMBER (N) OF ISSUED OPERATED CARDS | NUMBER (M) OF ISSUED PLAYER CARDS | ID FOR UNIQUELY IDENTIFYING OPERATOR CARDS | IDENTIFICATION SHOWING WHETHER OPERATOR CARD IS EFFECTIVE 1: EFFECTIVE 2: INVALID | NAME OF OPERATOR | IDENTIFICATION SHOWING TYPE OF OPERATOR CARD 1: SYSTEM ADMINISTRATOR 2: GENERAL OPERATOR |

{ Xn }

| PLAYER ID (D1307) | EFFECTIVE FLAG (D1308) | PLAYER NAME, CARD NUMBER (D1309) | LOG COUNT OF USE (D1310) | DATE OF USE (D1311) | NUMBER OF PHOTOS TAKEN (D1312) | IMAGE ID (D1313) |
|---|---|---|---|---|---|---|
| ID FOR UNIQUELY IDENTIFYING PLAYER CARDS | IDENTIFICATION SHOWING WHETHER PLAYER CARD IS EFFECTIVE 1: EFFECTIVE 2: INVALID 9: EFFECTIVE (WAITING FOR CHECK OUT) | NAME AND IC CARD NUMBER OF PLAYER | NUMBER (K) OF LOG DATA CONCERNING PHOTO SHOOTS USING PLAYER CARD | YEAR, MONTH AND DAY THE PLAYER CARD WAS USED | NUMBER (J) OF PHOTOS TAKEN BY PLAYER ON DATE OF USE | IMAGE ID OF IMAGES PHOTOGRAPHED BY PLAYER ON DATE OF USE |

{ Xj }
{ Xk }
{ Xm }

| ITEM | CARD TYPE | OPERATOR ID | OPERATOR NAME |
|---|---|---|---|
| DATA CONTENTS | IDENTIFICATION SHOWING TYPE OF CARD<br>1: SYSTEM ADMINISTRATOR<br>2: GENERAL OPERATOR | ID FOR UNIQUELY IDENTIFYING OPERATOR CARDS | NAME OF OPERATOR |

D1501, D1502, D1503

0107 (BABY STUDIO)

FIG. 26

WHICH PLAYER'S PRINT STATUS WOULD YOU LIKE TO CONFIRM?

| PLAYER ID | PLAYER NAME (NUMBER) | PRINT START TIME | STATUS |
|---|---|---|---|
| 20050901-103021 | PLAYER 1 (12) | 12:50 | PRINT COMPLETE |
| 20050901-105614 | PLAYER 2 (13) | 12:55 | PRINT COMPLETE |
| 20050901-110236 | PLAYER 4 (15) | 12:52 | PRINTING |
| 20050901-113858 | PLAYER 6 (19) | 13:15 | PRINTING |
| 20050901-112009 | PLAYER 5 (17) | 13:21 | PRINTING |
| 20050901-105823 | PLAYER 3 (14) | 13:36 | PRINTING |

NEXT PAGE  PREVIOUS PAGE  CANCEL 2601
2602

FIG.28

| | | | |
|---|---|---|---|
| PLAYER NAME (CARD NUMBER) | PLAYER 1 (12) | NUMBER OF PRINTS | 4 |

2801

BREAKDOWN

| PHOTO-GRAPHY | YES | | |
|---|---|---|---|
| SIZE | NUMBER OF PRINTS | SIZE | NUMBER OF PRINTS |
| CARD | 001 | 2L | 002 |
| L | 002 | A1 | 000 |

2802

CHECK OUT     CANCEL

FIG. 29

DETAILED STATUS OF STUDIO 01

| STUDIO NAME | STUDIO 01 |
| --- | --- |
| EXECUTION STATUS | IN-USE |
| STUDIO TYPE | NORMAL STUDIO |

CONFIRM

FIG.30

DETAILED STATUS OF SATELLITE 01

| SATELLITE NAME | SATELLITE 01 |
|---|---|
| EXECUTION STATUS | IN-USE |
| PLAYER NAME (CARD NUMBER) | PLAYER 1 (12) |
| USE START TIME | 12:00 |
| PRINT START TIME | 12:30 |

CONFIRM

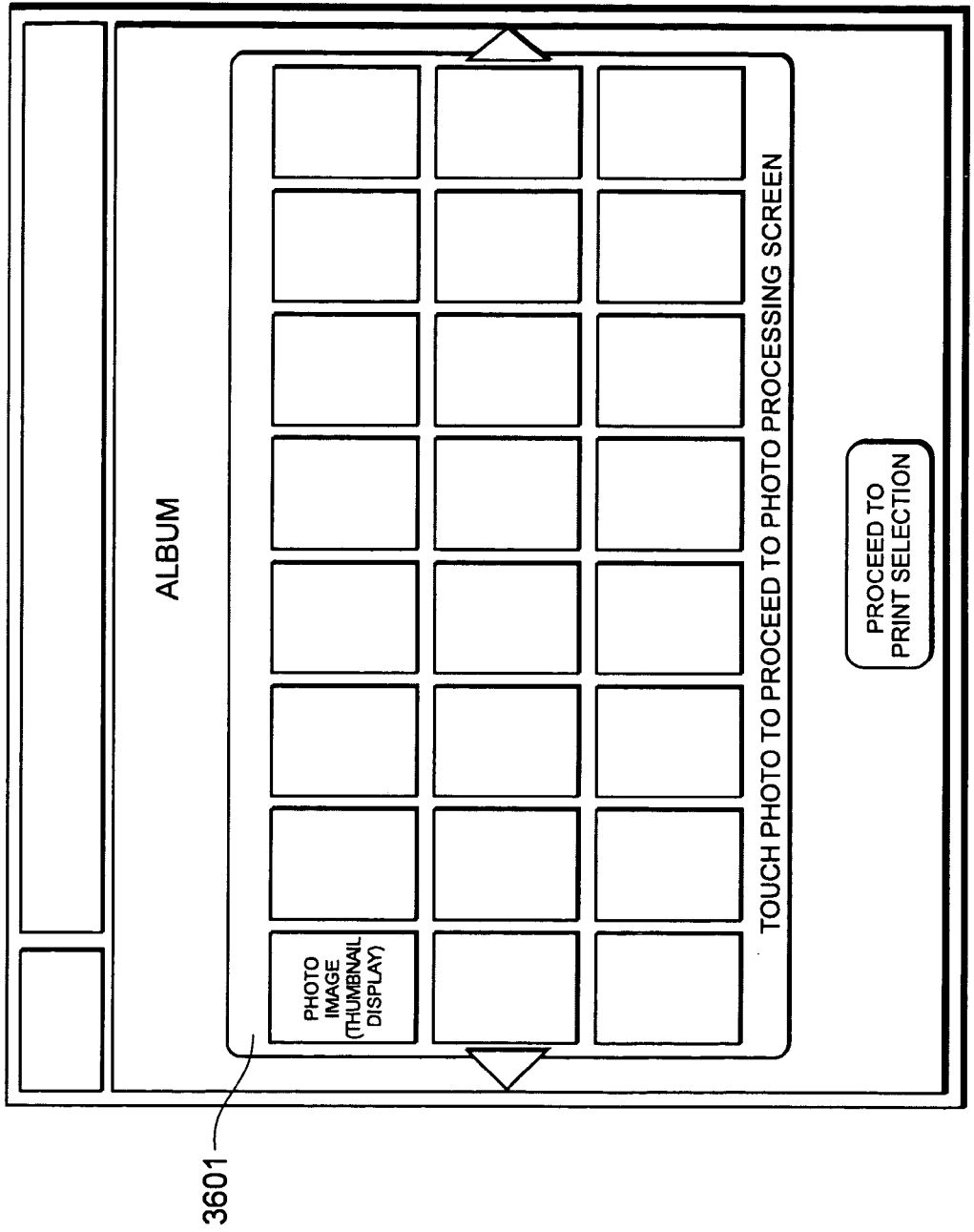

LET'S WARM UP!
PLEASE GATHER IN FRONT OF THE STUDIO MONITOR

・・・PICTURE IN STUDIO・・・

*SHOOTING

FIG.41

PLEASE SELECT A COURSE

| EASY PLAY COURSE (AGES 2 TO 4) | FUN PLAY COURSE (AGES 4 TO 6) | ACTIVE DANCE COURSE (AGES 6 AND ABOVE) |

FIG.45

| ITEM | STUDIO TYPE | NORMAL | ACTION | BABY |
|---|---|---|---|---|
| CONFIGURATION | OPERATION MONITOR | 1 MONITOR | 1 MONITOR | 1 MONITOR |
| | CONFIRMATION MONITOR | 2 MONITORS (TOP AND BOTTOM IN CAMERA BOX) | 2 MONITORS (CEILING, IN CAMERA BOX) | 2 MONITORS (CEILING, IN CAMERA BOX) |
| | MONITOR CAMERA | 3 CAMERAS (TOP, CENTER AND BOTTOM IN CAMERA BOX) | 3 CAMERAS (CEILING, TOP AND BOTTOM IN CAMERA BOX) | 2 CAMERAS (CEILING, IN CAMERA BOX) |
| | PHOTO CAMERA | | | |
| | FOOTSWITCH | SEVERAL ON FLOOR | 1 ON JUMP BOARD | NONE |
| EQUIPMENT USED FOR PHOTO SHOOT | MONITOR CAMERA AND PHOTO CAMERA TO BE USED | TO BE SWITCHED ACCORDING TO SELECTED CONTENTS, OR TO MATCH THE POSE DESIGNATED IN CONTENTS | | CEILING WHEN THE POSE IS ROLLING AROUND ON THE FLOOR, IN CAMERA BOX FOR OTHER CASES |
| | CONFIRMATION MONITOR FOR DISPLAYING IMAGES | TO BE SWITCHED ACCORDING TO SELECTED CONTENTS, OR TO MATCH THE POSE DESIGNATED IN CONTENTS | | |

AUTOMATIC PHOTO STUDIO

BACKGROUND

1. Field of the Invention

The present invention relates to an automatic photo studio that semi-automatically photographs an image of a subject (subject image), mainly children, and prints and outputs an image that is synthesized with an editing image such as a frame image for decoration (foreground image, background image) or various stamp images.

2. Description of Related Art

Recently, at game arcades, photo sticker printing machines having a game element are attracting attention mainly around teenage girls. With this kind of photo sticker printing machine, the standard method of use is for a user to take photos by freely striking poses without having to avoid publicity in a photo shooting space surrounded by a curtain or the like. After the photo shoot is complete, the photographed image is displayed on a touch panel display, and a user uses a touch pen or a stamp image to edit the photographed image to one's liking. The edited images are downsized into roughly 10 to 20 small images, laid out on sticker paper, and printed out.

The user can enjoy storing the finished stickers as one's own collection, or cutting and sharing the stickers with his/her good friends. Further, a plurality of users taking photos together, and then equally cutting and sharing the finished stickers is also a standard method of enjoyment.

The main users of such a photo sticker printing machine are junior high school and high school girls, and the stamp images often offer cute designs to match the user base. Moreover, in game arcades, to enable users to take photos in unusual clothing, costumes that can be worn and taken off with Velcro (registered trademark) or the like are often rented out. Photo sticker printing machines are often gathered at one corner of a store so that users can select a printing machine of one's liking among the various photo sticker printing machines, and male customers are often restricted from going near such photo sticker printing machines.

There is also another idea of advancing the method of gathering the photo sticker printing machines at one corner of a store, and creating a play facility that only contains photo sticker printing machines.

For instance, a facility is known for broadening the options of the photo machines and printing machines by installing such photo machines and printing machines at separate locations, and printing the photos at a different location after the photo shoot so as to eliminate the photography queue of users (refer to Japanese Patent Laid-Open Publication No. 2000-229181).

Further, a facility is known for separating the facility into a photo shoot area, an editing area and a printing area, installing several editing equipment in the editing area and designing the editing equipment so that they can be carried and moved around.

In addition, there is technology for preventing another user from editing the photographed image when the photo shoot area and editing area are separated by authenticating the user via a password or the like upon editing (refer to Japanese Patent Laid-Open Publication No. 2003-333478).

Nevertheless, the conventional technology described in foregoing Japanese Patent Laid-Open Publication No. 2000-229181 and Japanese Patent Laid-Open Publication No. 2003-333478 merely gathered the photo sticker printing machines on a large scale based on the premise of a conventional user base such as junior high school and high school girls.

Potential users of a photo sticker printing machine are not limited to teenaged girls, and, for instance, young mothers with small children also wish to take photos of their child as a keepsake. Nevertheless, the current photo sticker printing machines are created to match the tastes of teenage girls from the exterior package to rented costumes and synthesizing images. Thus, since teenage girls gather around the photo sticker printing machines, the current situation is that other user are not able to use the printing machines even if they are interested because they feel embarrassed to use the printing machines.

Further, in the case of a family with children, it is standard to have a professional cameraman take photos of children in a photo studio equipped with lighting and photography equipment on special occasions such as the child's birthday or the Seven-Five-Three Festival as a memento. In addition to the special occasions described above, parents wish to have their child's growth photographed on a routine basis to have high-quality commemorative photos. Nevertheless, since the usage fee of photo studios is generally expensive and reservations are required, there are numerous restrictions, and the current status is that parents are not able to casually use photo studios.

SUMMARY

An object of the present invention is to provide a new type of photo studio for families with children. In other words, the present invention aims to enable parents to take photos, in a quality as though taken by a professional cameraman in a photography studio equipped with expensive lighting and photography equipment, enjoyably, casually, easily, and inexpensively without having to hire a professional cameraman.

In order to achieve the foregoing object, the automatic photo studio of the present invention has a counter for a person to receive a user, a plurality of satellites having a function of receiving operations of the user and a function of showing various displays to the user, and a plurality of studios for photographing a subject. The automatic photo studio further includes a counter system provided in the vicinity of the counter for performing visitor processing and checkout processing to the user, a printer system provided in the vicinity of the counter for printing images based on subject images photographed in the studio, a satellite system provided to the satellite for enabling the user to edit the subject images photographed in the studio, and a studio system provided to the studio for controlling the photo shooting conditions and photo shoot timing. The satellite system and the studio system determine whether the user is an authorized user based on information written in a player information storage medium as an information storage medium in the possession of the user, and permit the user to use the satellite or the studio when the user is an official user as the authorized user.

According to the present invention, it is possible to provide a new type of photo studio for families with children. In other words, the present invention enable parents to take photos, in a quality as though taken by a professional cameraman in a photography studio equipped with expensive lighting and photography equipment, enjoyably, casually, easily, and inexpensively without having to hire a professional cameraman.

Preferably, the counter system and the printer system are permitted to be used based on an operator information storage medium as an information storage medium in the possession of an operator on the operation side of the automatic photo studio.

Further, preferably, the studio system is controlled to photograph a prescribed number of images in one photo shoot play in the studio, and the satellite system displays a screen for the user to select an image as a candidate to be edited among a prescribed number of photo result images as photograph results.

Moreover, preferably, the studio system sends a photo result image to be thumbnailed on the satellite system while performing processing of separating the photographed image into an image of the subject and an image of the background, and sends images of the processing result after the separation processing is complete to a server system managing the various files to be used in the overall system of the automatic photo studio.

In addition, preferably, the studio system abandons the photographed image when an image of the subject does not exist in the photographed image.

Further, preferably, the studio system has a plurality of cameras installed at different heights, and the studio system takes photographs by simultaneously using at least two cameras selected among the plurality of cameras.

Moreover, preferably, the studio system has a plurality of computer systems respectively corresponding to the plurality of cameras, and performs image processing respectively in at least two computer systems corresponding to the cameras that took the photos.

In addition, preferably, the studio system has position detection means capable of detecting the position of the subject, and the studio system performs focus control and strobe light control according to the position of the subject detected with the position detection means.

Further, preferably, the studio system has pressure detection means capable of detecting the jump timing of the subject who jumped, and the studio system takes photos at the jump timing of the subject detected with the pressure detection means.

Moreover, preferably, the studio system comprises photo shoot means for photographing the subject per frame, detection means for detecting the movement of the subject from the frame difference of the subject image photographed with the photo shoot means, storage means storing a program of a game that advanced upon changing the movement of a game character based on the detected movement of the subject, image generation means for generating a synthesized image by synthesizing a game character image pre-stored in the storage means, and the subject image, and display means for displaying the synthesized image. Preferably, the studio system executes game processing in which the movement of the subject changes the game character according to a response to a detection signal from the detection means, and determines whether preset photo shooting conditions are satisfied during the execution of the game processing, and stores a subject image photographed when the photo shooting conditions are satisfied in the storage means as a photo result image that is selectable by the user with the satellite.

In addition, preferably, the studio system comprises photo shoot means for photographing the subject per frame, detection means for detecting the movement of the subject from the frame difference of the subject image photographed with the photo shoot means, storage means storing a program of a game that advanced upon changing the movement of a game character based on the detected movement of the subject, image generation means for generating a synthesized image by synthesizing a game character image pre-stored in the storage means, and the subject image, and display means for displaying the synthesized image. Preferably, the studio system executes game processing based on the game program, and displays on the display means a synthesized image generated in a time series with the image generation means, and stores a subject image photographed when a photo shoot timing set to coincide with the game progress in the storage means as a photo result image that is selectable by the user with the satellite.

BRIEF DESCRIPTION OF THE DRAWINGS

FIG. 8 is an explanatory diagram showing a list of main files recorded in the magnetic disk of a server system in the automatic photo studio according to an embodiment of the present invention;

FIG. 9 is a data structure diagram of an in-store layout file used in the automatic photo studio according to an embodiment of the present invention;

FIG. 10 is a data structure diagram of a studio setting file used in the automatic photo studio according to an embodiment of the present invention;

FIG. 11 is a data structure diagram of a sample photo file used in the automatic photo studio according to an embodiment of the present invention;

FIG. 12 is a data structure diagram of a photo result image file used in the automatic photo studio according to an embodiment of the present invention;

FIG. 13 is a data structure diagram of an IC card registration information file used in the automatic photo studio according to an embodiment of the present invention;

FIG. 26 is an explanatory diagram showing an example of a display screen of the automatic photo studio according to an embodiment of the present invention;

FIG. 28 is an explanatory diagram showing an example of a display screen of the automatic photo studio according to an embodiment of the present invention;

FIG. 29 is an explanatory diagram showing an example of a display screen of the automatic photo studio according to an embodiment of the present invention;

FIG. 30 is an explanatory diagram showing an example of a display screen of the automatic photo studio according to an embodiment of the present invention;

FIG. 36A is an explanatory diagram showing an example of a display screen of the automatic photo studio according to an embodiment of the present invention;

FIG. 41 is an explanatory diagram showing an example of a display screen of the automatic photo studio according to an embodiment of the present invention;

FIG. 45 is an explanatory diagram showing a list of differences in the equipment for each studio type in the automatic photo studio according to an embodiment of the present invention.

DETAILED DESCRIPTION OF PREFERRED EMBODIMENTS

Embodiments of the present invention are now explained with reference to the attached drawings.

Figure 1:
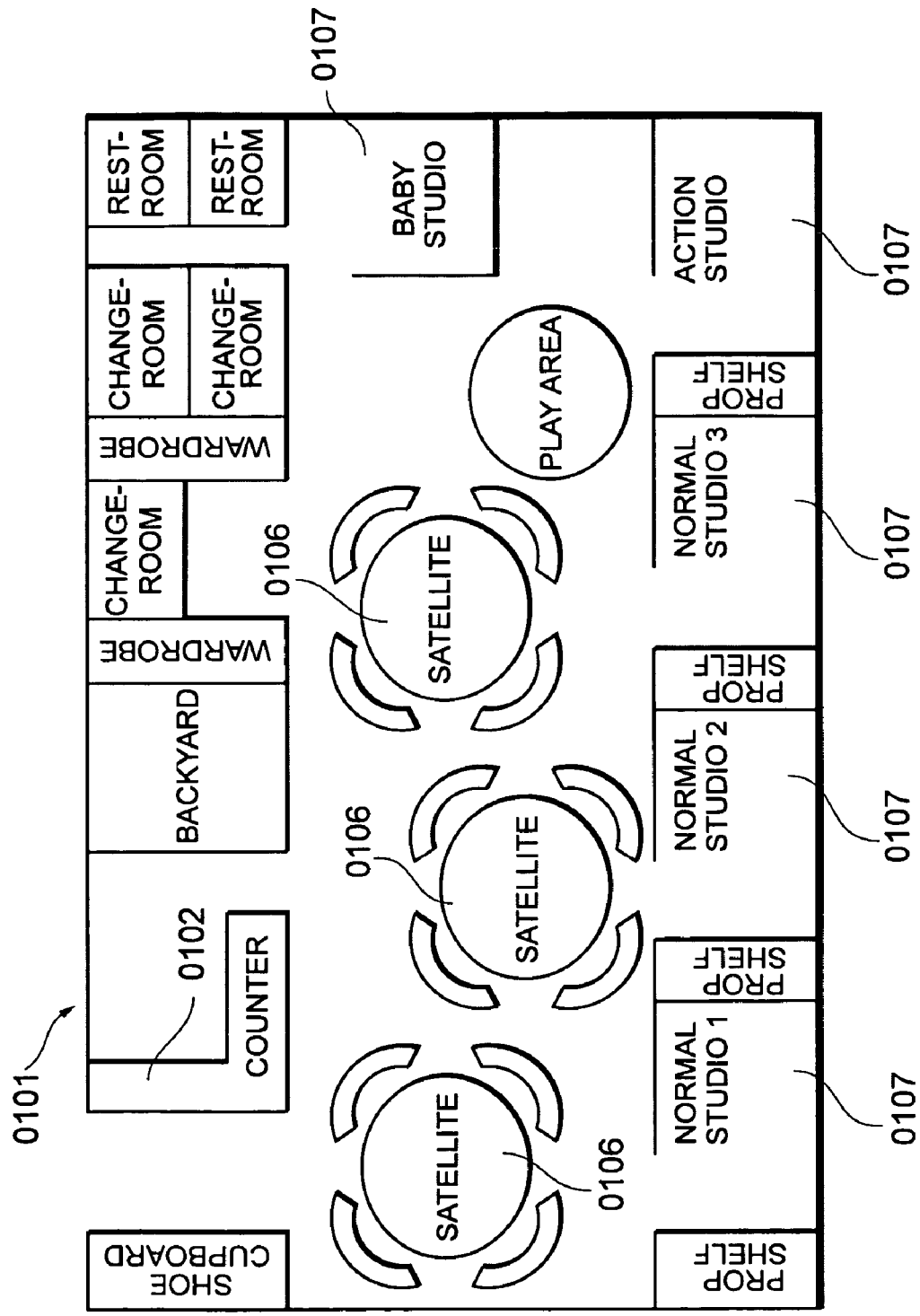
FIG. 1 is a layout plan showing the in-store configuration of the automatic photo studio according to an embodiment of the present invention.

FIG. 1 is a layout plan showing the in-store configuration of the automatic photo studio according to an embodiment (hereinafter referred to as this embodiment) of the present invention.

An automatic photo studio 0101 is equipped with the respective components of a counter 0102, a satellite 0106, and a studio 0107.

Although the detailed configuration and function of the respective facilities will be described later, the counter 0102 is a facility for issuing IC cards to be used by users in the store, and for checkout. The studio 0107 is an automatic photography studio comprising a camera, lighting, background and the like. Since the required equipment and functions will differ slightly depending on the age of children to be photographed, three types of studios are provided; namely, a normal studio, an action studio, and a baby studio. The satellite 0106 is a facility for users to spend time before the photography or to edit the photographed images, and is configured from a table installed with a computer and one or more chairs.

Inside the automatic photo studio 0101, a plurality of studios 0107 and a plurality of satellites 0106 are installed to enable a plurality of users to simultaneously take photos or edit images.

Incidentally, although not shown in FIG. 1, provided in the vicinity of the counter 0102 are a computer system, and a counter system 0104, a printer system 0105, and a server system 0103 configured from various constituent elements connected to the computer system. Similarly, the respective satellites 0106 are provided with a satellite system 0110, and the respective studios 0107 are provided with a studio system 0111.

In addition to the foregoing facilities, the automatic photo studio has various other facilities required in operating the automatic photo studio such as a wardrobe for housing the rental costumes to be used during the photo shoot, a change-room for changing into and out of the costume, a shelf for housing props such as dolls and the like to be used in the photo shoot, restrooms, a shoe cupboard, a play area for bored children to play, a backyard for storing equipment and the like.

Figure 2:
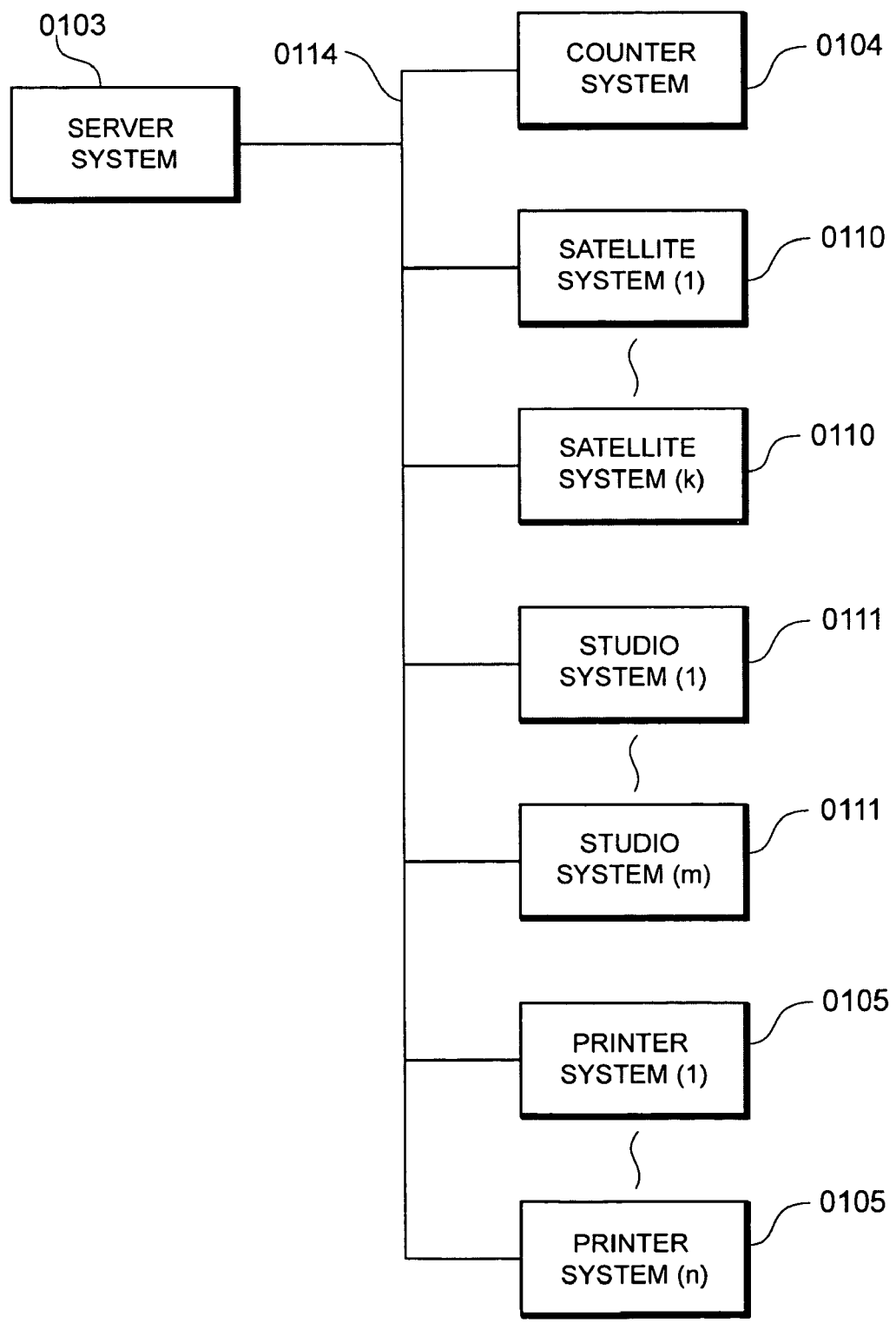
FIG. 2 is a system configuration diagram of the automatic photo studio according to an embodiment of the present invention.

FIG. 2 is a system configuration diagram of the overall automatic photo studio according to this embodiment. The server system 0103 primarily stores various files to be used by the overall automatic photo studio system, and functions as a so-called file server that provides data according to a request from another system. The counter system 0104 performs affairs required in operating the automatic photo studio such as issuing IC cards, confirming the print status, handling checkout and the like. Meanwhile, the satellite system 0110 and the studio system 0111 are systems to be mainly used by users, and are respectively used for editing images (photos), and photographing images. The printer system 0105 is a system for controlling the printing of images with a printer.

Each system is connected to peripheral equipment such as a computer (PC or the like), an IC card R/W (reader/writer), a touch panel monitor and the like, and the systems are connected to be mutually communicable via a communication line 0114. Therefore, for instance, it is possible for the server system 0103 to receive the execution status information of the satellite system 0110, record this in a file for managing the execution status of the automatic photo studio system, send this according to a request from the counter system 0104, and display this on a touch panel monitor of the counter system 0104.

A plurality of printer systems 0105, satellite systems 0110, and studio systems 0111 may be installed according to number of users or number of images to be printed. Incidentally, in the following explanation, the server system 0103, the counter system 0104, the printer system 0105, the satellite system 0110, and the studio system 0111 are collectively referred to simply as "systems". Further, if a plurality of systems are all systems to be used for the same purpose; for example, if they are all printer systems 0105, this may be indicated as a "same type of system".

Figure 3:
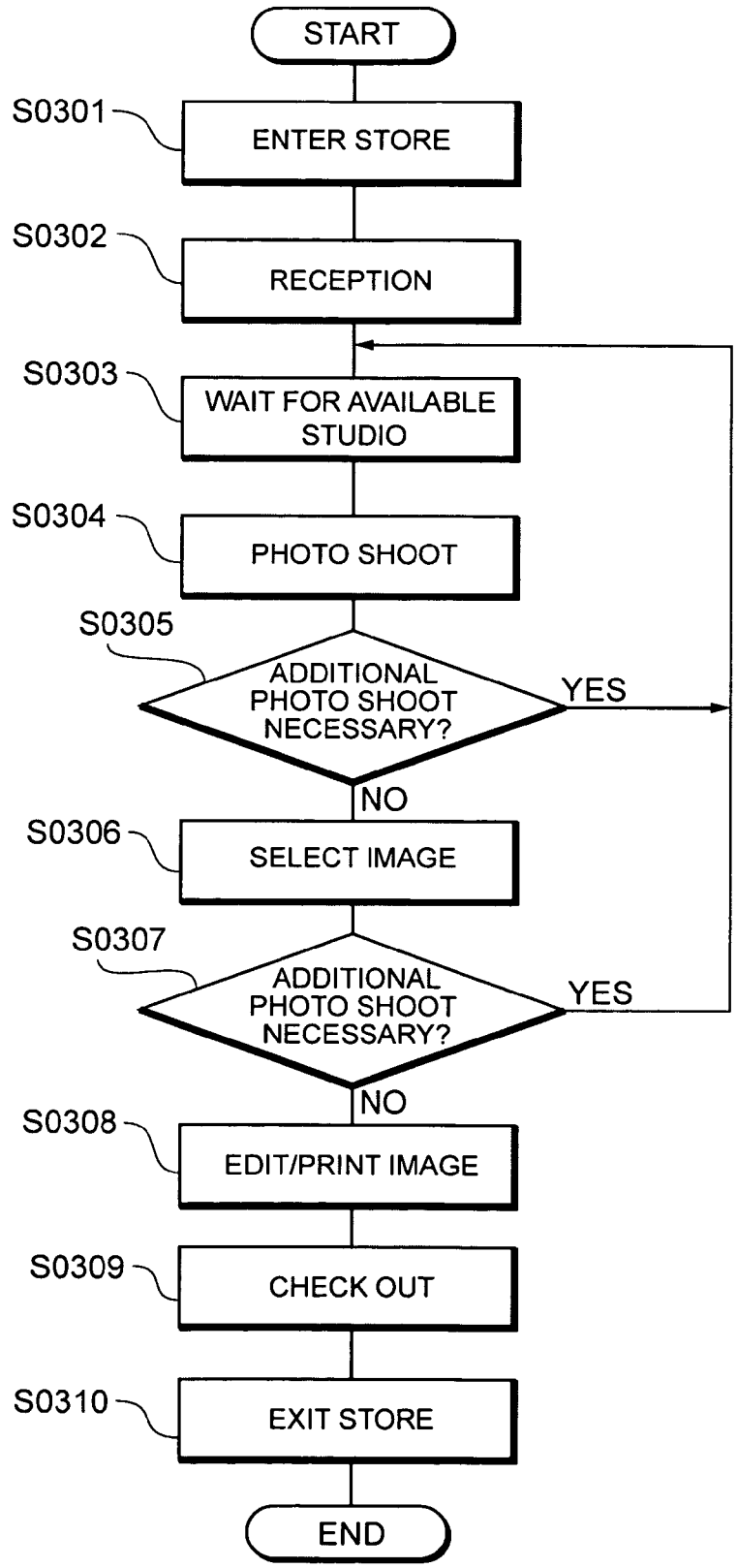
FIG. 3 is a flowchart showing the flow of a user using the photo studio in the automatic photo studio according to an embodiment of the present invention.

FIG. 3 is a flowchart showing the flow of a user using the automatic photo studio in the automatic photo studio (hereinafter abbreviated as "store") according to this embodiment.

When a user enters the store (S0301), the user foremost goes to the counter 0102 for reception (S0302), and receives an IC card. The anticipated users are mainly parents with children (in particular, a user group consisting of a mother and her child), and one IC card is given to one user group. Although the data contents to be recorded in the IC card will be described in detail later, a unique code for identifying the user or user group (when it is not necessary to specify the number of people even in the case of a user group, this will simply be indicated as "user") is recorded in the IC card.

Subsequently, the user moves to an empty satellite 0106 and sits down, and waits for the studio 0107, which the user wishes to use for the photo shoot, to become available (S0303). Here, if the user is a first-timer and does not know how to use the store, the user may use the satellite system 0110 to view explanations regarding the method of using the store.

When a user who was using the intended studio 0107 exits the studio, a lamp installed near the entrance of the studio 0107 for showing that the studio is in use will go out. The user confirms that the studio 0107 is not available from the lamp being turned off, moves to the studio 0107, and uses the studio system 0111 for the photo shoot (S0304).

After the photo shoot, if the user wishes to continue taking photos at a different studio 0107, the user confirms that the intended studio 0107 is available and thereafter moves to such studio, and does another photo shoot. If the intended studio is in use, the user returns to the satellite 0106 (YES at S0305). Further, when the user wishes to once display and confirm the photographed pictures, the user also returns to the satellite 0106 (NO at S0305). Here, the user is not required to return to the satellite 0106 where he/she sat after coming to the store, and may use any satellite 0106 that is available at such time.

At the satellite 0106, the user is able to use the satellite system 0110 and confirm and select the photographed images (S0306). Even after selecting an image of one's liking, if the user wishes to continue taking more photos, the user may conduct another photo shoot in the studio 0107 once again (YES at S0307).

When no additional photo shoot is necessary, the user uses the satellite system 0110 to edit the selected images, subsequently selects the photos to be ultimately printed, and commands printing (S0308).

After completing the print command, the user stops by the counter 0102 to return the IC card, check out, receive the output photos (S0309), and then exits the store (S0310).

Incidentally, the IC card to be used by a user in the store records a unique code for identifying the user. Both the satellite system 0110 and the studio system 0111 determine this unique code, and do not accept the operation from persons other than the official user. Therefore, for instance, the user cannot use the satellite system 0110 without passing through the counter 0102 (without receiving an IC card). The user's IC card is hereinafter referred to as a "player card".

Further, the working staff of the store is able to use the counter system 0104 and display the usage status of the satellite system 0110 and the studio system 0111, and can thereby grasp which user is using which facility in real time.

Moreover, the working staff can also temporarily restrict the reception of new users so that the number of users in the store will be within an appropriate range, or assume the waiting time for using the satellite 0106 and the studio 0107 and notify the visiting users of the anticipated waiting time. Accordingly, it is possible to prevent users from becoming dissatisfied as a result of being forced to wait for a long time.

Next, the detailed configuration of the respective facilities and the respective systems described with reference to FIG. 1 and FIG. 2 is foremost explained, and the operation of the respective systems regarding the respective processes (reception, photo shoot, editing, etc.) in the flowchart shown in FIG. 3 is subsequently explained.

Figure 4:
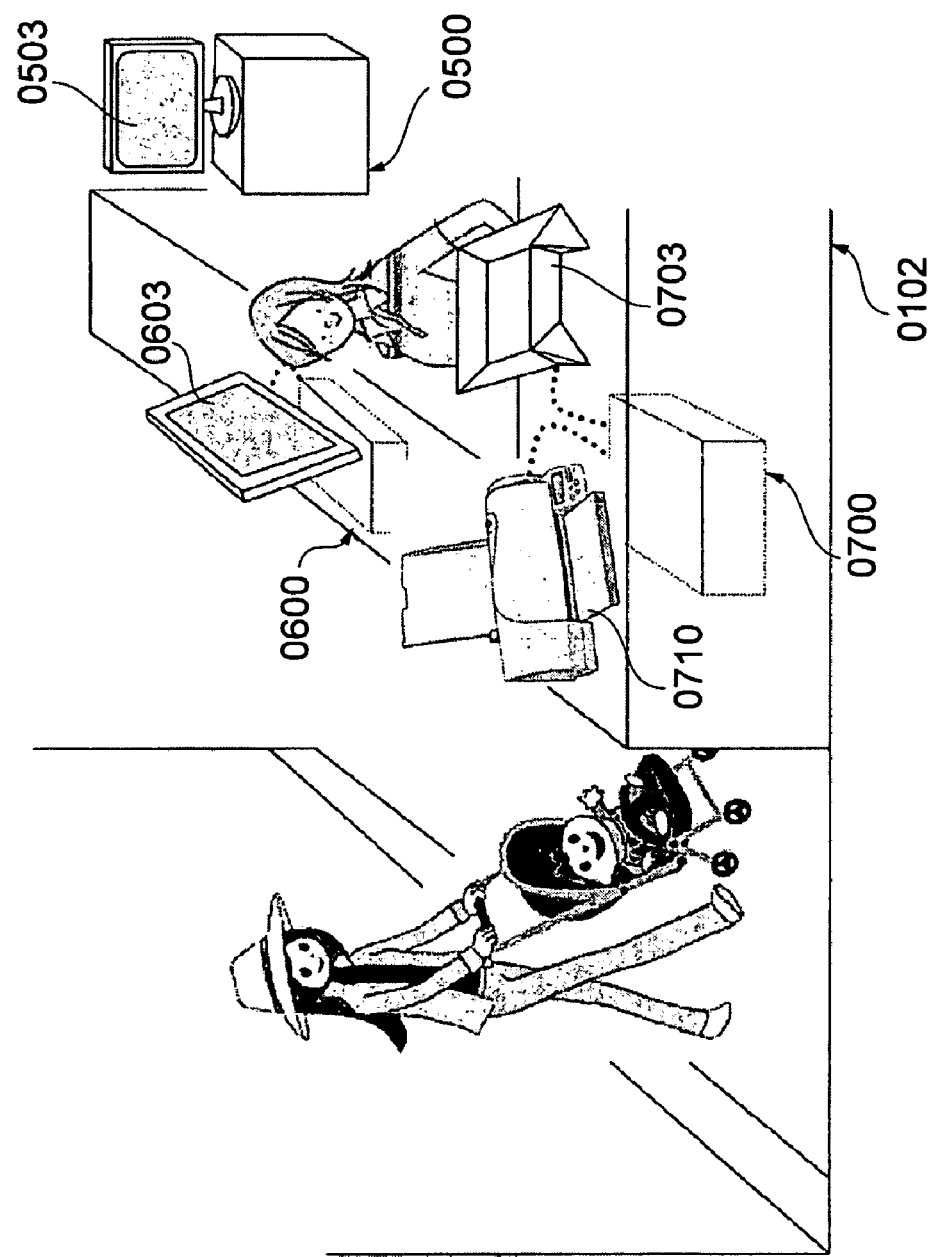
FIG. 4 is an explanatory diagram showing an obliquely downward view of a counter of the automatic photo studio according to an embodiment of the present invention.
Figure 5:
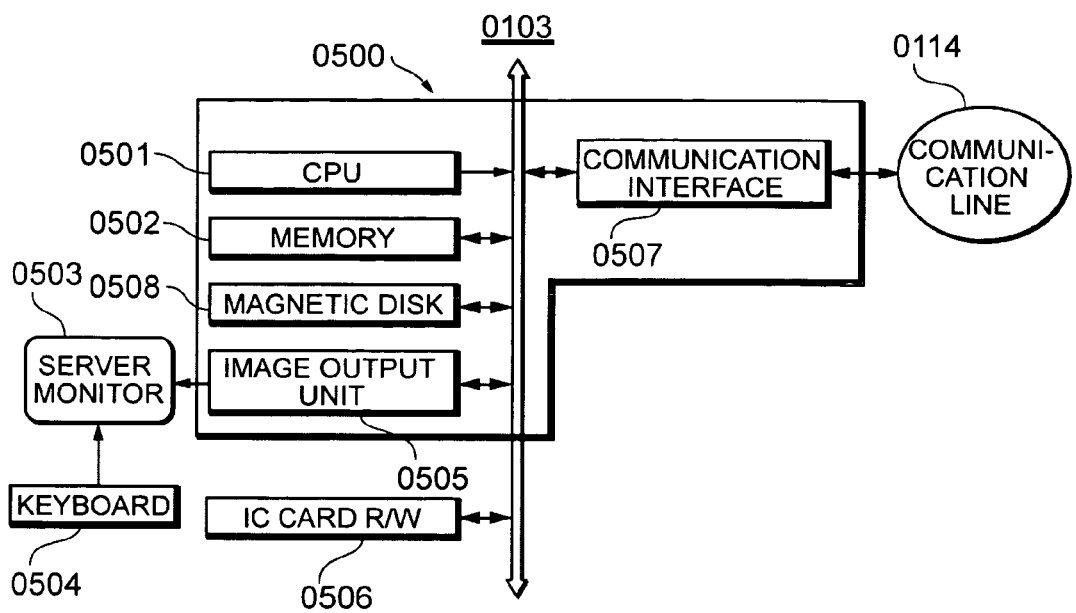
FIG. 5 is a block diagram of a server system of the automatic photo studio according to an embodiment of the present invention.
Figure 6:
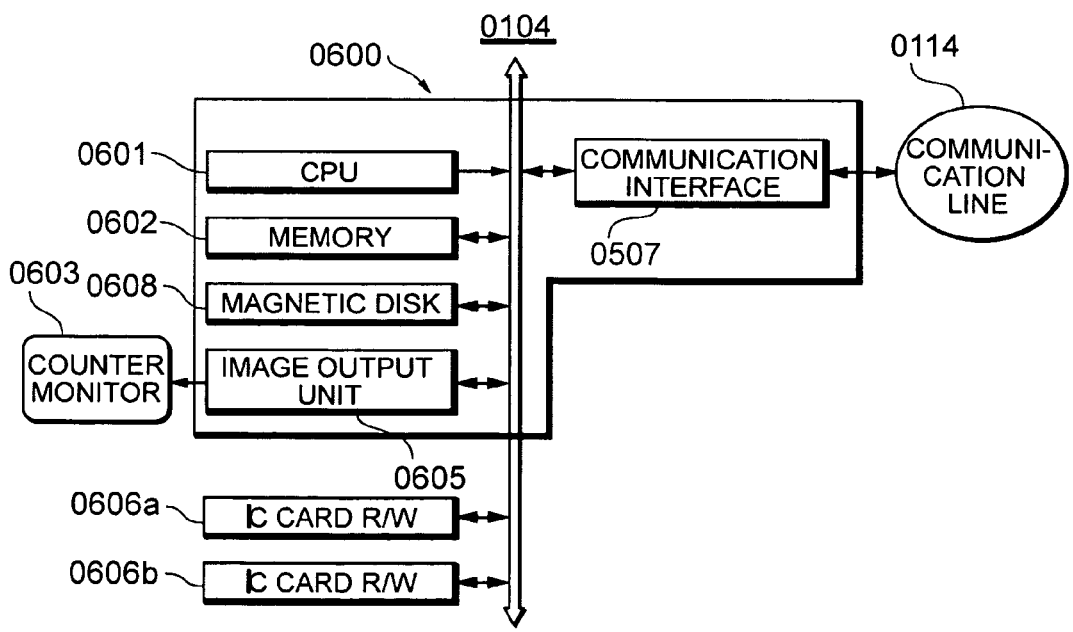
FIG. 6 is a block diagram of a counter system of the automatic photo studio according to an embodiment of the present invention.
Figure 7:
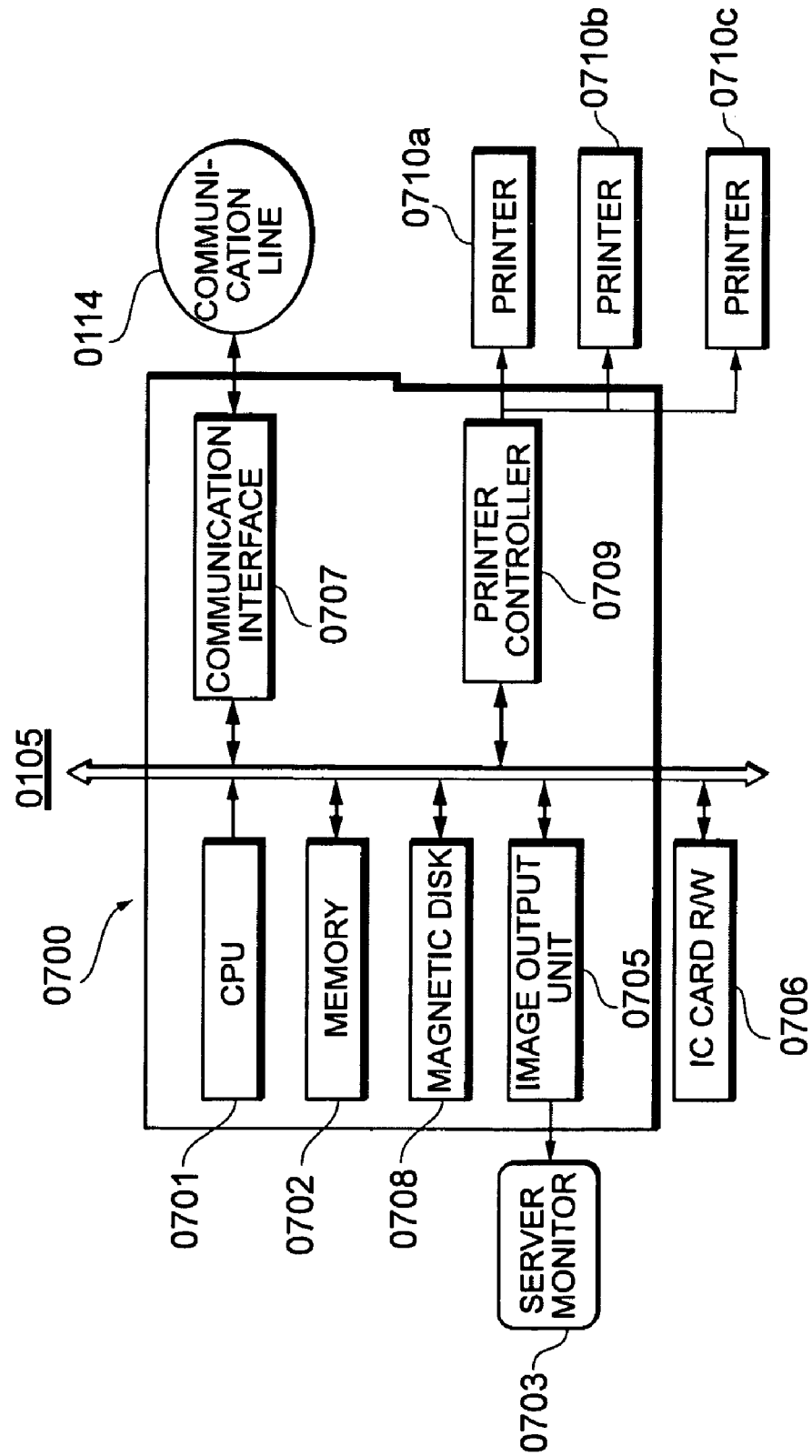
FIG. 7 is a block diagram of a printer system of the automatic photo studio according to an embodiment of the present invention.

FIG. 4 shows an obliquely downward view of a part of the counter 0102. FIG. 5, FIG. 6 and FIG. 7 are respectively block diagrams of the server system 0103, the counter system 0104, and the printer system 0105.

As shown in FIG. 4, the inside of the counter table houses a PC body 0600 of the counter system 0104, and a PC body 0700 of the printer system 0105. Provided on the counter table are a touch panel monitor 0603 for the working staff to perform processing for reception and the like, a touch panel monitor 0703 for performing processing of additional printing and the like, and a printer 0710a for printing and outputting photos. Further, although not shown in FIG. 4, IC card R/Ws 0606a and 0606b of the counter system 0104 and an IC card R/W 0706 of the printer system 0105 are also placed on top of the counter table.

Installed inside the counter 0102 are a PC body 0500 and a monitor 0503 and, although not shown in FIG. 4, a keyboard 0504, and an IC card RAN 0506 of the server system 0103.

Incidentally, the PC body and its peripheral equipment of the respective systems, and the PC bodies of the respective systems simply need to be communicable via a wired or wireless system, and the installation site is not limited to the above. While giving consideration to the aesthetic layout of the store, these components may be installed at a position that is convenient for ordinary business.

As shown in FIG. 5, the server system 0103 comprises a PC body 0500, a monitor 0503, a keyboard 0504, and an IC card R/W 0506.

The working staff can use and operate the keyboard 0504 to create an IC card of a newly hired working staff (hereinafter referred to as an "operator card") by using the IC card R/W 0506, initially create or change the system setting, or display the execution status of the respective systems on the monitor 0503.

The PC body 0700 internally possesses a magnetic disk 0508 for storing information required in operating the store.

Each piece of information is sent to and received from another system such as the counter system 0104 via the communication interface 0507 and the communication line 0114.

FIG. 8 shows the main information among the information recorded in the magnetic disk 0508.

1) An in-store layout file (D0801) is a file for issuing an ID for uniquely identifying the respective systems and recording information such as the in-store installation position of the respective systems (counter system 0104, printer system 0105, etc.) installed in the store. For example, the counter menu screen described later (screen displaying the installation position and execution status of the respective in-store systems) is displayed by referred to the foregoing file.

2) A printer setting file (D0802), a satellite usage file (D0803), and a studio setting file (D0804) are files for managing in real time the execution status (unactivated, in use, empty, error, etc.) of the printer system 0105, the satellite system 0110, and the studio system 0111, respectively. The PC body 0500 of the server system 0103 periodically makes an inquiry to the respective subsystems recorded in the in-store layout file (D0801) regarding the execution status by using the communication line 0114, and updates the foregoing execution status according to the status or content of the response.

Incidentally, a plurality of printers (three printers in this embodiment) can be connected to a single printer system 0105. Therefore, the printer setting file (D0802) records the execution status of each printer in the respective printer systems 0105.

3) A sample photo file (D0805), a photo result image file (D0806), an album image file (D0807), and an editing image file (D0808) are files for managing images (including photos).

The sample photo file (D0805) is a file for recording the finished sample photos that were photographed in the respective studios 0107. The user can select the studio 0107 to be used upon browsing the sample photos with the satellite system 0110 and referring to the finished images of the sample photos.

The photo result image file (D0806) is a file for recording resulting images (photos) taken by the user in the studio 0107. After the photo shoot, the user can browse the images recorded in this file using the satellite system 0110, and select the images to be edited. Information of the selected images is replicated in the album image file (D0807). Therefore, the data structure of the photo result image file (D0806) and the album image file (D0807) is the same, and the album image file (D0807) is basically an aggregate of sections of the photo result image file (D0806) excluding the fact that the contents of the recorded image data are the contents after editing (provided that the edit processing described later is performed after the image to be edited has been selected).

The editing image file (D0808) is a file for recording a chroma key image, a stamp image, or a decoration frame image to be used upon editing images, and is used as an editing material image when the user edits the photographed image (photo) with the satellite system 0110.

4) An IC card registration information file (D0809) is a file for managing issued and currently effective IC cards. For instance, when an operator card is inserted into the IC card R/W 0606a of the counter system 0104, it is possible to confirm whether the card is a legitimate operator card by cross checking the information recorded in the card and the information recorded in the IC card registration information file (D0809).

Among the files explained above, the data structure of the particularly important files is described in detail below.

FIG. 9 is a data structure diagram of an in-store layout file (D0801). The in-store layout file (D0801) records the type of system (D0902), the serial number in the same type of system (D0903), the display name to be displayed on the in-store layout chart of the counter menu screen (D0904), and the system installation site in the store (D0905) regarding all systems in the store, and the number of recorded systems is recorded as a data count (D0901).

The type (D0902) and serial number (D0903) are jointly used as a system ID having a unique value in the store. For example, in the case of the studio system 0111, a value of "401" ("4" is the type and "01" is the serial number) is recorded. The display name (D0904) is set with a value such as "studio 01".

Further, the system installation site (D0905) records the position in which the median point of the floor space of the respective systems exists. For instance, with the corner near the entrance of the store as the reference position, values such as "6, 10" (6 m northward from the reference position, and 10 m eastward from the reference position) are stored. If information such as this installation position is recorded, and position information of the northernmost end, southernmost end, westernmost end and easternmost end of the store (for instance, −2 m northward and 12 m eastward from the reference position) is recorded as information unique to the store in the magnetic disk 0508 of the server system 0103, it is possible to determine the position of displaying the system by calculating the relative positions in the layout chart when displaying the in-store layout chart on a screen.

Incidentally, as the system installation site (D0905), any information will do so as long as it can be used to calculate the relative position in the layout chart upon displaying the layout chart, and, for instance, an absolute position such as latitude and longitude information can also be used. Further, instead of recording the center position of the respective systems, the corner position may be recorded. Since the first and foremost objective is to visually confirm the execution status of the respective systems in the store, precise position information is not required, and any information may be used so as long as it can be used to attain the foregoing objective. Further, instead of simply recording the position information, the shape of the respective systems can be recorded as a vector pattern, and such pattern may be displayed on the layout chart.

Value of each data in the in-store layout file (D0801) is set upon the creation of the server system 0103, and thereafter updated each time the system is added, changed or removed.

FIG. 10 is a data structure diagram of a studio setting file (D0804). The studio setting file (D0804) records the number of systems (D1001) of the studio system 0111 recorded in the studio setting file. The number of systems (D1001) coincides with the number of studio systems 0111 recorded in the in-store layout file (D0801).

In addition, the number of times and the number of hours the user may use the studio 0107 for each visit are also recorded. If a user is able to use the studio 0107 as many times as he/she wishes without any restriction, a specified user will occupy the studio 0107 and may impair the convenience of other users, and this information is used for restricting the number of times and number of hours in a single visit.

Here, when comparing weekdays and holidays, the number of visitors is relatively few on weekdays, and the repeated use of the studio 0107 by a single user would most likely not become an interference of other users. Thus, four types of information; namely, available number of uses (weekdays) (D1002), available time (weekdays) (D1003), available number of uses (holidays) (D1004), and available time (holidays) (D1005) are recorded in order to enable different usage restrictions on weekdays and holidays.

Incidentally, although there are only the two categories of weekdays and weekends in this embodiment, for instance, it would be easy to record different available number of uses and available time for New Years, spring vacation and other occasions and to restrict the usage in further detail.

Further, when a user is to use the studio, such user will operate the studio system 0111 and select a photo shoot course (for instance, "dance and photo shoot", "game and photo shoot", etc.). Here, if the user does not select a course for a long period of time, since no one else will be able to use the studio, a studio course selection time (D1006) is recorded in order to avoid this kind of situation. For example, when a value of "30" is set in the studio course selection time (D1006), if the user does not select the photo shoot course within 30 seconds, processing is performed for the system to automatically select the standard course. Incidentally, this kind of processing for performing time restriction is not limited to the selection of the photo shoot course, and a data item for recording the time limit may be provided as necessary, or a time limit may be provided based on the classification of holidays, weekdays and so on.

The studio setting file (D0804) also records other information including a system ID (D1007), an execution status (D1008), a studio type (D1009), a sub PC 1 execution status (D1010), and a sub PC 2 execution status (D1010) for each studio system 0111.

The system ID (D1007) stores identifying information unique to the respective studio systems 0111, and records the same value as the system ID of the in-store layout file (D0801). The execution status (D1008) records identifying information such as when the system is unactivated (a state where the system is not subject to a failure but has not yet been activated), subject to an error (a state where a failure occurred and of waiting for measures to be taken), empty (a state where the system is activated but not used by a user), and in operation (a state where the system is activated and used by a user). Each state is updated in real time based on the periodical referral from the server system 0103 to the respective systems, and the status is displayed on the layout chart of the counter menu screen.

The studio type (D1009) is data for recording the type of respective studios 0107 (types of "normal studio", "action studio", and "baby studio"). Here, an action studio is a studio 0107 with equipment for shooting photos of children jumping or the like, a baby studio is a studio 0107 for shooting photos of babies lying down, and a normal studio is a studio 0107 for shooting photos of children dancing or playing games. Incidentally, the types of studio 0107 are not limited to these three, and the number of types may be suitably decided according to the equipment of the studio 0107.

The sub PC 1 execution status (D1010) and the sub PC 2 execution status (D1011) are data for respectively managing the execution status of two auxiliary PCs configuring a part of the studio system 0111. In other words, for instance, the normal studio among the studio system 0111 shoots photos using three photo cameras. This embodiment adopts a method of commanding the photo shoot by one PC controlling each camera (in other words, a total of three PCs).

These three PCs are named a main PC, a sub PC 1, and a sub PC 2 in correspondence to their roles. The foregoing execution status (D1008) is information showing the execution status of the portion of the system that is controlled with the main PC, and the sub PC 1 execution status (D1010) and the sub PC 2 execution status (D1011) are information showing the execution status of the portions of the system that are controlled with the sub PC 1 and the sub PC 2, respectively. Specifically, identifying information such as when the portion of such system is unactivated (a state where the system is not subject to a failure but has not yet been activated), subject to an error (a state where a failure occurred and of waiting for measures to be taken), and in operation (a state where the system is activated) is recorded.

Among the respective data described above, the number of systems (D1001), the system ID (D1007), and the studio type (D1009) are set at the creation of the server system 0103, and thereafter updated each time the studio system 0111 is added, changed or removed.

Further, the available number of uses (weekdays) (D1002), the available time (weekdays) (D1003), the available number of uses (holidays) (D1004), the available time (holidays) (D1O5), and the studio course selection time (D1006) are set at the creation of the server system 0103, and thereafter updated as needed for operating the store. The execution status (D1008), the sub PC 1 execution status (D1010), and the sub PC 2 execution status (D1011) are updated in real time based on the periodical referrals from the server system 0103 to the respective systems.

FIG. 11 is a data structure diagram of a sample photo file (D0805). The sample photo file (D0805) records a data count (D1101) of the sample photos recorded in the file, and various information such as an image ID (D1102), a studio type (D1103), a camera number (D1104), a chroma key pattern (D1105), and an image data (D1106) are recorded in the number of the data count (D1101).

The image ID (D1102) is data for uniquely identifying the sample photos, and data of the sample photos is recorded in the image data (D1106) using an image recording system such as a bitmap.

The studio type (D1103) is data showing which studio among the normal studio, action studio and baby studio was used to take the sample photo, and the camera number (D1104) is data showing which camera among the three cameras was used for the photo shoot.

The chroma key pattern (D1105) is data showing which chroma key pattern the sample photo used to obtain the resulting photo. When a chroma key is not used, a code showing such non-use, for instance, "−1" is set, and, when a chroma key is used, a chroma key pattern number; specifically, an image ID of the editing image file (D0808) is set.

FIG. 12 is a data structure diagram of a photo result image file (D0806). The photo result image file (D0806) stores a data count (D1201) of the photo result images recorded in the file, and various information such as an image ID (D1202), studio type (D1203), camera number (D1204), background curtain identification (D1205), necessity of printing (D1206), image data (D1207), command date of printing (D1208), number of prints (D1209), print size (D1210), start time of printing (D1211), and print status (D1212) are recorded in the number of the data count (D1201).

The image ID (D1202) is data for uniquely identifying the photo result images, and data of the photo result images is recorded in the image data (D1206).

The studio type (D1203) is data showing which studio among the normal studio, action studio and baby studio was used to take the photo result images, and the camera number (D1204) is data showing which camera among the three cameras was used for the photo shoot.

The background curtain identification (D1205) is data showing what kind of background curtain was used in the photo shoot of the photo result image, and is referred to upon performing chroma key in the edit processing. When a background curtain that is inappropriate for the chroma key is used, a code showing such inappropriateness, for instance, "−1" is set, and, when a unicolored background curtain capable of performing chroma key is used, information showing the background color; for instance, the RGC value of the background color is set.

Further, various types of information such as the necessity of printing (D1206), the command date of printing (D1208), the number of prints (D1209), the print size (D1210), the start time of printing (D1211), and the print status (D1212) are information to be recorded and used when printing images.

The respective data of the photo result image file (D0806) are sent to the server system 0103 via the communication line 0114 each time a photo shoot is performed in the studio system 0111, and newly recorded in the photo result image file (D0806).

At the time data is to be newly recorded, the value of the necessity of printing (D1206) is "0" (not to be printed), and a default value is set in the command date of printing (D1208) and 0 is set in the number of prints (D1209). Thereafter, upon receiving information from the satellite system 0110 indicating that the image has been selected for storage, data of such image is copied to the album image file (D0807). Further, upon receiving information from the satellite system 0110 indicating that the data of such image has been selected for printing, the necessity of printing (D1206) is updated to "1" (to be printed). Moreover, when designation processing of the print size and number of prints is thereafter performed in the satellite system 0110, upon receiving the notification of results, the current date is set in the command date of printing (D1208) regarding the image, a value of one or greater is set in the number of prints (D1209), the print size ("1": L size, "2": 2L size, "3": A1 size, "4": card size, etc.) designated by the user is set in the print size (D1210), a default value of "999999" is set in the start time of printing (D1211), and "1" (print queue) is set in the print status (D1212).

Thereafter, upon receiving information from the printer system 0105 indicating that the printing of the image as started, for instance, "130506" (meaning printing started as 13 hours, 5 minutes, 6 seconds) is set in the print start time (D1211), and "2" (print start) is set in the print status (D1212). The print status (D1212) is updated to "3" (print complete and waiting to deliver to user) upon receiving information indicating that the printing of the image is complete, and finally updated to "4" (delivered) upon receiving information from the counter system 0104 indicating that the checkout has been completed for the image.

Incidentally, since the data structure of the album image file (D0807) is the same as the photo result image file (D0806) as described above, the detailed explanation thereof is omitted. The respective data other than the image data of the album image file (D0807) are updated to have the same contents as the respective data of the same image ID of the photo result image file (D0806).

FIG. 13 is a data structure diagram of an IC card registration information file (D0809). The IC card registration information file (D0809) stores the number of registered operators (D1301) showing the number of issued operator cards and the number of registered player cards (D1302) showing the number of issued player cards, and operator information and player information are recorded in the same number as the respective data counts.

As the operator information, various types of information such as an operator ID (D1303) for uniquely identifying operator cards, an effective flag (D1304), an operator name (D1305), and an operator type (D1306) are recorded.

The effective flag (D1304) stores an identification showing whether the card is effective or has been disabled because it has been lost or due to other reasons (for instance, effective: "1", invalid: "2"). Further, the operator type (D1306) stores information for identifying whether the operator is a system administrator authorized to set or change the system environment, or a general operator authorized to perform ordinary business operations such as handling visitors, printing, checkout and so on. Incidentally, the authority of the system administrator and the general operator to perform various processes is a matter that may be defined for each system. In this embodiment, processing requiring the authority of the system administrator (processing for setting the environment of the respective systems and the like) will not be explained in particular.

As player information, various types of information such as player ID (D1307) for uniquely identifying player cards, effective flag (D1308), player name/card number (D1309), log count of use (D1310), date of use (D1311), number of photos taken (D1312), and image ID (D1313) are recorded.

The effective flag (D1308) stores identification showing whether the card is effective on the current day, whether the use of the card on the current day has finished, and whether the card is effective but checkout processing has not been performed (for instance, effective: "1", invalid (used): "2", checkout waiting: "9"). The player name/card number (D1309) stores the name and card number of the user input by the operator during the visitor processing described later. The log count of use (D1310) shows the quantity of the date of use (D1311), the number of photos taken (D1312) and the image ID (D1313) that is recorded. Then, the date of use (D1311) stores the date the player visited the store, the number of photos taken (D1312) stores the number of images (photos) photographed on the respective days the user visited the store, and the image ID(D1313) stores the image ID of the photographed images. The stored image ID corresponds to the image ID of the images recorded in the photo result image file (D0806) and the album image file (D0807).

The foregoing was the explanation regarding the configuration of the server system 0103.

FIG. 6 is a block diagram of the counter system 0104. The counter system 0104 comprises a PC body 0600, a touch panel counter monitor 0603, and IC card R/Ws 0606a and 0606b.

Operation of the counter system 0104 is permitted by a working staff (operator) inserting an operator card (operator's IC card) into the IC card R/W 0806a, and actual operations are made by touching the monitor 0603 with one's finger. For instance, it is possible to input information of the visiting user and create an IC card inserted into the IC card R/W 0806b as a player card, and display the usage status of the respective systems on the monitor 0603.

User information and the like input into the counter system 0104 is sent to and received from another system such as the server system 0103 via the communication interface 0607 and the communication line 0114.

FIG. 7 is a block diagram of the printer system 0105. The printer system 0105 comprises a PC body 0700, a touch panel printer monitor 0703, an IC card R/W 0706 and one or more printers 0710a, 0710b, 0710c (printers 0710a, 0710b, 0710c are hereinafter collectively referred to as a printer 0710). The reason a plurality of printers 0710 are connected is to shorten the print queue time by serially printing images using a plurality of printers 0710, and based on circumstances where commercially available printers are only able to print sizes up to the A3 size, and, for instance, special printers are required for printing images in the A1 size.

Operation of the printer system 0105 is permitted by a working staff (operator) inserting an operator card (operator's IC card) into the IC card R/W 0706, and actual operations are made by touching the monitor 0703 with one's finger. For instance, it is possible to perform operations such re-printing (re-execution of printing) when a failure occurs during printing. Incidentally, in this embodiment, same operations that can be performed with the printer system 0105 (for instance, reprinting) are enabled by using the counter system 0104. Therefore, use of the printer system 0105 is limited to cases when the counter system 0104 is performing checkout processing or setting/updating the system environment of the printer system 0105.

The processing status of the printer system 0105 is sent to and received from another system such as the server system 0103 via the communication interface 0707 and the communication line 0114.

The IC cards (player card and operator card) used in this embodiment are now explained.

Figure 14A:
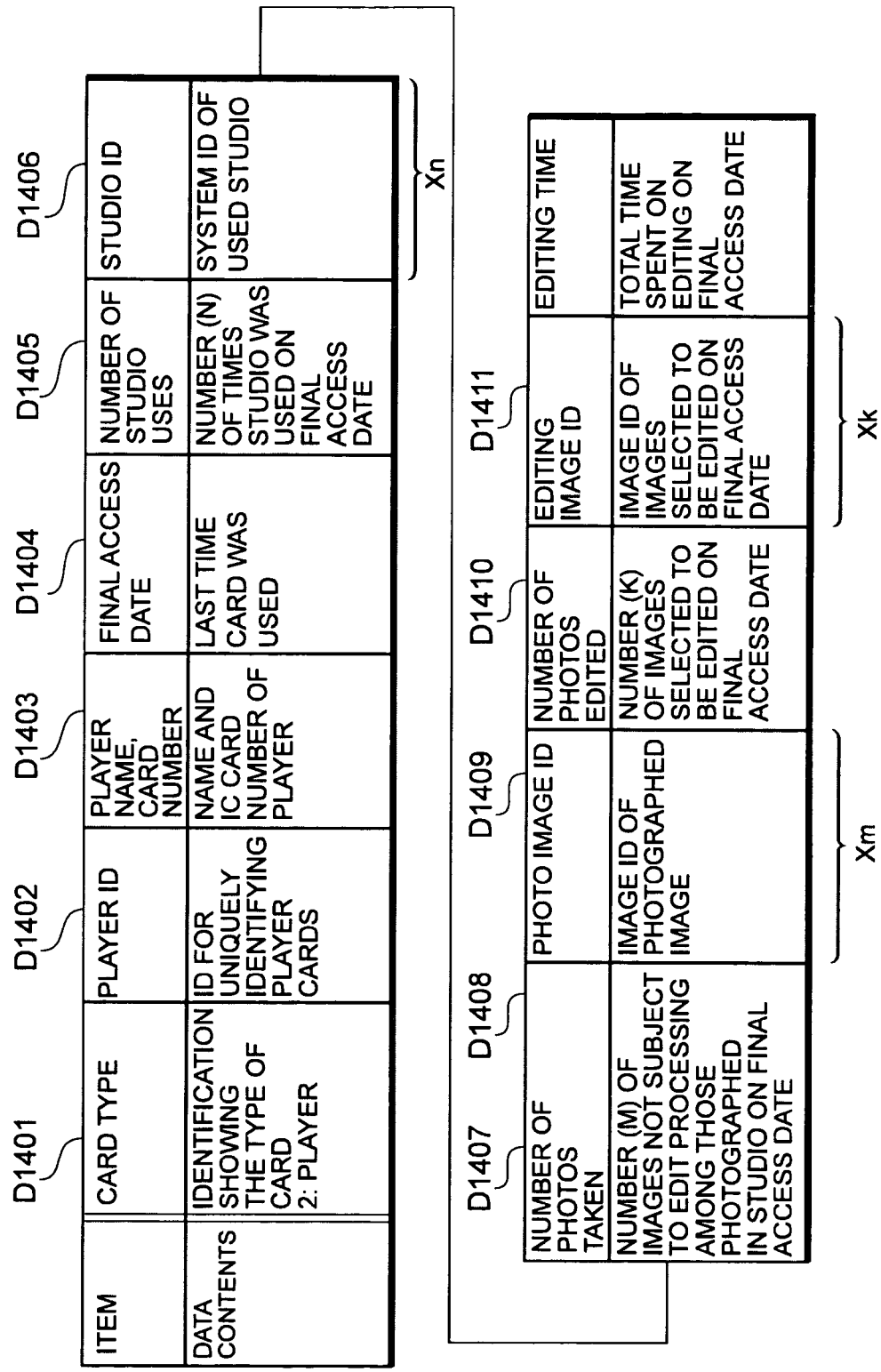
FIG. 14A is a data structure diagram of a player card used in the automatic photo studio according to an embodiment of the present invention.
Figures 14B, 15:
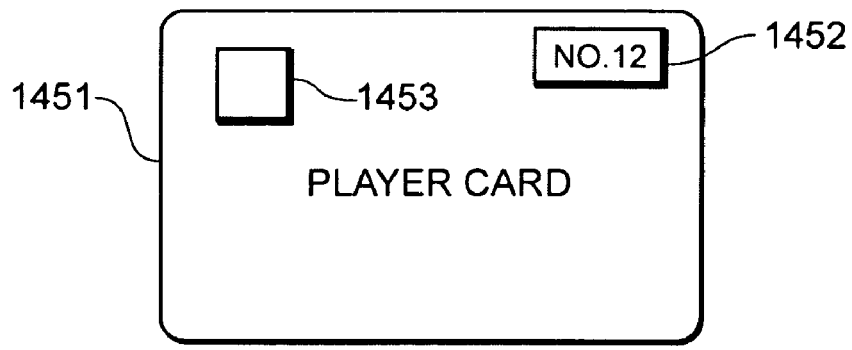
FIG. 14B is a schematic configuration of a player card used in the automatic photo studio according to an embodiment of the present invention.
FIG. 15 is a data structure diagram of an operator card used in the automatic photo studio according to an embodiment of the present invention.

FIG. 14B shows the schematic configuration of a player card. The player card 1451 is a so-called IC card in which an IC chip 1453 is affixed or embedded, and there is no particular difference in comparison to standard IC cards. A part of the player card 1451 is inscribed with an IC card number 1452 as a number for uniquely identifying the IC card in the store. The IC card number 1452 is mainly used by the working staff to manage the card, for instance, for visually confirming whether the card given to the user has been returned. Incidentally, the general shape of the operator card is the same as the player card 1451.

FIG. 14A shows the data configuration diagram of a player card recorded in an IC chip 1453. The player card stores a card type (D1401) as an identification code showing that the IC card is a player card, a player ID (D1402) as a code for the respective systems to uniquely identify the player card, and various types of attribute information of the player. The player ID (D1402), for instance, can be created by combining the year, month, day, hour, minute, and second the player card was created.

As attribute information of the player, a player name/card number (D1403) (setting is the same as the player name/card number (D1309) of the IC card registration information file (D0809)), photo shoot information of the player's last visit, and so on are recorded.

Here, a card number is the IC card number 1452 indicated on the player card input by the working staff in the processing for issuing the player card described later, and recorded as is. The card number is displayed together with the player name in various information display screens, and is used for the working staff to specify one player among players with the same name.

As the photo shoot information, last access date (D1404) as the last (most recent) time the player card was used; that is, the last time the player visited the store, number of uses of the studio 0107 (D1405) on the last access date (D1404), a system ID (D1406) of the used studio 0107, number of images (D1407) not yet subject to edit processing (that is, images to be subject to edit processing in the future) among the images photographed in the studio 0107 on the last access date (D1404) and its image ID (D1408), number of selected images (D1409) to be edited on the last access date (D1404) and its image ID (D1410), and a total time (D1411) of the time on editing on the last access date (D1404).

Incidentally, a player card may be a card that is newly created each time a user visits the store for use only on that day, but it may also be a card that is created when a user visits the store for the first time, and be taken home by the user and brought back on the next visit as a so-called member card. Further, the card may be created as a member card only for users who wish to take home the card.

FIG. 15 shows the data structure of the operator card. The operator card stores a card type (D1501) as an identification code showing that the IC card is an operator card, an operator ID (D1502) as a code for uniquely identifying operator cards, and an operator name (D1503).

The card type (D1501) stores a code showing whether the operator is a system administrator or a general operator according to the execution authority of such operator.

Figure 16:
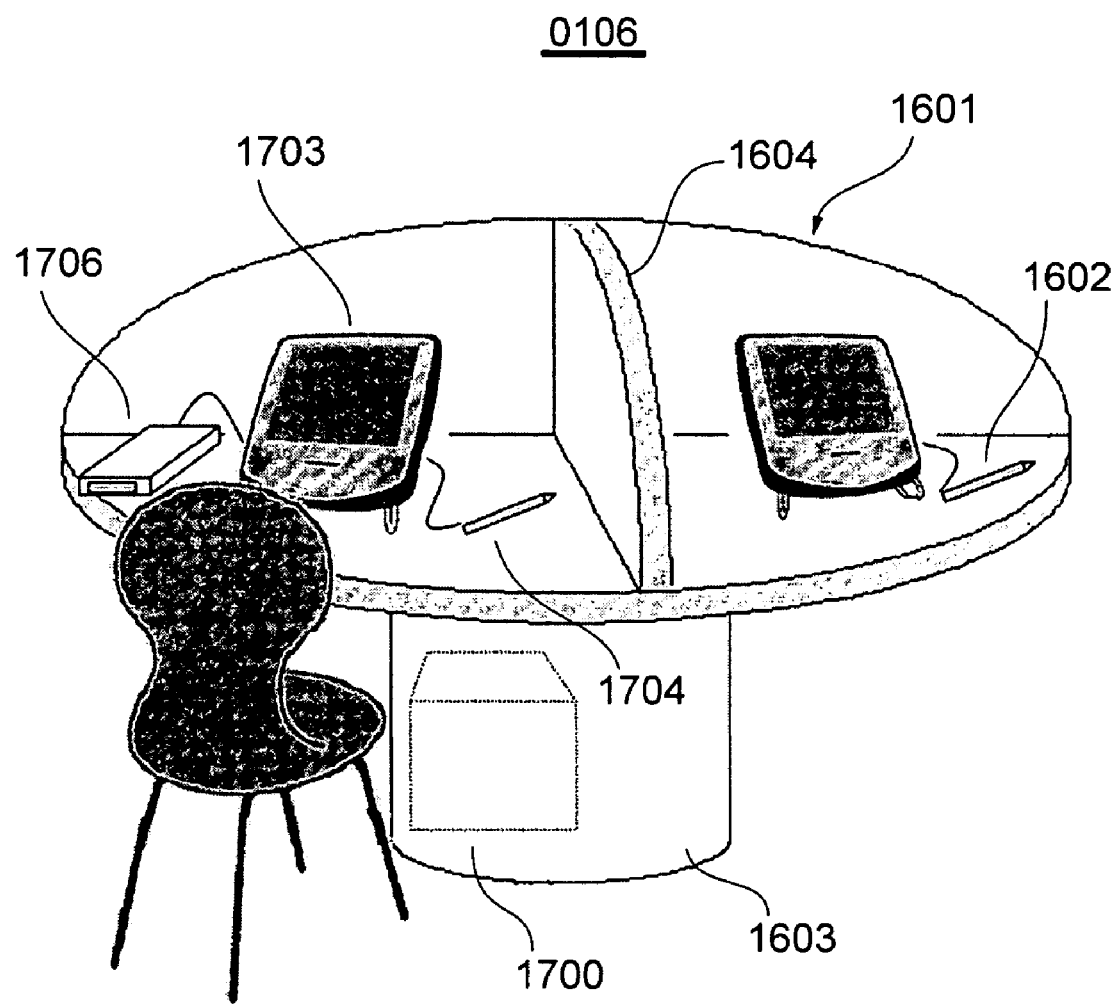
FIG. 16 is an explanatory diagram showing an obliquely downward view of a satellite of the automatic photo studio according to an embodiment of the present invention.

FIG. 16 shows an obliquely downward view of the satellite 0106. Further, FIG. 17 is a block diagram of the satellite system 0110.

The satellite 0106 is a facility used by users to wait for the studio 0107 to become available, and edit the photographed images. In this embodiment, as shown in FIG. 16, a round table is partitioned roughly equally into quarters with a partition 1604, and one or more chairs and a satellite system 0110 are respectively provided to the partitioned spaces.

In this embodiment, a PC body 1700 of the satellite system 0110 is housed in a support 1603 of the table 1601, and a touch panel monitor 1703, a touch pen 1704, and an IC card R/W 1706 are mounted on a top face 1602 of the table 1601. The PC body 1700 and the touch panel monitor 1703, touch pen 1704, and IC card R/W 1706 are connected communicably via a wired or wireless system.

Figure 17:
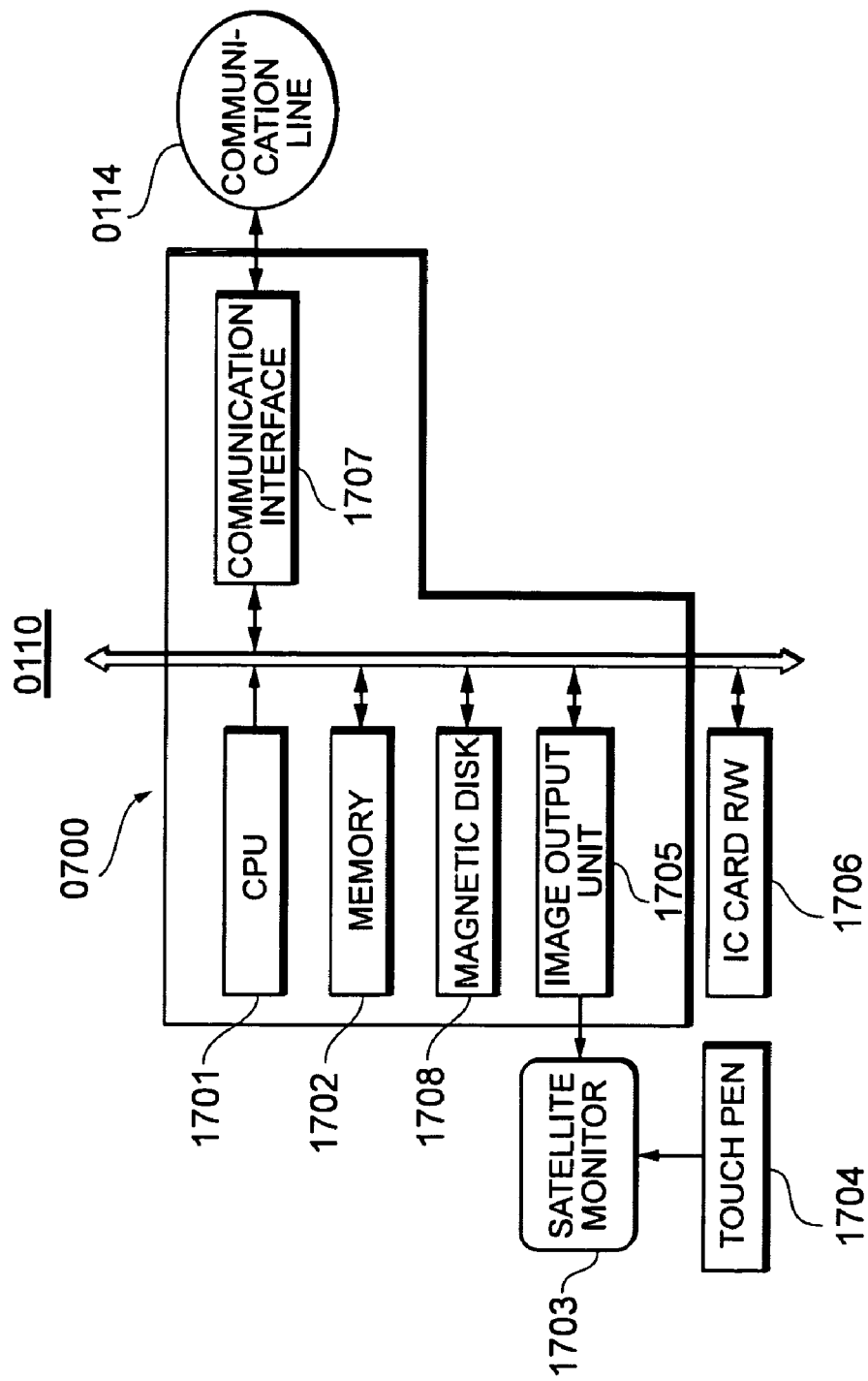
FIG. 17 is a block diagram of a satellite system of the automatic photo studio according to an embodiment of the present invention.

As shown in FIG. 17, the satellite system 0110 comprises a PC body 1700, a touch panel monitor 1703, a touch pen 1704, and an IC card R/W 1706.

A user can use and operate the touch pen 1704 to display the photo shoot method in the studio 0107 on the touch panel monitor 1703, or command the editing or printing of the photographed images. Incidentally, a finger may be used to perform such operations without using the touch pen 1704. In such a case, since the touch pen will not be required, there will be great advantages for the store since it is possible to reduce costs in creating the system, and there is no need to worry about the malfunction or loss of such touch pen. Nevertheless, it is necessary to keep in mind that some users feel uncomfortable with touching a monitor screen that has already been touched by others.

The memory 1702 stores the pattern and thickness of lines to be drawn in editing the images, various stamp images prepared in advance to be synthesized with images, samples of the print layout, various guidance messages (sound and text information) and the like. The foregoing information is stored as an editing image file (D0808) in the magnetic disk 0508 of the server system 0103, and can be forwarded to the satellite system 0110 as necessary when activating the satellite system 0110 or updating the recorded contents of the magnetic disk 0508.

The usage status of the satellite system 0110 is sent to and received from another system such as the server system 0103 via the communication interface 1707 and the communication line 0114.

The configuration and function of the studio 0107 is now explained. As described above, the studio 0107 is classified into three categories based on the use; namely, a normal studio, an action studio, and a baby studio, and the type of equipment installed is slightly different.

Here, a normal studio is a photography studio targeting children who are of a certain age or older who can change their standing position or strike poses based on their parent's instructions. An action studio targets children who are the same as or slightly older than the children to use the normal studio, and is a studio for shooting poses with movement such as jumping off a jump board. Meanwhile, a baby studio is a studio to be mainly used for taking photos of babies, and is equipped with equipment for shooting photos with the child lying down.

As described above, although the usage of the respective studios is slightly different, all studios have the same objective of taking photos of children, and are all equipped with basically the same equipment as a photography studio such as photo cameras, lighting equipment and so on.

The configuration and function of the respective studios are now explained.

Figure 18A:
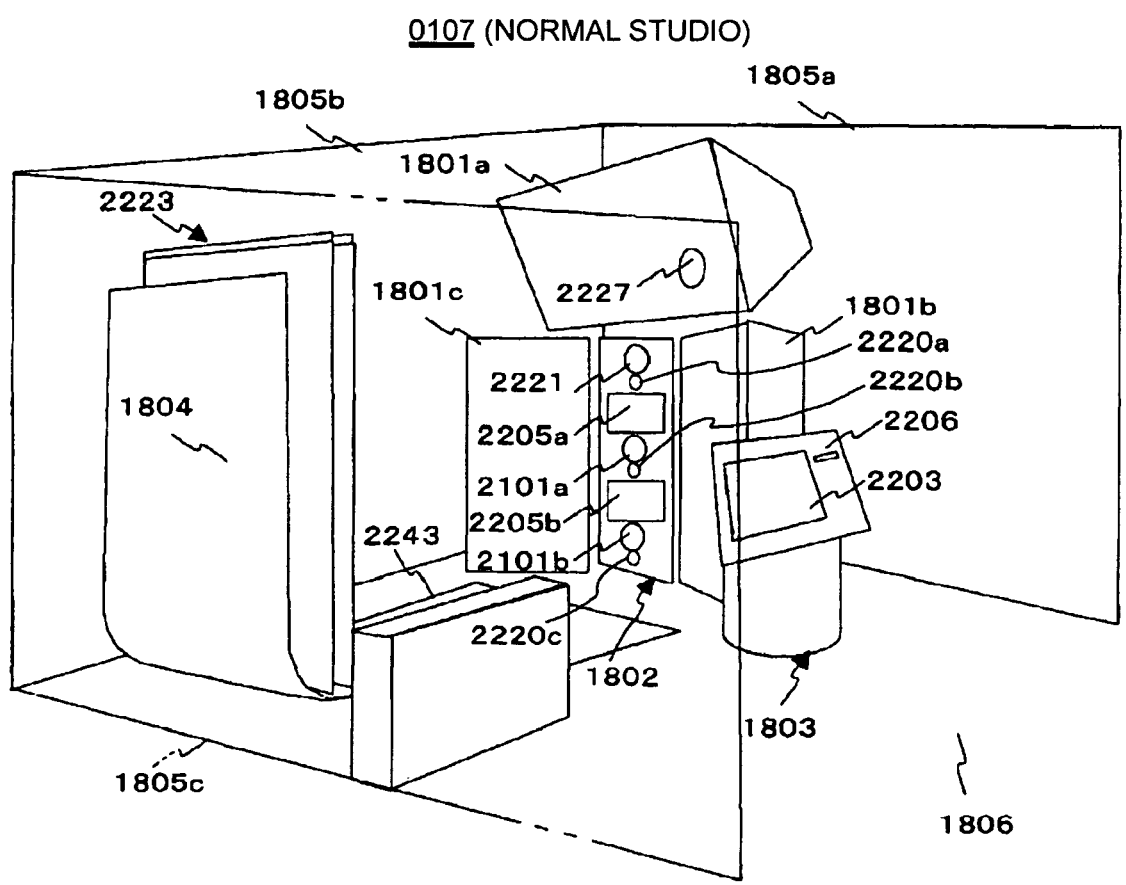
FIG. 18A is an explanatory diagram showing an obliquely downward view of a normal studio of the automatic photo studio according to an embodiment of the present invention.

FIG. 18A shows an obliquely downward view of a normal studio 0107. The studio 0107 is surrounded in three directions by walls 1805a, 1805b, 1805c so that people cannot look inside, and entrance to and exit from the studio is conducted via an entrance door 1806. An in-use lamp 2227 is installed on the wall 1805c near the entrance door 1806, and the lamp is turned on during the photo shoot, and the lamp is turned off when the photo shoot is over. Therefore, users will be able to know whether the studio is empty from the outside based on the flashing of the in-use lamp 2227.

Incidentally, in FIG. 18A, although the wall 1805c is made transparent to show the inside of the studio, this does not mean that the wall 1805c is a transparent wall, and was merely needed for drawing the diagram. The wall 1805c may be formed of a transparent glass or the like, but typically should be made from a non-transparent wall material.

Inside the normal studio 0107, near one end thereof, a camera box 1802 housing a photo camera 2221 and the like, and a lighting system 2222 (front strobe light 1801a, right strobe light 1801b, left strobe light 1801c, and surface light source 2222a not shown in FIG. 18A that is on at all times) for illuminating the user as the subject are installed, and, near the other end thereof, a horizontal curtain 1804 and a background control mechanism 2223 are installed. The space between the camera box 1802 and the horizontal curtain 1804 is the photo shoot space, and the user (usually a child) as the subject enters the photo shoot space, and strikes a pose according to the mother's instructions for the photo shoot. Incidentally, the respective studios including the normal studio 0107 may also be configured by comprising a ceiling strobe light installed in the ceiling as the lighting system 2222.

A console 1803 is placed in front of the photo shoot space, and the console 1803 is mounted with a touch-panel operation monitor 2203 for the user (usually the mother) to decide the photo shoot mode described later, or confirm the subject's pose.

Further, the console 1803 is also mounted with an IC card R/W 2206. As a result of the user inserting a player card into the IC card R/W 2206, the user is able to use the studio system 0111 of the normal studio 0107, and the in-use lamp 2227 is turned on.

The camera box 1802 houses three photo cameras 2221, 2101a, 2101b for shooting the subject. For a photo shoot in the normal studio 0107, two cameras; namely, the top and bottom cameras (2221 and 2101a, or 2101a and 2101b) are simultaneously used at all times. In the case of children, even if instructed by the mother, it is not always the case that the child will move to the optimal photo shooting position and strike the optimal pose. Thus, by using two cameras (top and bottom cameras) while slightly changing the angles to shoot the photos, the possibility of shooting a good photo with either camera can be increased.

The camera box 1802 also houses three monitor cameras 2220a, 2220b, 2220c for shooting the footage of the subject in real time. Each monitor camera is installed in the vicinity of the three photo cameras, respectively, and shoots roughly the same image as the image to be shot by the photo cameras 2221, 2101a, 2101b. In this embodiment, the photo camera 2221 and monitor camera 2220a, the photo camera 2101a and monitor camera 2220b, and the photo camera 2101b and monitor camera 2220c are installed to photograph roughly the same image (provided that the monitor camera is slightly more wide angled).

The footage (video picture) projected on the monitor camera 2220a, 2220b, 2220c is displayed on three windows of the operation monitor 2203, and, by the mother confirming the footage, she will be able to confirm whether the child is positioned within the photographic angle of view, and instruct the child to move forward, backward, left or right or to strike a certain pose.

Further, the footage projected on the monitor cameras 2220a, 2220b, 2220c is also displayed on either of the two confirmation monitors 2205a, 2205b housed in the camera box 1802. The purpose of this is to show the footage to the child as the subject to increase his/her interest.

As the photo shoot background, the user can select and use a background of one's liking from a plurality of roll curtains set in the background mechanism 2223, or use a horizontal curtain 1804 colored in a color that can be easily subject to chroma key in a state of the roll curtain fully rolled up.

Figure 18B:
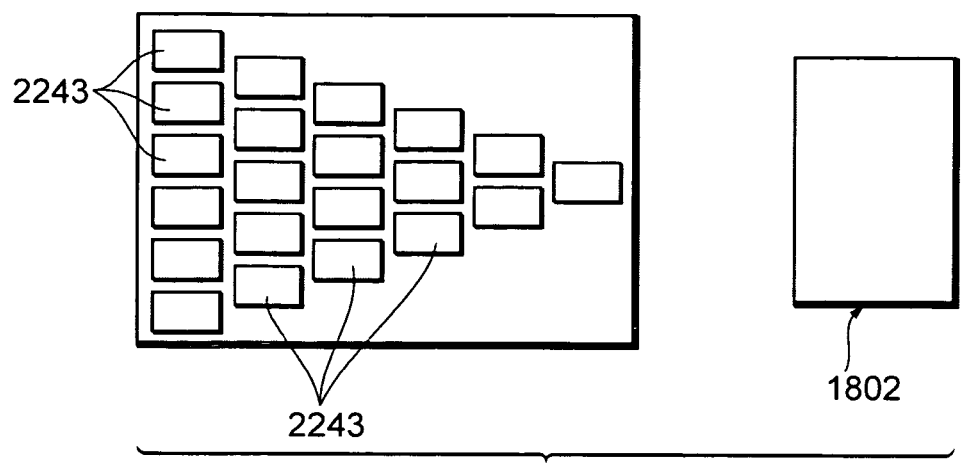
FIG. 18B is an explanatory diagram of the relevant parts showing a view from immediately above the photo shooting space of a normal studio of the automatic photo studio according to an embodiment of the present invention.

FIG. 18B shows a view from immediately above the photo shooting space of a normal studio. A plurality of footswitches 2243 (in this explanation, the pressure sensor switch is simply referred to as a footswitch) are provided to the floor of the studio, and a soft cover is placed over the footswitches so that the child as the subject will not trip over such footswitches.

The footswitches 2243 are installed in a fan shape in which the quantity thereof increases with distance from the camera box 1802. This is because the photographic angle of view widens with distance from the camera box 1802.

Each footswitch 2243 is connected to a footswitch controller 2242 of a studio main PC 2200 of the studio system 0111, detects the pressure from the weight of the subject, and notifies this together with the position information of the footswitch 2243 to the studio main PC 2200. Thereby, the studio main PC 2200 will know where the subject is in the photo shoot space.

As position information of the footswitch 2243, for instance, an identification number of the position of the respective footswitches can be given, and this identification number, distance information between the camera box 1802 and the footswitch, and angle information of the installation site of the footswitch with the front direction of the camera box 1802 as the reference can be collectively recorded as a set in the magnetic disk 2208.

Further, when the footswitch 2243 is not given a function of notifying the position information, the same effect can be obtained by separately allocating the signal reception unit of the studio system 0111 to the respective footswitches 2243.

Figure 19:
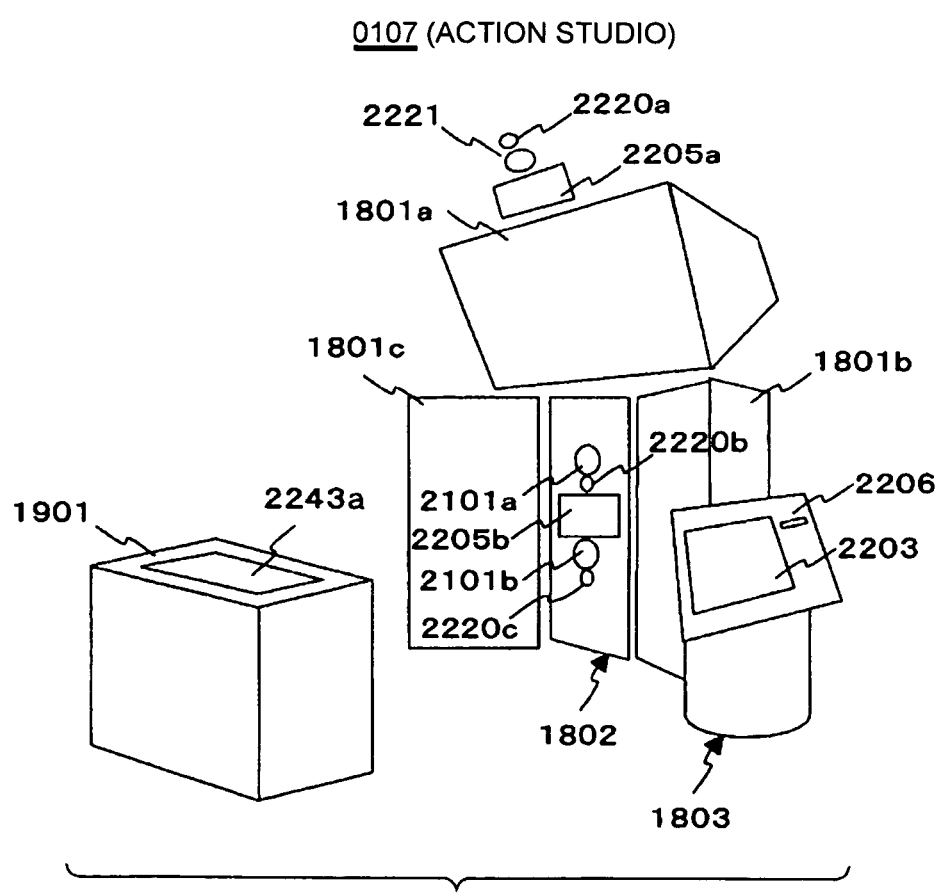
FIG. 19 is an explanatory diagram showing an obliquely downward view of an action studio of the automatic photo studio according to an embodiment of the present invention.

FIG. 19 shows an obliquely downward view of an action studio 0107. The main difference with the normal studio is that only two photo cameras 2101a, 2101b are stored in the camera box 1802, and the other photo camera 2221 is installed near the ceiling.

The action studio 0107 is equipped with a camera near the ceiling in order to take photos of the moment a child jumps up from a jump board 1901, or strikes a pose of looking up at the ceiling, and so on. Thus, the monitor camera 2220a corresponding to the photo camera 2221 is also installed in the vicinity of the ceiling.

A footswitch 2243a is installed on top of the jump board 1901, and is blanketed with a soft cover. The footswitch 2243a detects the pressure when the child as the subject gets on and jumps up and down, and notifies the pressure value to the studio main PC 2200 of the studio system 0111. The studio main PC 2200 compares the notified pressure value with a threshold value that is preset in the magnetic disk 2208 in order to determine whether the child is merely standing or has jumped.

Figure 20A:
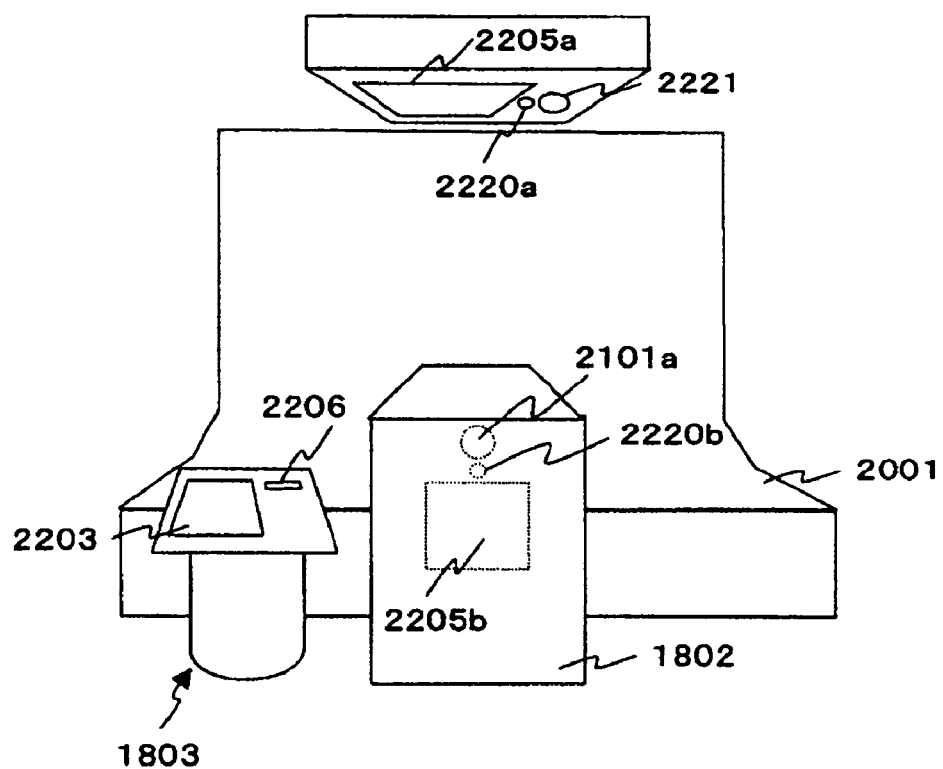
FIG. 20A is an explanatory diagram showing a perspective view of a baby studio of the automatic photo studio according to an embodiment of the present invention.

FIG. 20A shows an obliquely downward view of a baby studio 0107. The main difference with the action studio is that there is no jump board 1901, and a photo shoot bed 2001 is installed.

In other words, in the baby studio 0107, photos are taken in a state where the baby is laid on the photo shoot bed 2001. Thus, the console 1803 is also placed near the photo shoot bed 2001 so that the mother can secure the safety of the baby.

Further, the baby studio 0107 is equipped with only two photo cameras. Since the baby as the anticipated subject hardly moves, the photo shoot will be possible with two cameras; namely, the camera 2221 for shooting photos of a pose looking up, and the camera 2101a for shooting photos of a pose facing sideways.

Figure 20B:
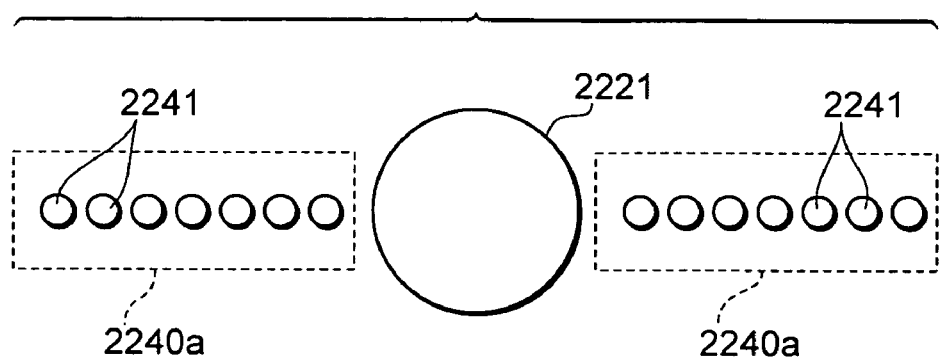
FIG. 20B is an explanatory diagram zooming in on the vicinity of the photo camera used in a studio of the automatic photo studio according to an embodiment of the present invention.

FIG. 20B is an enlarged view of the vicinity of the photo camera installed in the respective studios. Incidentally, the vicinity of other photo cameras 2101a and 2101b is of the same structure.

A plurality of minute LED lamps 2241 are disposed linearly on either side of the photo camera 2221, and is forming a visual line command lamp 2240a as a whole. When shooting with the photo camera 2221, prior to the photo shoot, the LED lamps 2241 positioned the farthest from the photo camera 2221 on either side light up, and, after the lapse of a fixed period of time (for instance, 0.1 seconds), the adjacent LED lamps 2241 closer to the photo camera 2221 light up, and the LED lamps 2241 that were lit up previously are turned off. As a result of this operation being conducted in succession, the human eye will see the lights of the left and right LED lamps 2241 as though they are gradually approaching the photo camera 2221. Then, after a fixed period of time elapses from the illumination of the left and right LED lamps 2241 closest to the photo camera 2221 (for instance, 0.1 second later), the photo is taken.

By adopting the foregoing method, since the subject's visual line will naturally be focused on the photo camera 2221, it is possible to take a photo with the user looking straight at the camera.

As described above, in this embodiment, although there are three types of studios; namely, a normal studio, an action studio, and a baby studio, the big difference is in the installation site of the equipment and installation state of the auxiliary photo equipment, and the configuration of the computer system is basically the same.

The normal studio is taken as an example to explain the configuration and function of the studio system 0111.

Figure 21:
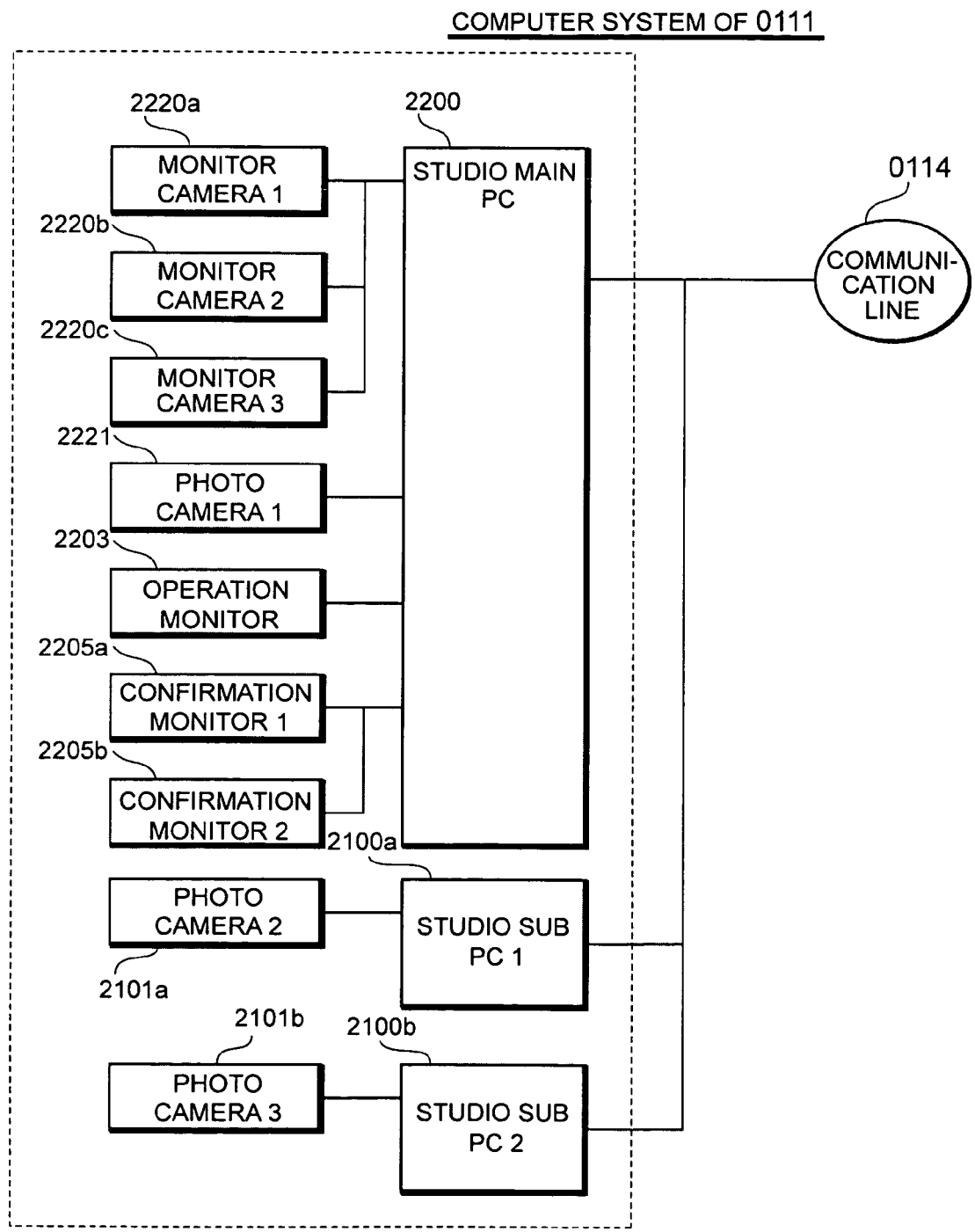
FIG. 21 is a simplified block configuration diagram of the studio system of a normal studio in the automatic photo studio according to an embodiment of the present invention.

FIG. 21 is a simplified block configuration diagram of the studio system 0111. The computer system of the studio system 0111 is configured from a single LAN segment comprising a studio main PC 2200 and two studio sub PCs 2100a, 2100b.

The studio main PC 2200 is connected to three monitor cameras 2220a, 2220b, 2220c, a photo camera 2221, and operation monitor 2203, and two confirmation monitors 2205a, 2205b.

Further, the studio sub PCs 2100a, 2100b are respectively connected to a single photo camera 2101a, 2101b.

When the studio main PC 2200 detects the photo shoot timing, it takes a photo using the photo camera 2221, and, as necessary, sends a command designating the photo shoot time to the studio sub PC 2100a and/or the studio sub PC 2100b via the communication line. When studio sub PC 2100a, 2100b receives the command from the studio main PC 2200, it takes a photo using the photo cameras 2101a, 2101b.

The photographed image is temporarily stored in the magnetic disk or the like of the studio main PC 2200, or the respective studio sub PCs 2100a, 2100b of the studio that shot the photo, and then transferred to the server system 0103.

As described above, the primary function of the studio system 0111 is controlled with the studio main PC 2200, and the studio sub PCs 2100a, 2100b merely function as a so-called remote camera controller. The reason this kind of configuration is adopted is described below.

In other words, in this embodiment, the number of photos to be taken at once is roughly 50 photos, and, since it is necessary to record high-resolution images capable of withstanding printing in A1 size or the like, the data volume of the photographed image will become large. Further, since a chroma key is often used in the photographed image, at any point in time after the photo shoot, processing for separating the subject image (the term subject image as used herein refers to the image in which only the subject is separated/extracted from the background) and the background image. This processing requires the use of a high performance PC since the image size is large, and, if this is to be performed with the satellite system 0110, the performance of the respective satellite system 0110 must be increased disproportionately in comparison to processing to be performed in the other satellite systems 0110. Meanwhile, if the foregoing processing is to be performed with the server system 0103, the load will be concentrated on the server system 0103. Thus, it is desirable that the PCs 2200, 2100a, 2100b of the studio system 0111 respectively perform the processing, and the three photo cameras are respectively controlled with different PCs in order to balance the load, and the photographed images are processed with the respective PCs.

Therefore, if it is possible to overcome the problems such as the performance and cost performance of the PCs, there is no need to create a system using three PCs as in this embodiment, and one studio main PC 2200 may be configured to control all photography equipment.

Configuration of the studio main PC 2200, which is the main constituent element of the studio system 0111, and the respective constituent elements connected thereto (configuration of the studio system 0111 excluding photo cameras 2101a, 2101b and studio sub PCs 2100a, 2100b shown in FIG. 21) is now explained.

Figure 22:
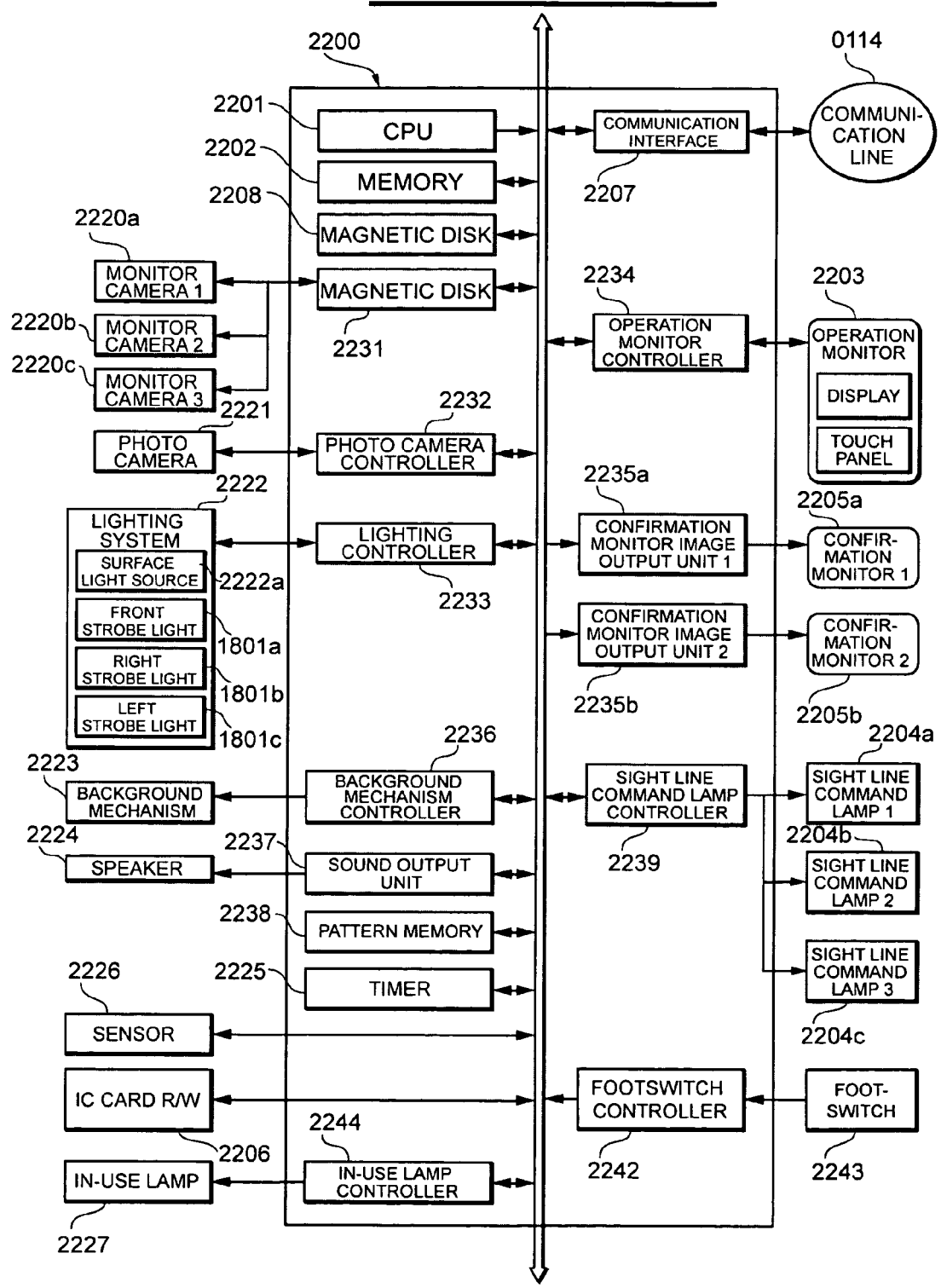
FIG. 22 is a block diagram showing the configuration of the studio main PC of a normal studio and the constituent elements to be connected thereto in the automatic photo studio according to an embodiment of the present invention.

FIG. 22 is a block diagram showing the configuration of the studio main PC 2200 and the constituent elements to be connected thereto. The studio main PC 2200 of the studio system 0111 is connected to the respective constituent elements as described above. The studio main PC 2200 comprises a CPU 2201 for controlling the overall studio main PC 2200 based on a program stored in the memory 2202, a photo camera controller 2232 for commanding a photo shoot to the photo camera 2221 or inputting the photographed images, confirmation monitor image output units 2235a, 2235b for displaying the video picture and the like of the subject on the confirmation monitors 2205a, 2205b, a sound output unit 2237 for outputting sound signals of various guidance messages to the speaker 2224, a pattern memory 2238 storing various guidance messages (sound and text information), and a timer 2225 for measuring the respective operation times.

The studio main PC 2200 also comprises a visual line command lamp controller 2239 for controlling three pairs of visual line command lamps 2240a, 2240b, 2240c disposes respectively on either side of the three photo cameras 2221, 2101a, 2101b.

Image information and the like photographed with the studio system 0111 is sent to and received from another system such as the server system 0103 or the like via the communication interface 2207 and the communication line 0114.

The foregoing was the explanation regarding the constituent elements of the respective systems. Operation of the respective systems is now explained.

Figure 23:
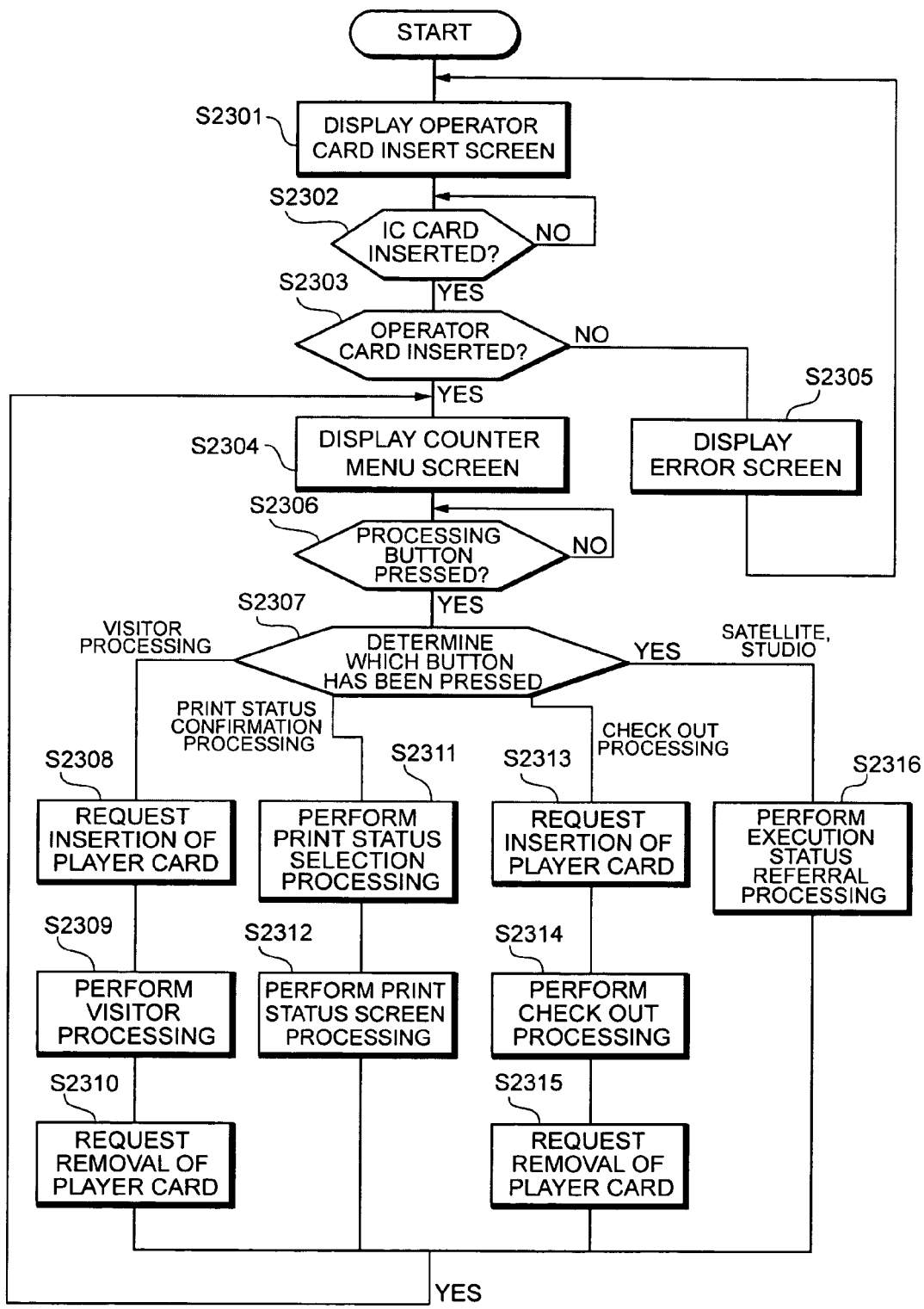
FIG. 23 is a flowchart showing the flow of counter processing of the automatic photo studio according to an embodiment of the present invention.

FIG. 23 is a flowchart showing the outline of processing to be performed by the CPU 0601 in the counter system 0104.

When the counter system 0104 is activated, the CPU 0601 displays a screen prompting the insertion of the operator card on the monitor 0603 (S2301), and waits until the IC card is inserted into the IC card R/W 0606a (S2302). When the IC card is inserted into the IC card R/W 0606a, the CPU 0601 refers to the card type recorded in the IC card (S2303), and, when an IC card other than an operator card has been inserted, it displays a message showing that a wrong card has been inserted on the monitor 0603 (S2305). On this message screen, in addition to the error message, a button image displaying "OK?" and the like is also displayed, and, when this "OK?" button is touched, the CPU 0601 displays a screen prompting the insertion of the operator card once again (S2301).

Incidentally, even when a once-inserted operator card is suddenly removed, the CPU 0601 also display a screen prompting the insertion of an operator card on the monitor 0603 similar to the time when the system is activated.

After the system is activated, if the operator card has been inserted, the CPU 0601 displays a "counter menu screen" on the monitor 0603 (S2304).

Figure 24:
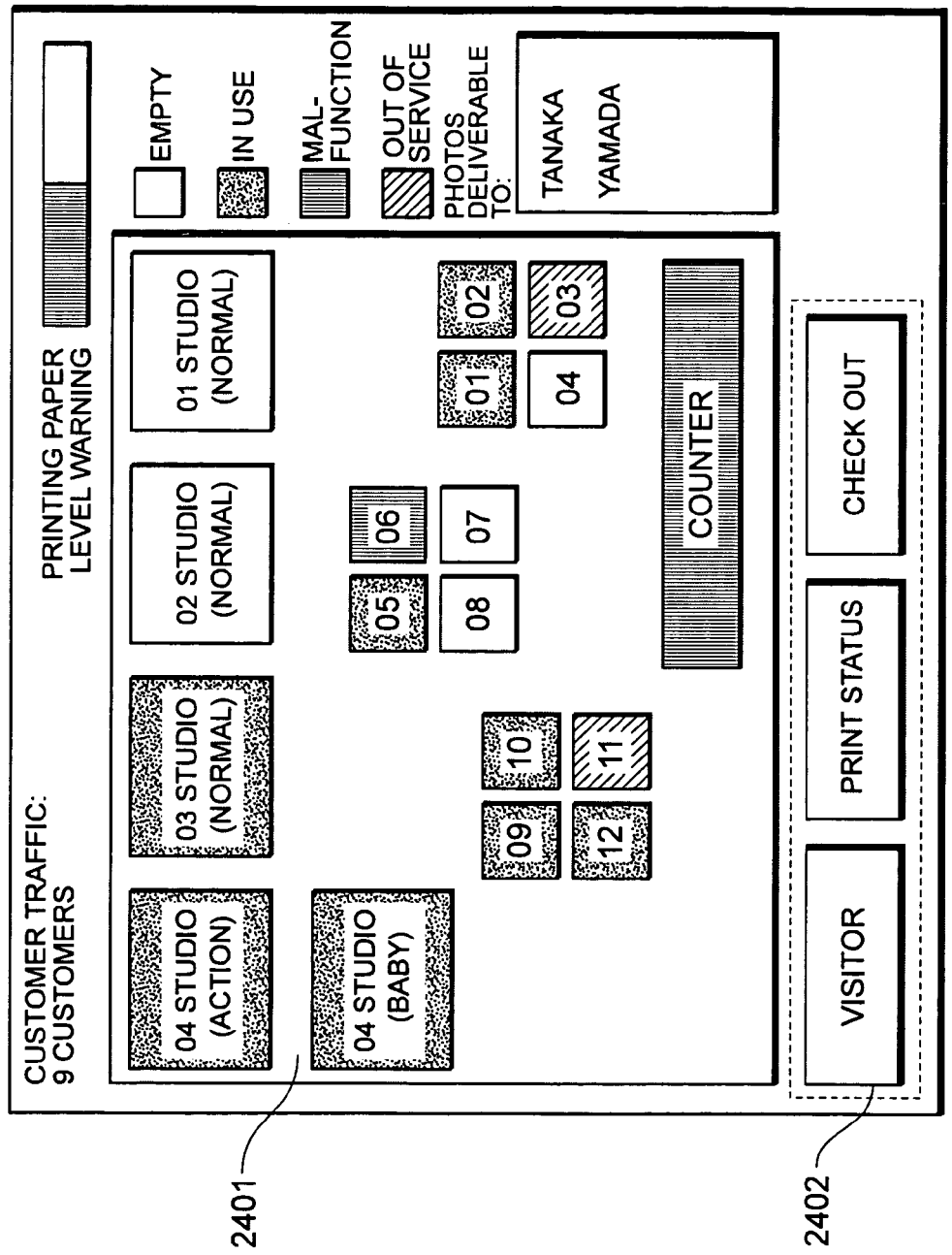
FIG. 24 is an explanatory diagram showing an example of a display screen of the automatic photo studio according to an embodiment of the present invention.

FIG. 24 shows a display example of a counter menu screen. The counter menu screen shows layout information 2401 typically showing the in-store status, one or more processing buttons 2402 indicating text such as "visitor", "print status", and "checkout", and other information.

The layout information 2401 contains a figure representing the in-store studio 0107 and a figure representing the satellite 0106 which are displayed in a positional relationship that approximately coincides with the actual arrangement in the store. The figure representing the studio 0107 displays the studio name, and the figure representing the satellite 0106 shows the satellite name.

Since information for displaying the above is recorded in the in-store layout file (D0801) of the server system 0103, the CPU 0601 is able to acquire necessary information from the server system 0103 via the communication line 0114, and edit and display such information.

Further, the execution status of the satellite 0106 and the studio 0107 is displayed in different colors. In other words, differences in the execution status such as "unactivated", "error", "empty", "in-use" and so on are displayed with different colors in different shapes, and the explanation (explanatory note) of the respective colors is displayed. The execution status of each system can be acquired from the satellite usage file (D0803), studio setting file (D0804) and so on. Based on a color-coded display, the working staff can instinctively distinguish the status of the respective systems.

In addition to the above, the counter menu screen displays the number of users currently in the store acquired from the IC card registration information file (D0809), name of user who is waiting to receive the photographed images that have been printed acquired from the IC card registration information file (D0809) and the album image file (D0807), and the remaining number (printing paper level warning) of printable printing paper (official printing paper prepared by the store). Display of the printing paper level warning is not an essential part of this embodiment, and the explanation thereof is omitted.

By viewing the counter menu screen displayed on the monitor 0803, the working staff is able to grasp the in-store status in real time.

Although the working staff is able to constantly confirm the in-store status with the counter menu screen, when performing processing to handle visitors or the like, such working staff is able to perform such handling processing by touching the processing button 2402 with any finger (S2306).

In other words, the working staff touches the "visitor" button when a new user comes to the store, touches the "print status" button when the user finishes the photo shoot and editing of photos and comes to receive the printed photos, touches the "print status" button when confirming the print status or reprinting photos that were defective, and touches the "checkout" button before the user exits the store, respectively. Further, in addition to the above, by touching the figure of the studio 0107 or the satellite 0106 displayed on the layout information 2401, it is also possible to display the detailed usage status of the respective system (S2307).

When the "visitor" button is pressed (touched), the CPU 0601 displays a screen prompting the insertion of a player card on the monitor 0603, and waits for the IC card to which "2" (player) is set as the card type (D1401) in the IC card R/W 0606b; that is, waits for the player card to be inserted (S2308).

Incidentally, if the store is adopting a membership system, for new users, an empty card to which only the card type is set, or a card previously used by a different user to seek the reuse of cards is inserted. When a user as a member comes to the store for the second time onward, since such user should have his/her card, and the card is provided by the user and then inserted.

When the player card is inserted into the IC card R/W 0606b, the CPU 0601 displays a visitor screen on the monitor 0603.

Figure 25:
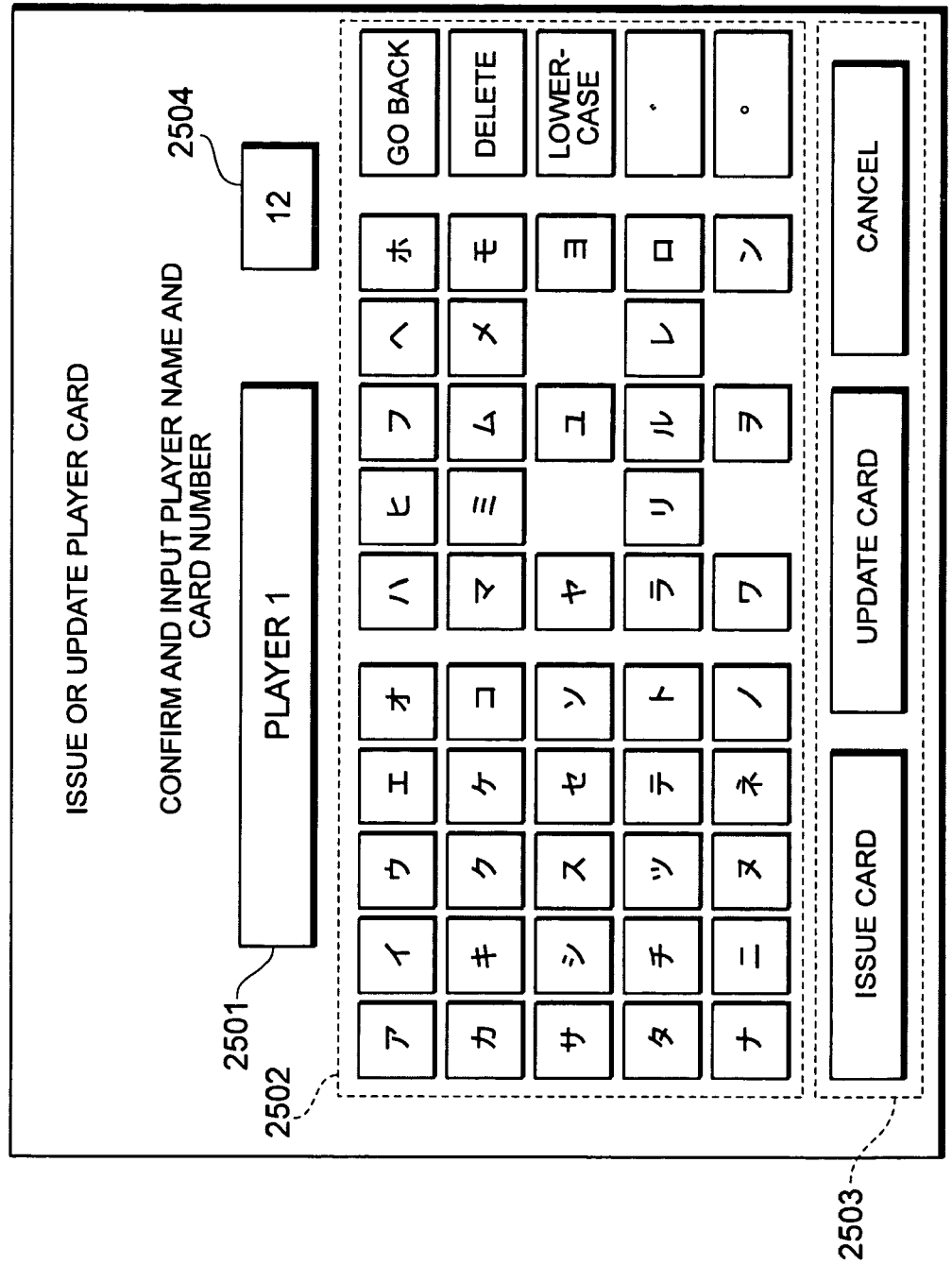
FIG. 25 is an explanatory diagram showing an example of a display screen of the automatic photo studio according to an embodiment of the present invention.

FIG. 25 shows a display example of a visitor screen. The visitor screen displays a player name display/input unit 2501, a card number display/input unit 2504, a simulated keyboard 2502, one or more processing buttons 2503 indicating "card issue", "card update", "cancel" and so on, and other information.

The player name display/input unit 2501 displays the player name that has been recorded in the player card, and the card number display/input unit 2504 displays the card number that has been similarly recorded in the player card. When the working staff is to newly issue a card of change the player name for some reason, such working staff changes and inputs the player name by touching the characters displayed on the simulated keyboard 2502. Further, when the working staff is to compare the IC card number indicated in the IC card and the displayed contents and the two are different, such working staff changes and inputs the card number by touching the simulated keyboard 2502.

When the input or confirmation of the player name and card number is complete, the working staff touches the "card issue" or "card update" button.

"Card issue" is processing for newly creating an IC card for a user who visited the store for the first time.

When the "card issue" button is touched, the CPU 0601 records the current date and time in the player ID (D1402) of the IC card inserted into the IC card R/W 0606*b*, the player name and card number in the player name/card number (D1403), and the current date in the last access date (D1404), respectively, and sets a default value in the other items of the IC card. Further, the number of registered plays (D1302) of the IC card registration information file (D0809) is incremented by one in the server system 0103, and a request is made for recording a new player ID (D1307), an effective flag (D1308), a player name/card number (D1309), and log count of use (D1310). Based on this request, "1" (effective) is set in the effective flag (D1308), and 1 is set in the log count of use (D1310). Further, the current date is recorded in the date of use (D1311), and 0 is recorded in the number of photos taken (D1312).

Meanwhile, "card update" is processing for receiving the user on the current day when the user took home the IC card and brings it back during his/her next visit. This processing can also be performed in a case where the user loses the IC card and wishes to ongoingly using the previous player ID; that is, when the user wishes to continue by referring to the past photographed image information recorded in the IC card registration information file (D0809).

When the "card update" button is touched, the CPU 0601 searches the IC card registration information file (D0809), and displays the player ID (D1402) of the IC card or the player ID (D1307) of the player information that coincides with one of the player names input with the visitor screen, a player name/card number (D1309), latest date of use (D1311) among the used log information, and a "cancel" button on the monitor 0603. Here, when no corresponding information is registered in the IC card registration information file (D0809), an error message to such effect is displayed on the visitor screen. Incidentally, since a plurality of such screens could be provided, scroll display and the like will be enabled.

The working staff confirms the displayed player ID, player name/card number and date of use, and touches the corresponding player ID on the screen when he/she acknowledges that the user information to be updated is displayed on the screen. Further, when the working staff considers that no user information to be updated is displayed on the screen, he/she touches the cancel button. When the cancel button is touched, the CPU 0601 displays an error message to such effect on the visitor screen.

When the player ID is touched and the touched player ID is the same as the player ID (D1402) of the IC card inserted into the IC card R/W 0606*b*, the CPU 0601 sets the player name and card number input to the player name/card number (D1403) of the IC card with the visitor screen, updates the last access date (D1404) to the current date, and sets a default value in the other items of the IC card. Further, the server system 0103 is requested to update the data of the player ID of the IC card registration information file (D0809). Specifically, "1" (effective) is set in the effective flag (D1308), the player name and card number input with the visitor screen are set in the player name/card number (D1309), the log count of use (D1310) is incremented by one, the current date is recorded as the date of use (D1311), and 0 is recorded in the number of photos taken (D1312).

Further, when the touched player ID is different from the player ID (D1402) of the IC card, the CPU 0601 updates the player ID (D1402) of the IC card to the touched player ID, and the player name/card number (D1403) to the player name input with the visitor screen, updates the last access date (D1404) to the current date, and sets a default value in the other items of the IC card. Further, the server system 0103 is requested to update the data of the player ID of the IC card registration information file (D0809). Specifically, "1" (effective) is set in the effective flag (D1308), the player name and card number input with the visitor screen are set in the player name/card number (D1309), the log count of use (D1310) is incremented by one, the current date is recorded as the date of use (D1311), and 0 is recorded in the number of photos taken (D1312).

Further, when visitor processing was to be performed, but the user changed his/her mind and exists the store, and the "cancel" button is touched on the visitor screen, the CPU 0601 ends this processing without updating the IC card and the like.

After the foregoing processing is ended, the CPU 0601 displays a screen prompting the removal of the player card on the monitor 0603 (S2310). When the player card is removed, the counter menu screen is displayed on the monitor 0603 once again (S2304).

When the "print status" button is touched on the counter menu screen, the CPU 0601 displays a print status selection screen on the monitor 0603, and waits for a target user for confirming the print status to be designated (S2311).

FIG. 26 shows a display example of a print status selection screen. The print status selection screen displays a user-based print status display 2601, one or more processing buttons 2602 indicating the text of "next page", "previous page", "cancel" and so on, and other information.

Here, the CPU 0601 extracts an image ID (D1313) in which the current date is set as the date of use (D1311) regarding a player registered in the IC card registration information file (D0809) who visited on the current day (in other words, a player in which the current date is registered in the date of use (D1311)), searches information regarding this image ID from the album image file (D0807), and determines whether the command date of printing (D1208) is the current day. Then, the CPU 0601 displays the player ID (D1307) of a player having one or more images in which the command date of printing is the current day, the player name/card number (D1309), the print start time (D1211), and the print status (D1212). When there are two or more photos of the player to be printed (D1209), the earliest time is displayed as the print start time, "print complete" as the print status when all images have been printed, "print queue" when all images image are in a print queue, and "printing" when there is at least one image that is being printed and there is at least one image that has not yet been printed. Further, when such information does not fit onto one screen, the remaining information can be displayed by touching the "previous page", "next page" buttons.

The working staff searches the user in which the print status is to be confirmed from the print status selection screen, and, when such user is discovered, the working staff touches the player name of the corresponding user.

Further, even if the print status selection screen displayed, when the confirmation of the print status is no longer required, the CPU 0601 ends this processing when the "cancel" button is touched.

When the player name is touched on the print status selection screen, the CPU 0601 displays the print status screen on the monitor 0603, and waits for a command to perform reprinting or the like (S2312).

Figure 27:
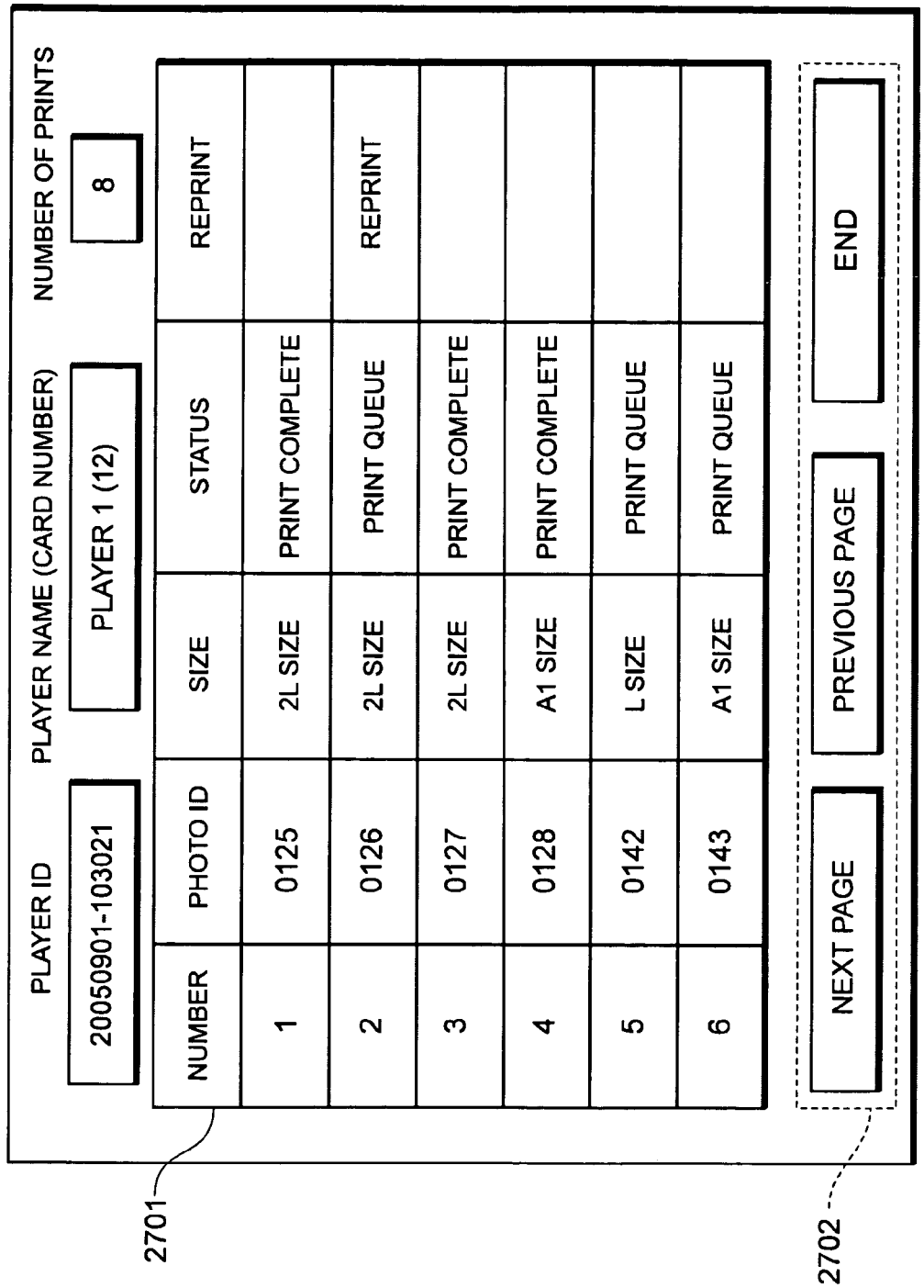
FIG. 27 is an explanatory diagram showing an example of a display screen of the automatic photo studio according to an embodiment of the present invention.

FIG. 27 shows a display example of a print status screen. The print status screen displays a print status display 2701, one or more processing buttons 2702 indicating "previous page", "next page", "end" and so on, a player ID, a player name/card number, number of prints and other information.

Here, as in the case of displaying the print status selection screen, the CPU 0601 acquires the image ID of images shot on the current day by the player to be displayed, and displays the image ID, print size, and print status of images recorded in the album image file (D0807) of such images and in which the command date of printing is the current day. When such information does not fit onto one screen, the remaining information can be displayed by touching the "previous page", "next page" buttons.

Among the photos displayed on the print status screen, the working staff can reprint photos of the same size by touching the "reprint" column of the photo displayed as "print complete". This kind of operation is required when there is a defective print in the printed photos.

Further, after the print status screen is displayed and the necessary operation is performed, and the "end" button is touched, the CPU 0601 ends this processing.

When the foregoing processing is ended, the CPU 0601 displays the counter menu screen on the monitor 0603 once again (S2304).

When the "checkout" button is touched on the counter menu screen, the CPU 0601 displays a screen prompting the insertion of the player card on the monitor 0603, and waits for the player card to be inserted into the IC card R/W 0606*b* (S2313).

When an effective and checkout-waiting player card (determined based on conditions such as whether the effective flag (D1308) of the IC card registration information file (D0809) is "9") is inserted into the IC card R/W 0606*b*, the CPU 0601 displays a checkout screen on the monitor 0603 (S2314). Further, here, the CPU 0601 determines whether the printing of all images shot by the player on the current day and that require printing is complete. When the effective flag (D1308) is not "9", or when there are unprinted images, a message to such effect and a message commanding the removal of the IC card are displayed on the monitor 0603, and, after the IC card is removed, the counter menu screen is displayed on the monitor 0603 once again (S2304).

FIG. 28 shows a display example of a checkout screen. The checkout screen displays a breakdown 2801, one or more processing buttons 2802 indicating "checkout end", "cancel" and so on, a player name, number of prints and other information.

The breakdown 2801 displays whether the photo shoot was performed on the current day by referring to the number of photos taken (D1312) on the current day of the IC card registration information file (D0809), and the number of prints of images for each print size.

The working staff can calculate the price based on the information displayed on the checkout screen.

When the working staff touches the "checkout end" button, this is notified to the server system 0103, and the print status of corresponding images in the photo result image file (D0806) and the album information file (D0807) is updated to "photo delivered". Further, "2" (invalid) is set in the effective flag of the IC card registration information file (D0809), and returns to a state where the visitor processing needs to be performed once again in order to shoot photos.

Incidentally, when checkout processing was to be performed, but the user changed his/her mind and decided to shoot more photos, the CPU 0601 ends this processing when the "cancel" button is touched.

When the foregoing processing is ended, the CPU 0601 displays a screen prompting the removal of the player card on the monitor 0603 (S2315). When the player card is removed, the counter menu screen is displayed once again on the monitor 0603.

When a figure representing the studio or the satellite is touched on the counter menu screen, the CPU 0601 displays the detailed studio status screen or the detailed satellite status screen on the monitor 0603 (S2316).

FIG. 29 shows a display example of a detailed studio status screen. The detailed studio status screen displays a studio name, an execution status, a studio type, "confirmation" button and the like. The studio name, status, and studio type can be obtained from the in-store layout file (D0801) and the studio setting file (D0804).

FIG. 30 shows a display example of the detailed satellite status screen. The detailed satellite status screen displays a satellite name, a status, a player name, usage start time, print start time, "confirmation" button and the like. The satellite name, status, player name, card number, usage start time, and print start time can be obtained from the in-store layout file (D0801), the satellite usage file (D0804) and the IC card registration information file (D0809).

When the "confirmation" button is touched on the detailed studio status screen or the detailed satellite status screen, the CPU 0601 ends this processing, and displays the counter menu screen on the monitor 0603 once again.

Processing in the printer system 0105 is now explained. Incidentally, as described above, since processing in the print system 0105 can also be performed using the counter system 0104, the only time this processing will be performed is when the counter system 0104 cannot be used because it is performing checkout processing.

Figure 31:
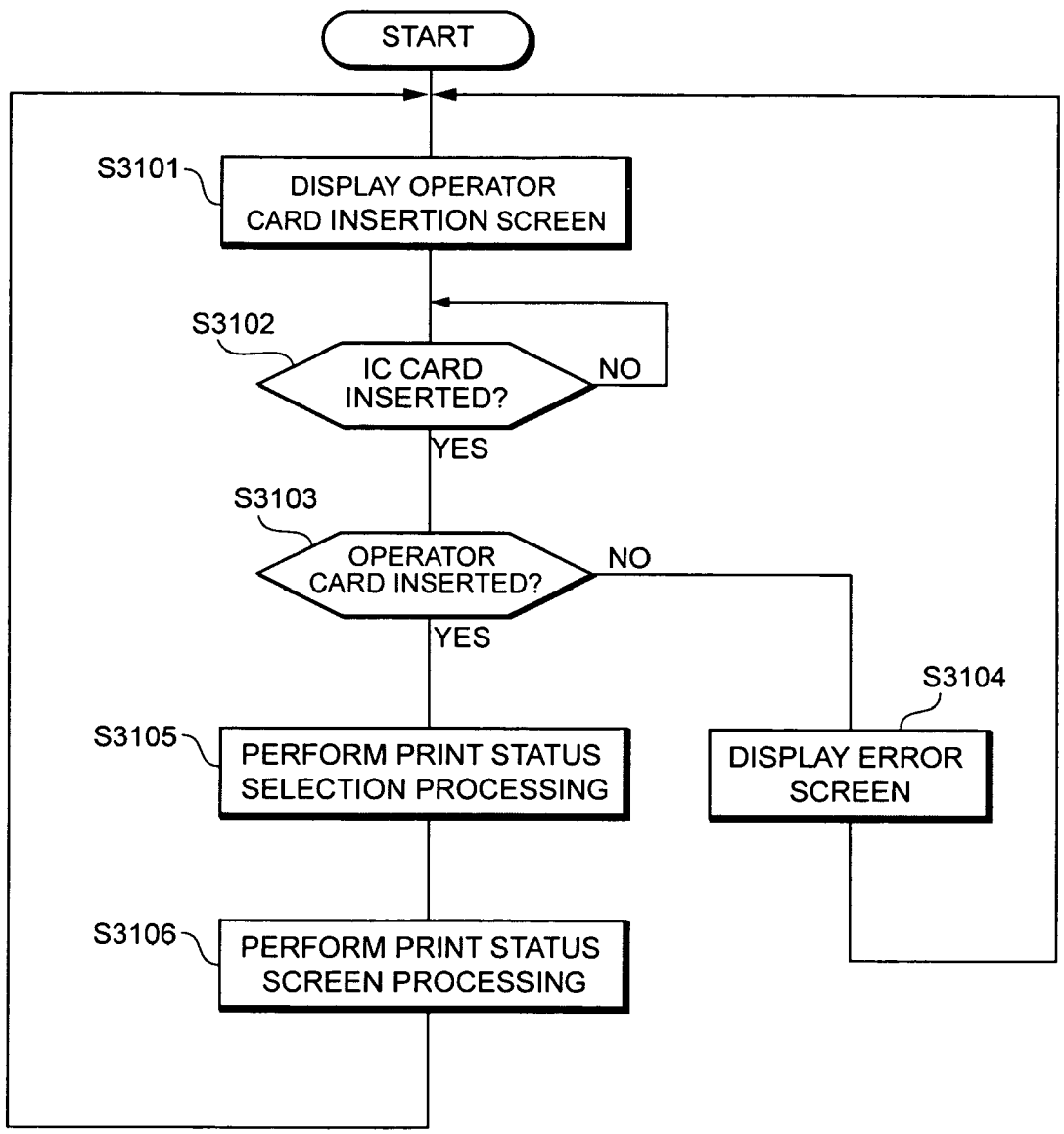
FIG. 31 is a flowchart showing the flow of print processing of the automatic photo studio according to an embodiment of the present invention.

FIG. 31 is a flowchart showing the outline of print status confirmation processing performed in the printer system 0105.

When the printer system 0105 is activated, the CPU 0701 displays a screen prompting the insertion of an operator card on the monitor 0703 (S3101), and waits for the IC card to be inserted into the IC card R/W 0706 (S3102). When the IC card is inserted into the IC card R/W 0706, the CPU 0701 refers to the card type (D1401) recorded in the IC card (S3103), and, when an IC card other than the operator card has been inserted, it displays a message showing that a wrong card has been inserted on the monitor 0703 (S3104). On this message screen, in addition to the error message, a button image displaying "OK?" and the like is also displayed, and, when this "OK?" button is touched, the CPU 0701 displays a screen prompting the insertion of the operator card once again (S3101).

When the operator card is inserted, the CPU 0701 displays a print status selection screen on the monitor 0703, and waits for the target user in which the print status is to be confirmed is designated (S3105).

When the target user is designated on the print status selection screen, the CPU 0701 displays a print status screen on the monitor 0703, and waits for a command of reprinting or the like (S3106).

When the foregoing processing is ended and the operator card is removed, the CPU 0701 displays a screen requesting the insertion of the operator card on the monitor 0703 once again (S3101).

Incidentally, in the foregoing processing, processing concerning the print status selection screen and processing concerning the print status screen are the same as the print status confirmation processing in the counter system 0104, and the displayed screens are also the same.

Operation of the satellite system 0110 is now explained.

Figure 32:
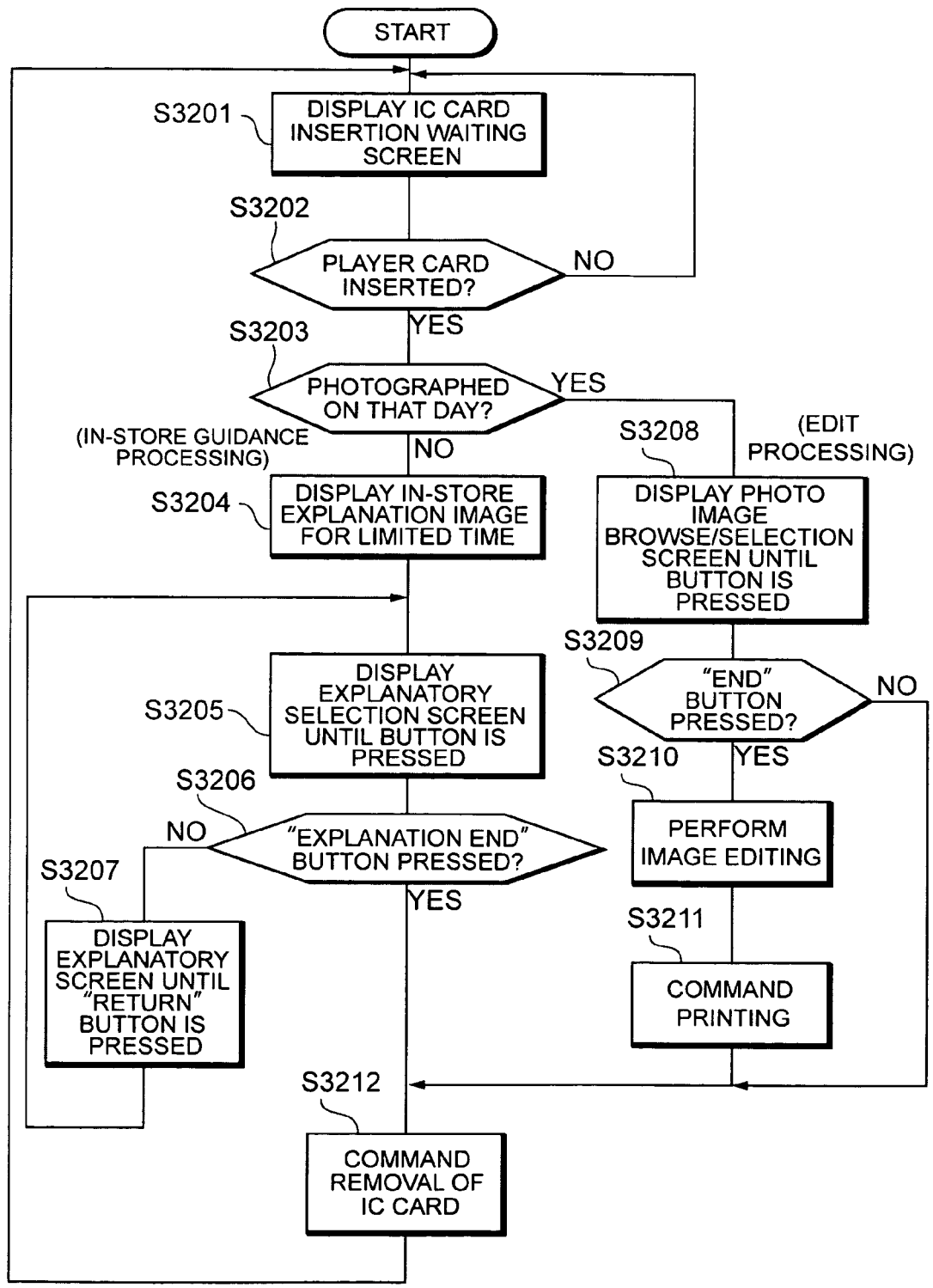
FIG. 32 is a flowchart showing the flow of satellite processing of the automatic photo studio according to an embodiment of the present invention.

FIG. 32 is a flowchart showing the outline of processing performed in the satellite system 0110.

When the CPU 1701 of the satellite system 0110 is activated, it displays a screen prompting the insertion of a player card on the monitor 1703 (S3201), and waits for an effective player card (that is, an IC card in which the card type (D1401) is "2" and the effective flag (D1308) of the IC card registration information file (D0809) is "1") to be inserted into the IC card R/W 1706 (S3202).

When the player card is inserted into the IC card R/W 1706, the CPU 1701 refers to the IC card registration information file (D0809) based on the player ID (D1402) recorded in the IC card, and adds the recorded number of photos taken (D1312) to the used log information of the player. When the result of such addition is 0; that is, when the user has never taken a photo, in-store guidance processing is performed, and, if the result is one or more, edit processing is performed (S3203).

In the in-store guidance processing, the CPU 1701 displays the in-store guidance image for a fixed period of time the still image or moving image (S3304). Specifically, although the screen is now shown, a "skip" button is constantly displayed on the screen, and a user who does not require guidance can skip the guidance image by touching the skip button with the touch pen 1704.

When the guidance image is displayed for a fixed period of time, or the user touches the skip button, the CPU 1701 displays an explanation selection screen (S3205).

Figure 33:
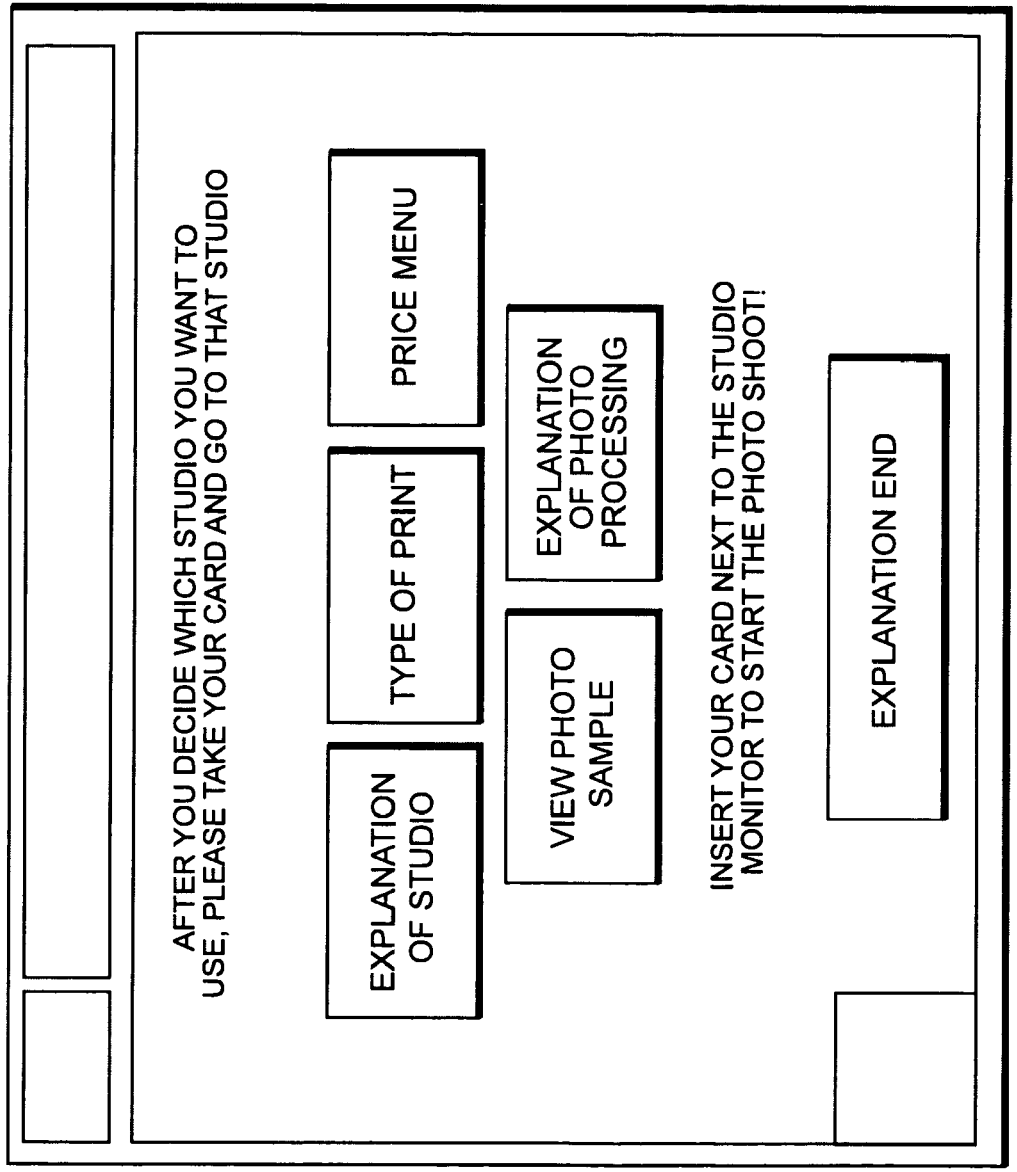
FIG. 33 is an explanatory diagram showing an example of a display screen of the automatic photo studio according to an embodiment of the present invention.

FIG. 33 shows a display example of the explanation selection screen. The explanation selection screen displays a plurality of buttons indicating "explanation of studio", "type of print", "price menu", "view photo sample", "explanation of photo processing", "end of explanation" and so on.

Here, when the user touches a button other than the "end of explanation" button, the CPU 1701 displays a detailed explanation screen (S3206, S3207).

Figure 34:
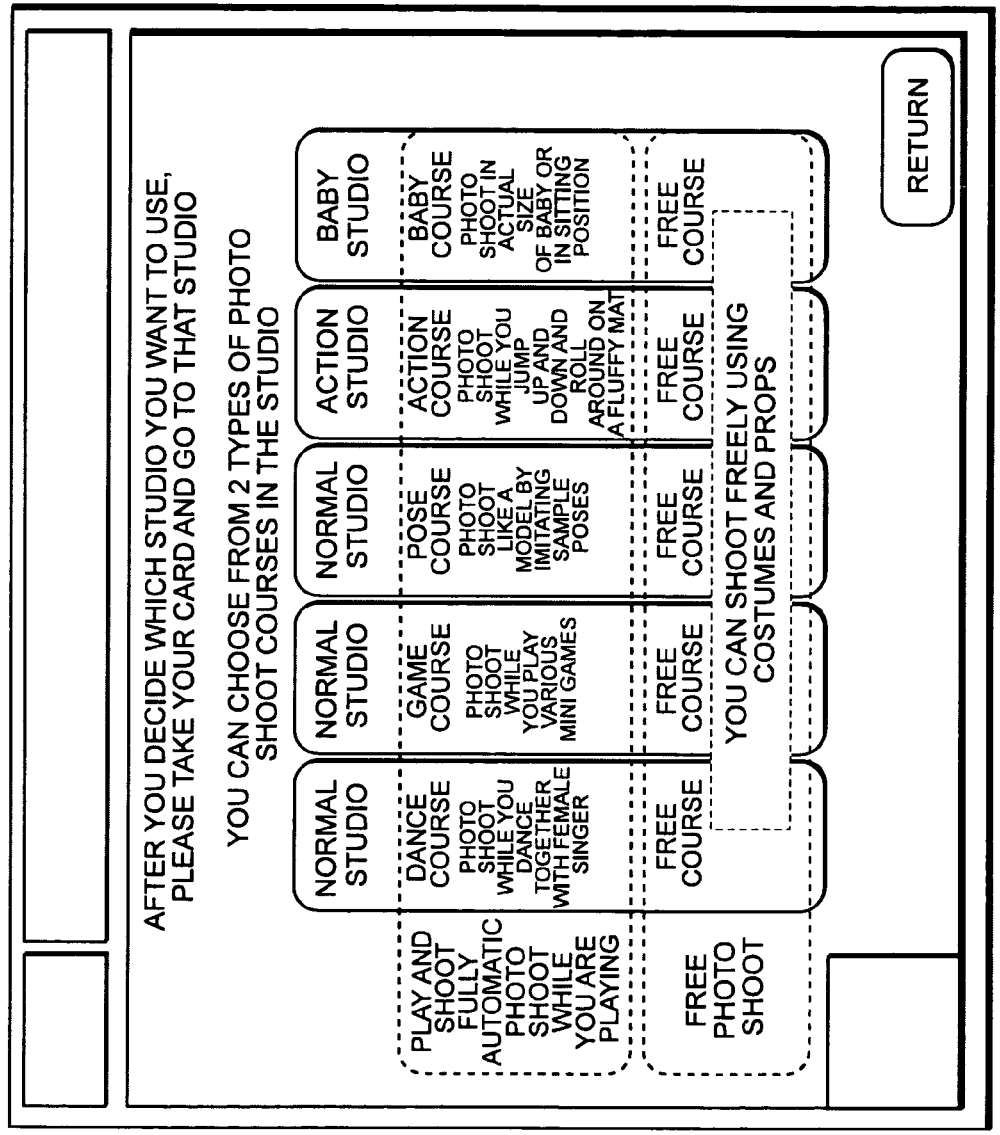
FIG. 34 is an explanatory diagram showing an example of a display screen of the automatic photo studio according to an embodiment of the present invention.

FIG. 34 shows a display example of a studio explanation screen as one of the detailed explanation screens. The explanation selection screen is a screen to be displayed when the user touches "explanation of studio" on the explanation selection screen, and the screen displays the explanation on the type of studio and photo shoot courses that can be used in the respective studios, and a "return" button.

By reading the explanation displayed on the screen, the user will be able to obtain information such as the store having three types of studios; namely, normal, action and baby, and the normal studio offers the option of 4 photo shoot courses including dance, game, pose and free. Thus, the user will be able to consider with studio to use for the photo shoot. Further, for instance, when the user touches the portion displayed as "dance course", it is also possible to see further detailed information such as by a pop-up display of a footage showing the situation where actual photos are taken in the dance course.

This screen is displayed until the user touches the "return" button, and, when the user touches the "return" button, the CPU 1701 displays the explanation selection screen once again (S3205).

Incidentally, since the display screen in cases where other buttons such as "type of print" or "price menu" in the explanation selection screen is basically a result of the same processing other than that the displayed explanation is different, and the display examples thereof are omitted.

When the "end of explanation" button is touched on the explanation selection screen, the CPU 1701 displays a screen prompting the removal of the player card on the monitor 1703 (S3212). When the player card is removed, a screen requesting the insertion of a player card is displayed on the monitor 1703 once again (S3201).

In the edit processing, the CPU 1701 foremost displays a photographed image browse/selection screen on the monitor 1703 (S3208).

Figure 35:
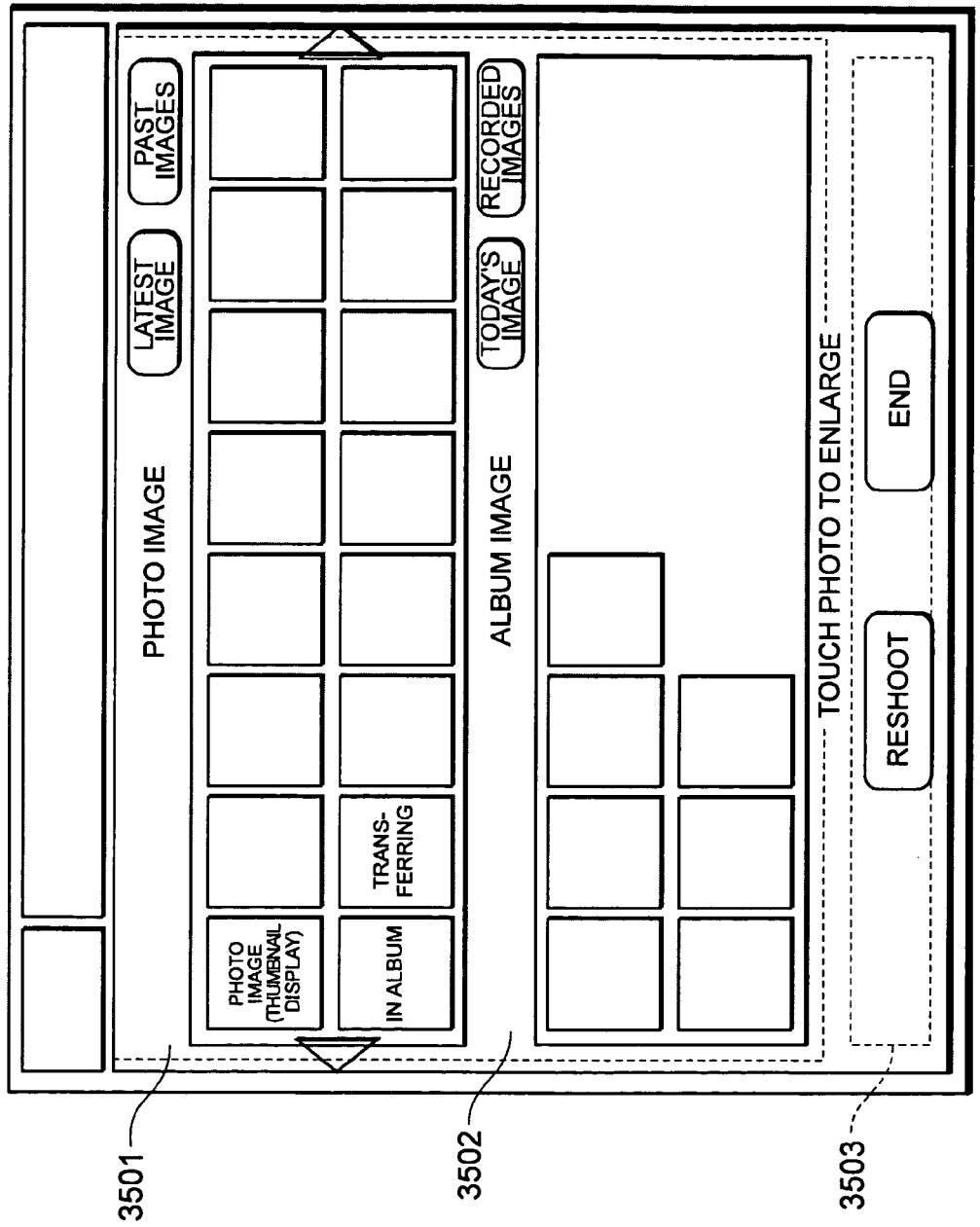
FIG. 35 is an explanatory diagram showing an example of a display screen of the automatic photo studio according to an embodiment of the present invention.

FIG. 35 shows a display example of the photographed image browse/selection screen. The photographed image browse/selection screen displays photographed image information 3501, album image information 3502, and buttons 3503 such as "re-shoot" and "end".

The photographed image information 3501 thumbnails all images photographed on the current day. When all images cannot be displayed on one screen, a button image for commanding the horizontal scroll display is also displayed. Further, the photographed image information 3501 displays a photographed image (thumbnail image), and two buttons indicating "latest image" and "past images".

The CPU 1701 foremost acquires a photographed image ID (D1408) from the player card. The photographed image ID (D1408) stores the image ID that has not yet been subject to edit processing among the images photographed on the current day. Subsequently, by searching the photo result image file (D0806) with the image ID as the key, it is possible to obtain information of the displayed image. Even when the user touches the "latest image" button, the processing explained above is also performed.

Meanwhile, when the user touches the "past images" button, the CPU 1701 searches for the information of the player from the IC card registration information file (D0809), acquires an image ID that has not been set in the photographed image ID (D1408) of the player card among the image IDs (D1313) of the player (that is, image ID of an image that was shot on the current day or in the past and has already been subject to edit processing), and searches the photo result image file (D0806) with the image ID as the key (by using a key for eliminating images of such image ID) in order to obtain information on the displayed image.

Here, in order to display thumbnails, a fixed period of processing time will be required based on grounds of transferring image information from the server system 0103 or the like. During this time, in order to prevent users from becoming irritated, a display such as "transferring" is provided on the thumbnail while the image is being transferred so that the user will be able to know how many images have already been transferred at a glance. Further, it is also possible to acquire image information from the studio system 0111, and not from the server system 0103. In the foregoing case, since it is possible to prevent processing of passing around the image information from the studio system 0111 to the server system 0103, and then to the satellite system 0110, the transfer time can be shortened, but the processing of the system will become complex.

Among the images registered in the photo result image file (D0806), images that are registered in the album image file (D0807) are displayed overlappingly with text such as "included in album" after being transferred.

Incidentally, although this embodiment explained a case of separating the display into "latest image" and "past images", for instance, the latest image may be separated into photos taken in the first studio, and photos taken in the second studio, so as to separate the photos based on the studio used. In order to realize this, the image ID (D1408) of the player card and the serial number showing which image was taken in which studio of which photo shoot session should be recorded as a pair.

With respect to the album image information 3502, although the displayed contents are basically the same as the photographed image information 3501 described above, the following two points are different.

The first difference is in that the album image information 3502 obtains image information to be displayed from the album image file (D0807). The second difference is in that the album image information 3502 is provided with the two buttons of "today's image" and "recorded images".

Here, when "today's image" is touched, the editing image ID (D1408) is obtained from the player card. Further, when the "recorded images" is touched, information of the player is searched from the IC card registration information file (D0809), all image IDs (D1313) in which the date of use (D1311) is the current day and in the past are acquired, and extracts the image IDs registered in the album image file (D0807). This is in order to collectively view the collected album images.

When today's image (image of current day) is displayed as the album image information 3502, processing for adding the photographed image to the album can be performed. Addition processing to the album is specifically performed as follows.

Foremost, when the user touches a thumbnail image displayed on the photographed image information 3501, although not shown, this is pop-up displayed on the photographed image browse/selection screen, and enlarged for confirmation. Incidentally, even when image data for another thumbnail display is being transferred from the server system 0103 to the satellite system 0110, so as long as it is an image that has been fully transferred to the satellite system 0110, pop-up display is possible, but images that have already been registered in the album image file (D0807) can not be pop-up displayed.

A button indicating "Select?" or the like is also displayed on the pop-up displayed image, and, when the user touches the "Select?" button, the CPU 1701 closes the pop-up displayed image, and overlappingly displays text such as "included in album" on the thumbnail of the image of the photographed image information 3501.

Simultaneously, the CPU 1701 additionally displays the thumbnail of the image to the album image information 3502, and overlappingly displays text indicating "newly added to album". When the pop-up displayed image is not to be selected, when a part of the image is touched, the CPU 1701 closes the pop-up displayed image.

Incidentally, it is also possible to restrict the number of images to the added to the album to be 32 at maximum. The limiting value should be recorded in the magnetic disk 0508 of the server system 0103. By performing this kind of control, it is possible to prevent a user from staying in the store all day and lowering the turnover of users.

With respect to images newly added to the album, the album selection can also be canceled. Specifically, when a user touches the image newly added to the album, although not shown, it is pop-up displayed on the photographed image browse/selection screen. A button indicating "Cancel Selection?" is also displayed on the pop-up displayed image, and, when the user touches the "Cancel Selection" button, the CPU 1701 closes the pop-up displayed image, deletes the thumbnail of the image displayed in the album image information 3502, and additionally displays the thumbnail of the image in the photographed image information 3501.

The photographed image browse/selection screen is displayed until the user touches the "reprint" button or "end" button.

Even when the user touches the "reprint" button or the "end" button, the CPU 1701 ultimately records the image ID of all images displayed as today's album image information 3502 in the editing image ID (D1410) of the player card, and sets the number of recorded images in the number of edited images (D1409). Further, the time spent by the user using the satellite system 0110; that is, the time from the photo image browse/selection screen being displayed to the "reprint" button or "end" button being touched, is added to the editing time (D1411). Further, 0 is set to the number of photos taken (D1407) of the player card, and the photographed image ID (D1408) information is deleted.

Further, the CPU 1701 notifies the server system 0103 of the image ID recorded in the editing image ID (D1410) of the player card. The server system 0103 searches the image information with the image ID as the key from the photo result image file (D0806), and copies information among the image information that does not exist in the album image file (D0807) to the album image file (D0807).

Subsequently, the CPU 1701 determines whether the user touches the "reprint" or "end" button, and ends the edit processing when the "reprint" button has been touched, and performs image edit processing when the "end" button has been touched (S3209).

Incidentally, when the user touches the "reprint" button, the user will take additional photos in the studio. Here, it is possible to limit the number of times the user can use the studio for each visit to, for instance, a maximum of 5 times. Specifically, the studio usage count (D1405) of the player card is compared with the limiting value, and, when the result is more than the limiting value, a "reprint" should not be displayed. The limiting value can be determined by referring to the available number of uses (weekdays) (D1002) and the available number of uses (holidays) (D1004) of the studio setting file (D0802). As a result of providing the foregoing limitation, it is possible to prevent a user from staying in the store all day and lowering the turnover of users.

When the user touches the "end" button, the CPU 1701 displays the editing image selection screen and performs image edit processing (S3210).

FIG. 36A shows a display example of an editing image selection screen. The editing image selection screen displays album image information 3601, and a "proceed to print" button.

The album image information 3601 displays a thumbnail of image information registered in the album image file (D0807). Specifically, the CPU 1701 acquires the editing image ID (D1410) from the player card, and acquires the corresponding image information from the album image file (D0807), and thumbnails such image information.

Incidentally, when all display images cannot be displayed on one screen, a button for performing the horizontal scroll display is displayed.

When the user touches the thumbnail image of the album image information 3601, the CPU 1701 pop-up displays an editing screen on the editing image selection screen.

Figure 36B:
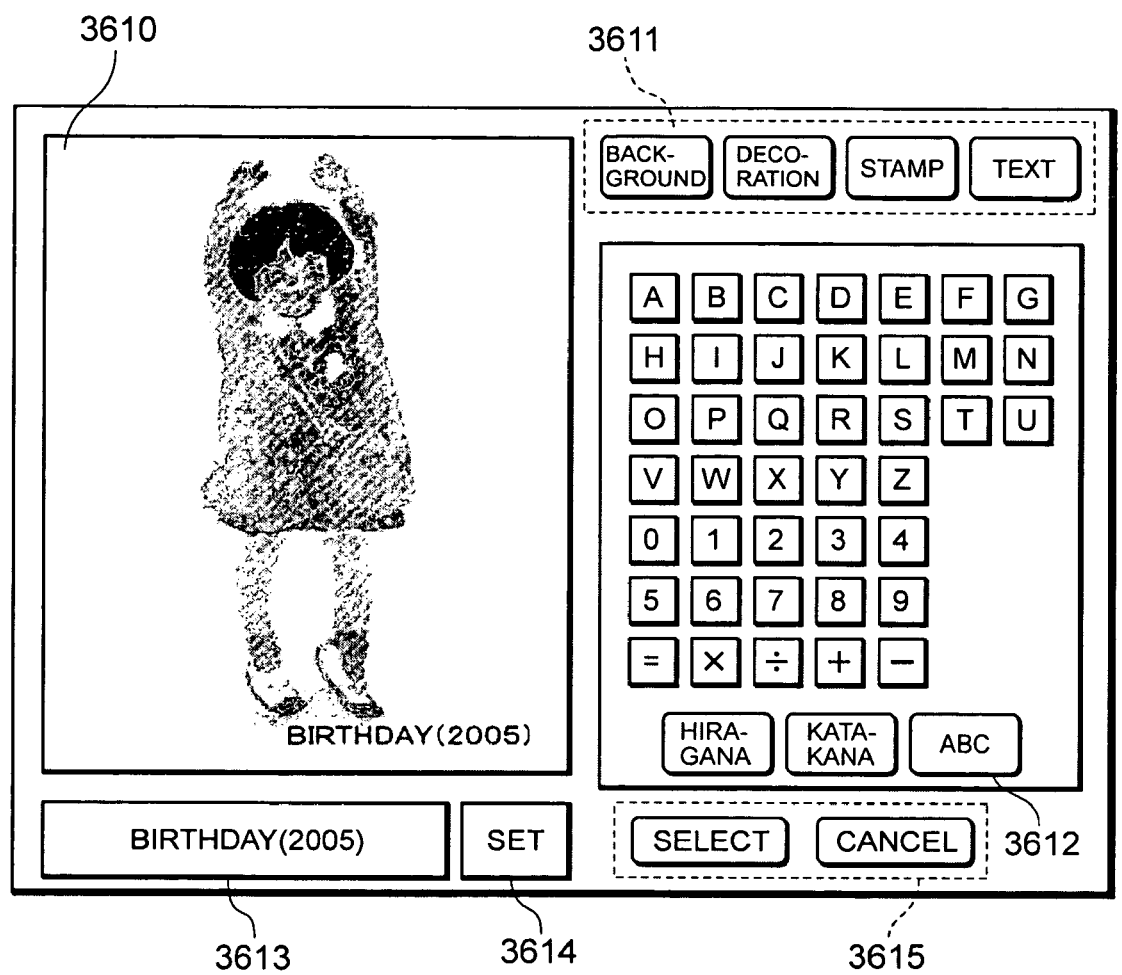
FIG. 36B is an explanatory diagram showing an example of a display screen of the automatic photo studio according to an embodiment of the present invention.

FIG. 36B shows a display example of an editing screen. The editing screen displays an enlarged image 3610, an editing tool selection button 3611, an editing tool image 3612 and a processing button 3615. The displayed contents of the editing tool image 3612 are switched with the button touched on the editing tool selection button 3611. In the display example, the displayed contents in the case where the user touched the "text" button are shown.

When the "text" button is selected as in this example, as the editing tool image 3612, a simulated keyboard image, and buttons indicating "hiragana", "katakana", and "ABC" are displayed. The displayed contents of the simulated keyboard will differ depending on which button is selected (touched). In this display example, the displayed contents in the case when the "ABC" button is selected are shown.

When the user touches the simulated keyboard button of the editing tool image 3612, the CPU 1701 additionally displays the touched text on the text display unit 3613. Although not shown, needless to say, the simulated keyboard also has text input operation buttons provided to standard keyboards such as "cancel", "back up one character" and the like. Thus, the user is able to touch these buttons and input the text of one's liking on the text display unit 3613.

When the user touches the "set" button after creating a text of one's liking, the indication of "set" is changed to "release", and the input text becomes definite, and this text can be used as a stamp. In other words, when the user touches an arbitrary position on the enlarged image 3610, the input text is copied and displayed on the touched position, and, when a different position is touched, the same text is similarly copied and displayed. When the user presses the "release" button, the indication of "release" is changed to "set", and editing using the "text" button function is ended.

When the user touches one of the processing buttons 3615, the CPU 1701 closes the editing image, and displays the editing image selection screen shown in FIG. 36A.

Incidentally, this processing has an objective of selecting the image to be printed, and, even if the user wishes to printed the images without editing such images in any way, the user must once pop-up display and confirm the thumbnail displayed on the photographed image information 3501 of the editing image selection screen shown in FIG. 36A. This is because since the details cannot be confirmed with a thumbnail display, it is necessary to enlarge the image and confirm whether it is actually the image to be printed.

When the user touches the "select" button, the CPU 1701 deems that the displayed image has been selected as a candidate to be printed, temporarily records the image ID thereof in the magnetic disk 1708, and replaces the image information of the image downloaded in the satellite system 0110 with the edited image information. Meanwhile, when the user touches the "cancel" button, the CPU 1701 abandons the edited image information.

Incidentally, the image edit processing can be performed to all images thumbnailed on the album image information 3601, and can also be performed several times to the same image, and the user can edit the image until he/she creates an image of one's liking.

When the editing is ended and the user touches the "proceed to print" button, the CPU 1701 transfers to the server system 0103 the image ID of the image selected as the candidate to be printed and the edited image. The server system 0103 sets the current date to the corresponding command date of printing (D1208) of the photo result image file (D0806) and the album image file (D0807), and sets 0 in the number of prints (D1209). Further, the image data (D1207) of the album image file (D0807) is updated to the edited image.

Subsequently, the CPU 1701 displays a print command screen, and performs print command processing of the image (S3211).

Figure 37:
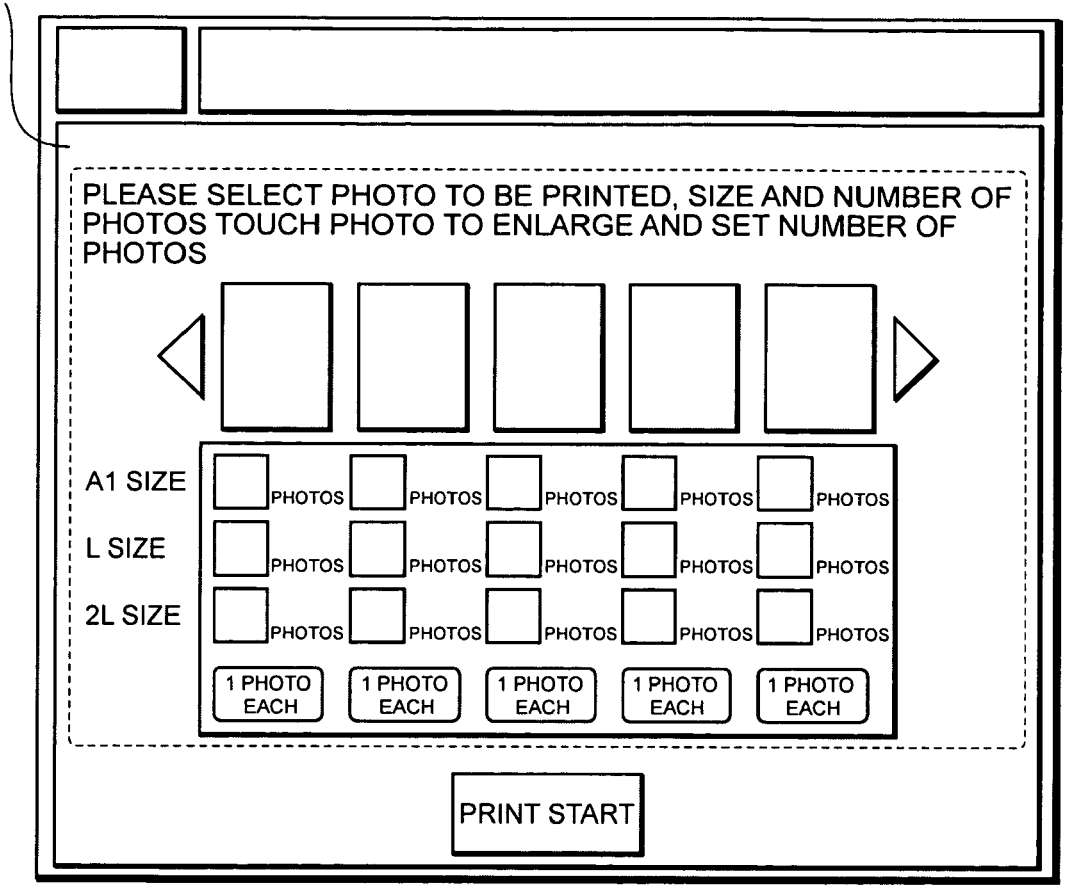
FIG. 37 is an explanatory diagram showing an example of a display screen of the automatic photo studio according to an embodiment of the present invention.

FIG. 37 shows a display example of the print command screen. The print command screen displays print image information 3701 and a "print start" button.

The CPU 1701 thumbnails the image selected as the candidate to be printed in the editing image selection screen as the print image information 3701, and displays the number of prints input area per print size at the bottom of the thumbnail display. When all images to be printed do not fit onto one screen, the scroll button may be used to perform a horizontal scroll display.

The initial displayed contents of the number of prints input area is blank (meaning 0 prints), and this is incremented by one when the user touches the number of prints input area of the respective images. If the screen is touched when the number of prints is nine, the display returns to 0 prints and shows a blank once again. Incidentally, the input method for the number of prints is not limited to the above, and, for instance, a button indicating "one photo each" as illustrated in the print image information 3701 can be displayed, and, when this button is touched, 1 can be set to all sizes for the image. Further, although not shown, a print add button, a print subtract button, a print clear button and so on may be provided to the respective images.

The user leaves 0 as the value of the number of prints input area for images that do not need to be printed among the image as candidates to be printed, and inputs the required number of prints for images that need to be printed.

When the user completes designating the number of prints and touches the "print start" button, the CPU 1701 notifies the server system 0103 of the image ID and the number of prints per print size designated with respect to such image ID, and then ends the edit processing (S3211).

The server system 0103 sets "1" (printing required) to the necessity of printing (D1206) of the corresponding image information of the photo result image file (D0806) and the album image file (D0807), and sets the notified values in the number of prints (D1209) and the print size (D1210) of the image information. Further, a default value is set in the start time of printing (D1211), and "1" (print queue) is set in the print status (D1212). Here, for instance, when it is notified to print two A1 sizes and three L sizes, 5 is set in the number of prints (D1209), and two entries of information setting the A1 size as the print size (D1210) are created, and three entries of information setting the L size as the print size (D1210) are created. The server system 0103 sends the image information to the printer system 0105 after the file update is complete, and command printing.

"9" (checkout waiting) is set in the effective flag of the IC card registration information file (D0809), and becomes a status where photos cannot be taken.

After the foregoing processing is ended, the CPU 1701 displays a screen prompting the removal of the player card on the monitor 1703 (S3212). When the player card is removed, a screen requesting the insertion of the player card is displayed on the monitor 1703 once again (S3201).

Figure 38:
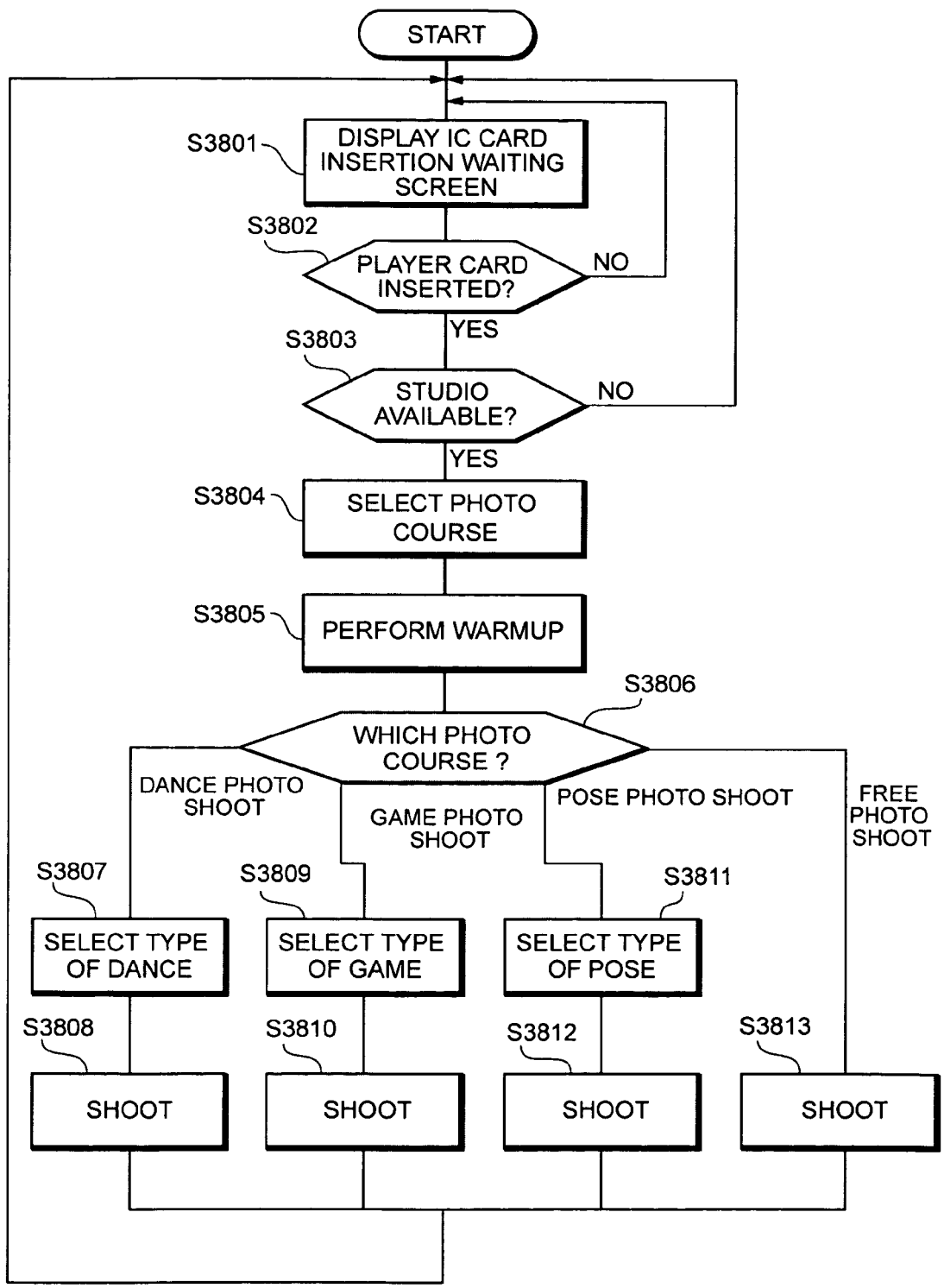
FIG. 38 is a flowchart showing the flow of studio processing of the automatic photo studio according to an embodiment of the present invention.

Operation of the studio system 0111 when the user actually takes photos is now explained. FIG. 38 is a flowchart showing the outline of the processing to be performed in the normal studio system 0111. As described above, although there are three types of studios; namely, normal, action and baby, since the basic operation of the system is the same, processing of the normal studio system 0111 will be foremost explained, and the differences with the processing in the other studio system 0111 will be subsequently explained.

When the CPU 2201 of the studio system 0111 is activated, it displays a screen prompting the insertion of an IC card on the monitor 2203 (S3801), and waits for the IC card to which "2" is set as the card type (D1401) in the IC card R/W 2206 and "1" is set as the effective flag (D1308) of the IC card registration information file (D0809); that is, waits for an effective player card to be inserted (S3802).

When the player card is inserted into the IC card R/W 2206, the studio usage count (D1405) recorded in the IC card and the available number of uses (weekdays) (D1002) or the available number of uses (holidays) (D1004) of the studio setting file (D0802) are compared. When the result exceeds the available number of uses, or when the user is trying to continue taking photos immediately after the photo shoot, an error message to such effect is displayed, and a screen prompting the insertion of the IC card is displayed once again (S3803).

Further, when the last value of the studio ID (D1406) is equal to the studio ID of the studio 0107 and the number of photos taken (D1407) is one or more, an error message is also displayed in the foregoing case since the user is trying to continue using the same studio 0107 without going through the edit processing.

If the studio is available for use, the CPU 2201 adds its own studio ID to the aftermost studio ID (D1406) of the player card, and increments the studio usage count (D1405) by one. Further, the in-use lamp 2227 is lit up, the photo shoot course selection screen is displayed on the monitor 2203, and photo shoot course selection processing is performed (S3804).

Figure 39:
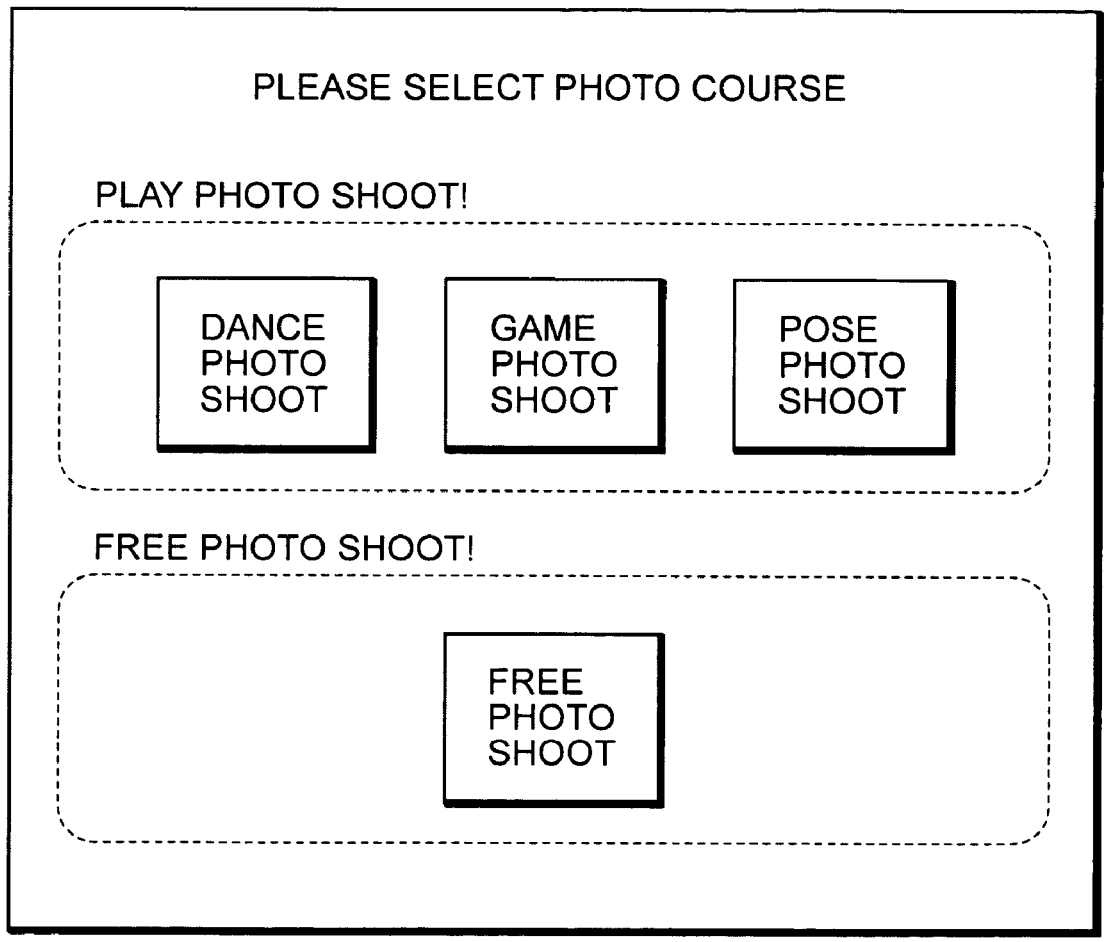
FIG. 39 is an explanatory diagram showing an example of a display screen of the automatic photo studio according to an embodiment of the present invention.

FIG. 39 shows a display example of the photo shoot course selection screen. The photo shoot course selection screen displays the four buttons indicating "dance photo shoot", "game photo shoot", "pose photo shoot", and "free photo shoot". When the user touches any one of the four buttons, the CPU 2201 displays a warm up screen on the monitor 2203 and the confirmation monitors (2205*a* and 2205*b*), and performs warm up processing (S3805).

Figure 40:
FIG. 40 is an explanatory diagram showing an example of a display screen of the automatic photo studio according to an embodiment of the present invention.

FIG. 40 shows a display example of a warm up screen. Together with a voice message such as "Let's warm up! Everyone come over here!", the children's interest is attracted by displaying a footage of the status in the studio on the warm up screen. After the CPU 2201 displays the warm up screen for a fixed period of time, it determines which photo shoot course was selected by the user, and performs the processing corresponding to the respective photo shoot courses (S3806).

Incidentally, since the operation of the system in the respective courses is basically the same, the case of when the dance photo shoot is selected will be foremost explained, and the differences with the other courses will be subsequently explained.

When the dance photo shoot is selected, the CPU 2201 displays a dance selection screen on the monitor 2203 (S3807). Here, an animation screen or the like for attracting the interest of children is displayed on the confirmation monitors (2205*a* and 2205*b*).

FIG. 41 shows a display example of a dance selection screen. The dance selection screen displays three buttons indicating "easy play course (ages 2 to 4)", "fun play course (ages 4 to 6)", "active dance course (ages 6 and above)". When the user touches any one of the three buttons, the CPU 2201 displays a photo shoot screen on the monitor 2203, and performs photo shoot processing (S3808). Photo shoot processing is ended after the lapse of a prescribed period of time.

Figure 42:
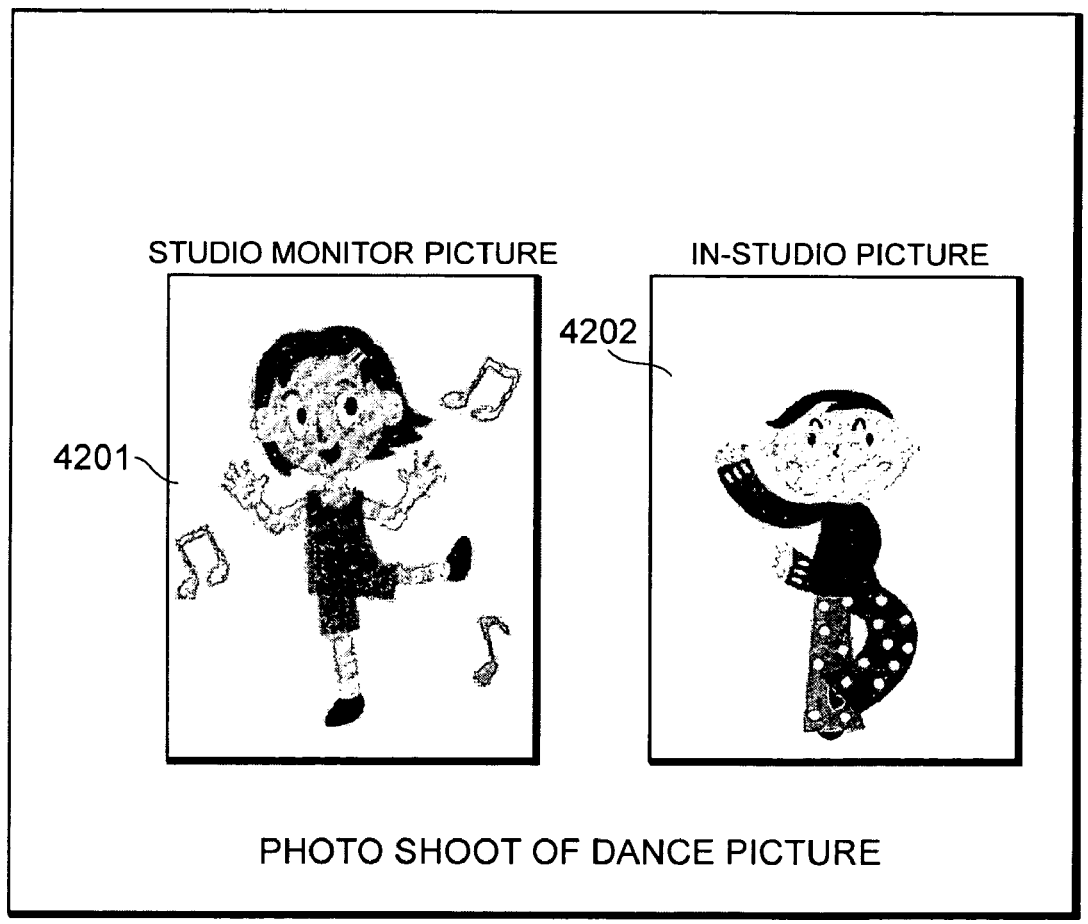
FIG. 42 is an explanatory diagram showing an example of a display screen of the automatic photo studio according to an embodiment of the present invention.

FIG. 42 shows a display example of a photo shoot screen. The photo shoot screen displays both the studio monitor footage 4201 as a sample footage showing a picture of the instructor doing a sample dance, and the in-studio footage 4202 showing the children inside the studio.

Further, one of the two confirmation monitors (2205*a* and 2205*b*) displays the same footage as the studio monitor footage 4201. Specifically, when the "easy play course (ages 2 to 4)" is selected, this is displayed on the confirmation monitor (2205*b*), and nothing is displayed on the confirmation monitor (2205*a*). Contrarily, when the "fun play course (ages 4 to 6)" or the "active dance course (ages 6 and above)" is selected, this is displayed on the confirmation monitor (2205*a*), and nothing is displayed on the confirmation monitor (2205*b*).

In other words, when the sample contents targeting children of lower ages (sample footage of each dance in the case of a dance photo shoot) are selected, since the subject is most likely small, it is determined that the photo shoot using the two photo cameras (2101*a* and 2101*b*) at the lower part of the camera box would be appropriate, and the confirmation monitor (2205*b*) is used in order to draw the attention of the subject near both cameras.

Contrarily, when sample contents targeting older children are selected, since the subject is most likely tall, it is determined that the photo shoot using the two photo cameras (2221 and 2101*a*) at the upper part of the camera box is appropriate, and the confirmation monitor (2205*a*) is used to draw the attention of the subject near both cameras.

Incidentally, the method of determining the height of the subject is not limited to the method based on contents as described above, and, for instance, a plurality of sensors 2226 of different heights may be installed in the studio to automatically measure the height of subjects. According to this method, although the height of the subject can be accurately measured, it will lead to increased manufacture costs. Further, the monitor 2203 may be used for the user to personally input one's height. According to this method, although the subject's height can be measured without any addition of special equipment, there is a drawback in that the user will be forced to perform an extra operation. An appropriate method may be selected upon giving consideration to the foregoing advantages and disadvantages.

The footage to be subsequently projected on the in-studio footage 4202 (as described above, the same footage is displayed on one of the two confirmation monitors (2205*a* and 2205*b*)) is footage filed with one of the three monitor cameras (2220*a*, 2220*b*, 2220*c*), and the CPU 2201 determines which footage to display as follows.

Although the selected sample contents are recorded in the magnetic disk 2208 of the studio system 0111, as the recorded data, together with the footage data to be displayed, camera selection information to be used by the CPU 2201 for selecting the monitor camera to be used for the display is also included. For example, with the start of the footage data as the reference point, information indicating the use of the monitor camera 2220*b* first, use of the monitor camera 2220*a* 23 seconds later, and the user of the monitor camera 2220*b* once again 28 second later is recorded.

The camera designation information is different for the respective sample contents, and, for instance, when footage of an instructor saying "Come on and jump! One, two, three!" 23 seconds after the start of the footage data, and thereafter jumping is recorded, footage of the monitor camera

2220*a* that is installed at a higher location is used in accordance with the time that the foregoing footage is played.

In other words, the in-studio footage 4202 constantly displays a footage filmed with a monitor camera among the three monitor cameras (2220*a*, 2220*b*, 2220*c*) that should be filming near the child's face.

Incidentally, selection of the monitor camera (2220*a*, 2220*b*, 2220*c*) is not limited to the method explained above, and, for instance, a plurality of sensors 2226 of different heights can be installed in the studio to automatically measure the child's head, and the optimal monitor camera (2220*a*, 2220*b*, 2220*c*) for filming this position can be selected.

In the dance photo shoot explained above, the photo shoot is conducted automatically. In other words, when the photo shoot processing is started and the same footage as the studio monitor footage 4201 is displayed on one of the confirmation monitors (2205*a* and 2205*b*), the CPU 2201 continuously takes photos until a prescribed period of time lapses; that is, until the footage of the selected sample contents is ended. The photo shoot is usually conducted for 3 to 5 minutes.

More specifically, when the photo shoot processing is started, the CPU 2201 takes photos after the lapse of a fixed period of time (for instance, 3 seconds later), and, after the photo shoot is ended, waits for the strobe lights (1801*a*, 1801*b*, 1801*c*) to be recharged, and starts taking photos again once the strobe lights are recharged. This is repeated until the photo shoot processing is ended.

Since the subject is a small child, even if instructed by the mother, it is not always the case that the child will move to the optimal photo shooting position and strike the optimal pose. Further, even if the instructor jumps in the footage of the sample contents, it is not necessary the case that the child will jump accordingly. Thus, the possibility of shooting a good photo is increased by increasing the frequency of the photo shoot and continuously taking photos.

Moreover, it is also possible to wait for the child to step on the footswitch 2243 after the photo shoot is enabled, determine where the child is standing, and take photos only when the child is in a photo shooting range. This method will reduce wasteful erroneous photos. When the footswitch 2243 is stepped on, sounds or light may be emitted. Since this will amuse the child and make him/her step on the footswitch 2243, it is possible to move the child naturally to the photo shooting range.

Further, when using two cameras (2221 and 2101*a*, or 2101*a* and 2101*b*) among the photo cameras (2221, 2101*a*, 2101*b*) to take the photos, the visual line command lamp controller (2239) will flash the visual line command lamp (2240*a*, 2240*b*, or 2240*c*) disposed on either side of the photo camera, and it will seem that the light of the LED lamp 2241 on both sides is gradually approaching the photo camera. By adopting this method, the subject's visual line will be naturally directed to the photo camera, and it will be possible to take photos with the subject looking straight into the camera. Here, the command information for deciding which visual line command lamp of which camera should be lit up should be recorded in the sample contents as with the command information of the monitor camera described above.

Incidentally, during the photo shoot, it is possible to determine the distance between the subject and the camera based on the determination of the position of the footswitch 2243 that was stepped on, perform zoom processing according to the distance, focus the image, and take the photo upon optimally controlling the light quantity of the strobe light 2222.

Processing in the case when the "game photo shoot" is selected in the photo shoot course selection screen is selected is now explained mainly regarding the differences with the dance photo shoot. The differences are the following two points.

1) In the "game photo shoot", a game selection screen is displayed instead of a dance selection screen. As in the case of the dance selection screen, the user can select a game matching the child as a subject among the plurality of games according to the child's age displayed on the game selection screen.

Figure 43:
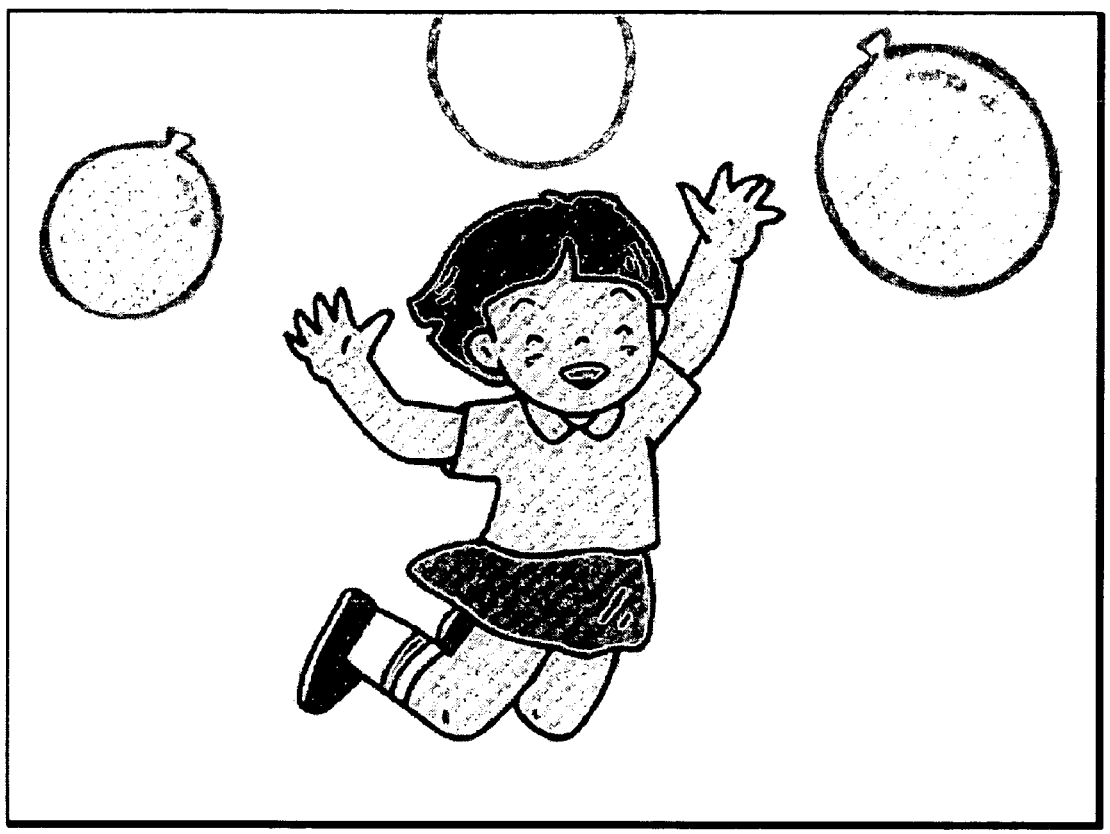
FIG. 43 is an explanatory diagram showing an example of a display screen of the automatic photo studio according to an embodiment of the present invention.

2) When the game is selected, unlike the dance photo shoot, the photo shoot screen of the monitor 2203 displays only the in-studio footage 4202 showing the child inside the studio. Further, the confirmation monitor (2205*a* or 2205*b*) does not display the footage of an instructor, but rather displays a synthesized footage of the child as the subject to be included in the in-studio footage 4202 synthesized on the game footage. As the game image, a footage where balloons of various colors are falling one after another as shown in FIG. 43, or a footage of moles randomly stick their face out and in at several locations on the screen is displayed, and narration such as "Hit the balloons!" is output. When the child's hand or feet overlaps with the footage of the balloon or mole, the balloon will pop or the mole will become dizzy, and the child will be amused and make various actions. Thereby, it will be possible to photograph unusual poses with the child moving around excitedly.

Incidentally, the contact judgment of the game character such as a balloon or a mole and the subject or its image can be conducted as follows.

The child's movement (subject's movement) of moving his/her hand or feet to overlap with the footage of the balloon or mole is conducted by comparing the subject image shot per frame (each prescribed period of time; 1/60 for example) with the monitor camera (2220) selected by the system and the subject image of the latest frame (current frame) and the subject image of the immediately preceding frame, and detecting the difference (frame difference). In other words, the different between the image of the immediately preceding frame and the image of the current frame is acquired (difference of pixel information in pixel units between the frames, and, as the pixel information, there is a color signal based on RGC, brightness signal based on the YUV system, signal showing the difference between the brightness signal and red signal, signal showing the difference between the brightness signal and blue signal, etc.), and it is determined that there was movement at locations with changes of a prescribed value or greater. Further, by extracting the feature quantity such as the outline or color of the section with movement, it is possible to determine that the movement was the hand. Then, it is determined whether the movement of the hand overlapped with the character such as a balloon or mole displayed on the confirmation monitor (2205). Specifically, for instance, the position of a character (position of one or more characters) displayed on the confirmation monitor according to the game program is pre-stored along the time axis, and, by comparing the position of the character displayed on the confirmation monitor as of this moment ascertained with the lapse of time from the display start time of the game image, and the position of the hand at the point in time the latest frame (current frame) was photographed, it is possible to determined whether the movement of the hand overlaps with the character. Then, when the child moves his/her hand so that it overlaps with the footage of the balloon or mole, a game image that changes the status of the game character such as the balloon popping or mole becoming dizzy is created, and displayed on the monitor.

Like this, when the child succeeds in the game, since the balloon will pop or the mole will become dizzy, the child will be caught up in the game and focus on the monitor, and will naturally strike animated poses. The photo shoot timing using the two photo cameras (2221 and 2101a, or 2101a and 2101b), as described above, may be conducted every three seconds with a timer, or photos can be taken in a timing under certain conditions set forth in the progress of the game play. In other words, for instance, a photo may be taken at a timing when one balloon pops or one mole becomes dizzy, or a photo may be taken at a timing when several balloons are popped or several moles become dizzy. By determining the contact of the subject and the character based on the image information, and taking photos at a photo shoot timing when the contact count satisfies a prescribed count, it will be possible to take photos of a child concentrating on the game.

Incidentally, in the foregoing example, although the characters are controlled freely with the game program regarding the position and timing of appearance, a game program using characters that changes the display mode uniquely according to the child's movement may also be employed. In other words, the game program may temporally detect the movement, calculate the position and the direction and speed of such movement, and change the type and quantity of characters to appear (to be displayed) based on the elements of position, direction and speed. For instance, the game program may display numerous characters if the child raises his/her hand and shakes it fiercely. In addition, for example, the photo shoot timing may be determined when a certain number of characters or more are simultaneously displayed.

Figure 44:
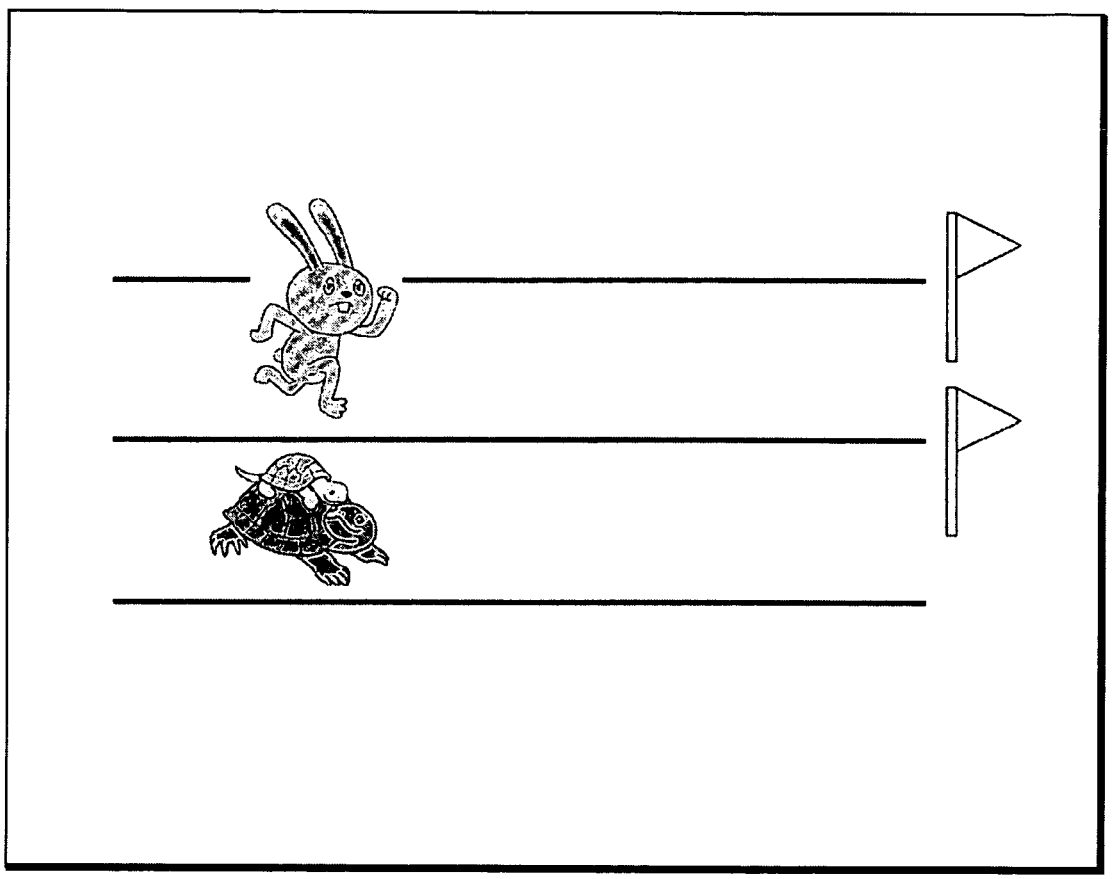
FIG. 44 is an explanatory diagram showing an example of a display screen of the automatic photo studio according to an embodiment of the present invention.

Further, a competitive game as shown in FIG. 44 may also be displayed. In this game, when the child steps on the footswitch 2243, the CPU 2201 moves and displays the turtle toward the goal on the right side in a distance corresponding to the number of times the footswitch was stepped on. Meanwhile, the CPU 2201 automatically moves and displays the rabbit toward the goal. The child will feel that he/she is the turtle and that he/she is racing against the rabbit as the competitor, the child will step on the footswitch 2243 repeatedly in order to move the turtle faster. Thereby, it will be possible to take dynamic photos of the child running hard.

Incidentally, the game footage itself of the balloon or turtle is only displayed on the confirmation monitor (2205a or 2205b), and is not displayed on the monitor 2203 or the resulting photos.

Processing in the case when the "pose photo shoot" is selected in the photo shoot course selection screen is now explained mainly regarding the differences with the dance photo shoot. The differences are the following three points.

1) In the "pose photo shoot", a pose selection screen is displayed instead of the dance selection screen. As in the case of a dance selection screen, the user is able to select pose sample contents matching the child as a subject among the plurality of poses according to the age of the child displayed on the pose selection screen.

2) When the pose photo shoot is selected, as in the case of the dance photo shoot, the photo shoot screen of the monitor 2203 displays both a studio monitor footage 4201 as a sample footage showing the instructor striking a pose, and an in-studio footage 4202 showing the child inside the studio. The confirmation monitor (2205a or 2205b) also displays both the studio monitor footage as a sample footage showing the instructor striking a pose, and the in-studio footage showing the child inside the studio as with the photo shoot screen of the monitor 2203. As the sample footage, the appearance of the instructor standing up, sitting down and rolling around is displayed, and the child is prompted to take the same pose using voice messages at the same time.

3) In the pose photo shoot, the height to be shot will differ significantly from the pose of a child lying around to the pose of a child doing a stretch. Thus, in the pose photo shoot, the footage is displayed on the confirmation monitor (2205a) when taking a photo at a high position, and the footage is displayed on the confirmation monitor (2205b) when taking a photo of a pose while the child is rolling around. By displaying the footage near the camera that will photograph the child, it is possible to prompt the child to look straight at the camera naturally.

Processing in the case when the "free photo shoot" is selected in the photo shoot course selection screen is now explained mainly regarding the differences with the dance photo shoot. The differences are the following three points.

1) In the "free photo shoot", photo shoot processing is started without a selection screen such as he dance selection screen being displayed.

2) In the photo shoot processing, the three footages filed with three monitor cameras (2220a, 2220b, 2220c) are simultaneously displayed on the photo shoot screen of the monitor 2203, and two buttons indicating "shutter" and "triple photo shot" are respectively displayed below the respective footages. When the user presses the "shutter" button, the footage of the selected monitor camera (2220a, 2220b, 2220c) is displayed on both confirmation monitors (2205a and 2205b), and a narration starts the count down until the photo shoot. The mother as the user guides the child to strike a pose while viewing the monitor 2203 or the like.

3) In the free photo shoot, the photo shoot is not conducted automatically as described above, and is conducted with a single shot or a triple shot. The photo shoot processing ends after the lapse of a prescribed period of time after the start of processing.

Explanation on the processing performed in the normal studio system 0111 is complete. Processing in the action studio system and the baby studio system is now explained main regarding the differences with the processing in the normal studio system.

Foremost, the following three points are different in the action studio system.

1) As the photo shoot course selection screen, a similar screen as the one shown in FIG. 39 will be displayed, but the displayed contents are different. In other words, in the action studio system, four buttons indicating "jump photo shoot", "rolling photo shoot", "mix photo shoot", and "free photo shoot" are displayed.

2) When "jump photo shoot", "rolling photo shoot", and "mix photo shoot" are selected as the photo shoot course, a similar screen as the normal studio system for selecting the sample contents to be used in the respective photo shoots (a screen similar to the one shown in FIG. 40) will be displayed, but the displayed contents are different. In other words, for instance, when "jump photo shoot" is selected, buttons indicating "normal jump (ages 4 to 6)", "super jump (ages 6 and above) and so on are displayed.

3) The monitor camera 2220a, the photo camera 2221, and the confirmation monitor 2205a are installed near the ceiling and not in the camera box 1802. In the timing of instructing the rolling pose or pose of sitting on the jump board 1901 and looking up selected in he sample contents, the footage filmed with the monitor camera 2220a is displayed on the confirmation monitor 2205a, and the photo camera 2221 is used for the photo shoot.

Meanwhile, in the timing of instructing a pose for jumping or standing and facing forward, among the two monitor cameras, the footage filmed with the monitor camera 2220b installed at a higher position is displayed on the confirmation monitor 2205b, and the photo camera 2101a is used for the photo shoot. Further, in the timing of instructing a pose for lying down and facing forward, among the two monitor cameras, the footage filmed with the monitor camera 2220c installed at a lower position is displayed on the confirmation monitor 2205b, and the photo camera 2101b is used for the photo shoot.

As described above, although the specific monitor camera for filming the footage of the subject, confirmation monitor and photo camera for shooting the subject are different from the normal studio system, the basic concept is the same with respect to comprising a plurality of photography equipment, and automatically selecting and using the optimal equipment for taking photos of the subject's favorable expressions and poses.

Incidentally, in a state where the subject is on the jump board 1901 or has jumped from the jump board 1901, this is detected based on a notification signal from the footswitch 2243a.

Finally, the baby studio system differs from the normal studio system with respect to the following five points.

1) As the photo shoot course selection screen, a similar screen as the one shown in FIG. 39 will be displayed, but the displayed contents are different. In other words, in the baby studio system, four buttons indicating "sleeping photo shoot", "crawling photo shoot", "sitting photo shoot", and "free photo shoot" are displayed.

2) When "sleeping photo shoot", "crawling photo shoot", and "sitting photo shoot" are selected as the photo shoot course, a screen for selecting the sample contents to be used in the photo shoot as in the normal studio system will no be displayed, and the photo shoot processing is started using the sample contents matching the photo shoot course prepared by the system. The baby studio literally is for the use of taking photos of babies, and, since the movement by babies is limited, it will only be possible to take similar photos even if a plurality of sample contents are prepared. Therefore, it is also possible to prepare a plurality of contents as with the normal studio system so that a user can select the contents of one's liking.

3) The monitor camera 2220a, the photo camera 2221, and the confirmation monitor 2205a are installed near the ceiling and not in the camera box 1802. Further, one monitor camera 2220b, one photo camera 2101 a, and one confirmation monitor 2205b are also installed in the camera box 1802.

In the "sleeping photo shoot", the footage filmed with the monitor camera 2220a is displayed on the confirmation monitor 2205a, and the photo camera 2221 is used for the photo shoot. Meanwhile, in the "crawling photo shoot" and "sitting photo shoot", the footage filmed with the monitor camera 2220b is displayed on the confirmation monitor 2205b, and the photo camera 2101a is used for the photo shoot.

As described above, although the specific monitor camera for filming the footage of the subject, confirmation monitor and photo camera for shooting the subject are different from the normal studio system, the basic concept is the same with respect to comprising a plurality of photography equipment, and automatically selecting and using the optimal equipment for taking photos of the subject's favorable expressions and poses.

4) When "free photo shoot" is selected, the two footages filed with two monitor cameras (2220a, 2220b) are simultaneously displayed on the photo shoot screen of the monitor 2203, and two buttons indicating "shutter" and "triple photo shot" are respectively displayed below the respective footages. The difference between the free photo shoot in the normal studio and action studio is that the number of footages to be simultaneously displayed is two and three, and there is no other particular difference between the two.

5) The footage to be displayed on either of the two confirmation monitors (2205a or 2205b) during the photo shoot processing is not a footage of an instructor, but rather an animation or the like of animals or toys. In other words, a footage that can attract the attention of babies is displayed. Incidentally, during the "crawling photo shoot", although the mother will prompt the movement for the photo shoot, there may be cases where the baby will show interest in the confirmation monitor (2205a or 2205b) and stop moving. In order to handle this kind of situation, it would be ideal to display a "stop display" button on he monitor 2203 during the photo shoot processing, and, when this is touched, stopping the display of the confirmation monitor (2205a or 2205b), changing the indicating of the button to "resume display", and, when the "resume display" button is touched, resuming the display of the confirmation monitor (2205a or 2205b), and returning the indicating of the button to "stop display".

Differences in the respective studios explain heretofore are as described with reference to FIG. 45.

Each time a photo shoot is conducted in each studio system 0111, the CPU 2201 detects the background of the photographed image, and separates the background image and the subject image. If there is no subject image, the CPU 2201 abandons the image information as an unsuccessful photo.

When there is a subject image, the CPU 2201 sends the background image, subject image, and other necessary information to the server system 0103.

The server system 0103 gives an image ID to the sent image, and notifies the given image ID to the studio system 0111. For instance, by giving a serial number that starts with 1, or setting the year, month, day, hour, minute, second of receiving the image information as the image ID, it is possible to obtain a unique image ID as a system. The server system 0103 additionally records the foregoing image ID, the studio ID sent from the studio system 0111, camera number used in the photo shoot, color of the background curtain, and image information in the photo result image file (D0806). Further, the server system 0103 also additionally records the number of photos taken (D1312) and the image ID (D1313) of the IC card registration information file (D0809).

Subsequently, the CPU 2201 additionally records the image ID notified from the studio system 0111 in the photographed image ID (D1408) of the player card, and increments the number of photos taken (D1407) by one.

The foregoing processing is performed in parallel with the photo shoot processing.

Incidentally, although an IC card was used as the player card and operator card in the foregoing explanation, a magnetic card may be used in substitute for the IC card. Or, without limitation to a card-shaped information storage medium such as an IC card or magnetic card, other removable information storage mediums (stick-shaped IC memory or object with IC tag attached or embedded therein) may also be used.

Incidentally, in the foregoing explanation, in the normal studio for instance, although three photo cameras are disposed for taking still images and three monitor cameras are used for taking moving image, respectively, the number of photo cameras and monitor cameras to be disposed in the respective studios can be arbitrarily set to one or more cameras.

Further still, in the foregoing explanation, although the photo cameras for taking still images and the monitor cameras for taking moving images in the respective studios were provided separately, the monitor camera may also play the role as a photo camera, and the images taken with the monitor camera in the photo shoot timing can be stored in the memory unit as still images, and then used as the photo result image.

What is claimed is:

1. An automatic photo studio having a counter for a person to receive a user, a plurality of satellites having a function of receiving operations of the user and a function of showing various displays to the user, and a plurality of studios for photographing a subject, said automatic photo studio comprising:
a counter system provided in the vicinity of said counter for performing visitor processing and checkout processing to the user;
a printer system provided in the vicinity of said counter for printing images based on subject images photographed in said studio;
a satellite system provided to said satellite for enabling the user to edit the subject images photographed in said studio; and
a studio system provided to said studio for controlling photo shooting conditions and photo shoot timing;
wherein said satellite system determines whether the user is an authorized user based on information written in a player information storage medium as an information storage medium in the possession of the user, and permits the user to use said satellite when the user is an official user as said authorized user, and
wherein said studio system determines whether the user is an authorized user based on information written in said player information storage medium in the possession of the user, and permits the user to use said studio when the user is an official user as said authorized user.

2. The automatic photo studio according to claim 1, wherein said counter system and said printer system are permitted to be used based on an operator information storage medium as an information storage medium in the possession of an operator on an operation side of said automatic photo studio.

3. The automatic photo studio according to claim 1,
wherein said studio system is controlled to photograph a prescribed number of images in one photo shoot play in said studio; and
said satellite system displays a screen for the user to select an image as a candidate to be edited among a prescribed number of photo result images as photograph results.

4. The automatic photo studio according to claim 1,
wherein said studio system sends a photo result image to be thumbnailed on said satellite system while performing processing of separating a photographed image into an image of the subject and an image of a background, and sends images of a processing result after said separation processing is complete to a server system managing various files to be used in the overall system of said automatic photo studio.

5. The automatic photo studio according to claim 4, wherein said studio system abandons the photographed image when an image of the subject does not exist in said photographed image.

6. The automatic photo studio according to claim 1, wherein said studio system has a plurality of cameras installed at different heights, and said studio system takes photographs by simultaneously using at least two cameras selected among said plurality of cameras.

7. The automatic photo studio according to claim 6, wherein said studio system has a plurality of computer systems respectively corresponding to said plurality of cameras, and performs image processing respectively in at least two computer systems corresponding to the cameras that took the photos.

8. The automatic photo studio according to claim 1, wherein said studio system has position detection means capable of detecting a position of the subject, and said studio system performs focus control and strobe light control according to the position of the subject detected with said position detection means.

9. The automatic photo studio according to claim 1,
wherein said studio system has pressure detection means capable of detecting jump timing of the subject who jumped, and said studio system takes photos at the jump timing of the subject detected with said pressure detection means.

10. The automatic photo studio according to claim 1, wherein said studio system comprises:
photo shoot means for photographing the subject per frame;
detection means for detecting movement of the subject from a frame difference of the subject image photographed with said photo shoot means;
storage means storing a program of a game that advanced upon changing movement of a game character based on the detected movement of the subject;
image generation means for generating a synthesized image by synthesizing a game character image pre-stored in said storage means, and said subject image; and
display means for displaying said synthesized image;
wherein said studio system executes game processing in which the movement of said subject changes said game character according to a response to a detection signal from said detection means, and determines whether preset photo shooting conditions are satisfied during the execution of said game processing; and
stores a subject image photographed when said photo shooting conditions are satisfied in said storage means as a photo result image that is selectable by the user with said satellite.

11. The automatic photo studio according to claim 1, wherein said studio system comprises:
photo shoot means for photographing the subject per frame;
detection means for detecting the movement of the subject from the frame difference of the subject image photographed with said photo shoot means;
storage means storing a program of a game that advanced upon changing the movement of a game character based on the detected movement of the subject;
image generation means for generating a synthesized image by synthesizing a game character image pre-stored in said storage means, and said subject image; and
display means for displaying said synthesized image;
wherein said studio system executes game processing based on said game program, and displays on said display means a synthesized image generated in a time series with said image generation means; and
stores a subject image photographed when a photo shoot timing set to coincide with said game progress in said storage means as a photo result image that is selectable by the user with said satellite.

12. The automatic photo studio according to claim 1, wherein the studio system comprises:
a photo shoot means for photographing the subject per frame;

a detection means for detecting movement of the subject from a frame difference of the subject image photographed with said photo shoot means;

a storage means storing a program of a game that advances upon changing a movement of a game character based on the detected movement of the subject;

an image generation means for generating a synthesized image by synthesizing a game character image pre-stored in the storage means, and the subject image; and a display means for displaying the synthesized image;

wherein the studio system executes game processing based on the game program, and displays on the display means a synthesized image generated in a time series with the image generation means; and stores a subject image photographed when a photo shoot timing set to coincide with said game progress in the storage means as a photo result image that is selectable by the user with the satellite.

13. An automatic photo studio comprising:

a plurality of satellites configured to receive operations of a user and to show various displays to the user;

a plurality of studios configured to photograph a subject;

a satellite system provided to any one of the plurality of satellites, the satellite system enabling the user to edit subject images photographed in any one of the studios; and a studio system provided to any one of the plurality of studios, the studio system controlling photo shooting conditions and photo shoot timing;

an authentication system operable to determine whether the user is an authorized user based on information stored in a player information storage medium in the possession of the user and to permit the user to use one or both of the satellite and studio systems when the user is determined as the authorized user.

14. The automatic photo studio according to claim 13, wherein the studio system sends a photo result image to be thumbnailed on the satellite system while performing processing of separating a photographed image into an image of the subject and an image of a background, and sends images of a processing result after a separation processing is complete to a server system managing various files to be used in the automatic photo studio, and wherein the studio system abandons the photographed image when an image of the subject does not exist in the photographed image.

15. The automatic photo studio according to claim 13, wherein the studio system has a plurality of cameras installed at different heights, and the studio system takes photographs by simultaneously using at least two cameras selected among the plurality of cameras.

16. The automatic photo studio according to claim 15, wherein the studio system has a plurality of computer systems respectively corresponding to the plurality of cameras, and performs image processing respectively in at least two computer systems corresponding to the cameras that took the photos.

17. The automatic photo studio according to claim 13, wherein the studio system has a pressure detection means capable of detecting jump timing of the subject who jumped, and the studio system takes photos at the jump timing of the subject detected with the pressure detection means.

18. The automatic photo studio according to claim 13, wherein the studio system comprises:

a photo shoot means for photographing the subject per frame;

a detection means for detecting movement of the subject from a frame difference of the subject image photographed with the photo shoot means;

a storage means storing a program of a game that advances upon changing a movement of a game character based on the detected movement of the subject;

an image generation means for generating a synthesized image by synthesizing a game character image pre-stored in the storage means, and the subject image; and a display means for displaying the synthesized image;

wherein the studio system executes game processing in which the movement of the subject changes the game character according to a response to a detection signal from the detection means, and determines whether preset photo shooting conditions are satisfied during the execution of the game processing; and stores a subject image photographed when the photo shooting conditions are satisfied in the storage means as a photo result image that is selectable by the user with the satellite.

* * * * *